United States Patent [19]

Weinbaum et al.

[11] Patent Number: 5,511,185
[45] Date of Patent: Apr. 23, 1996

[54] SYSTEM FOR AUTOMATIC TESTING OF COMPUTER SOFTWARE HAVING OUTPUT SYNCHRONIZATION AND CAPABLE OF RESPONDING TO ASYNCHRONOUS EVENTS

[75] Inventors: David Weinbaum, Tel Aviv; Daniel Bar-On, Kiryat Ono; Yoav Tamir, Ra'anana, all of Israel

[73] Assignee: Mercury Interactive Corporation, Los Altos Hills, Calif.

[21] Appl. No.: 298,357

[22] Filed: Aug. 30, 1994

Related U.S. Application Data

[63] Continuation of Ser. No. 690,878, Apr. 23, 1991, abandoned, which is a continuation-in-part of Ser. No. 618,742, Nov. 27, 1990, abandoned.

[51] Int. Cl.$^6$ .................................................. G06F 11/00
[52] U.S. Cl. .......................... 395/183.14; 371/25.1; 364/275.5; 364/DIG. 1
[58] Field of Search ........................ 371/19, 20.4, 25.1, 371/26; 395/575; 364/275.5

[56] References Cited

U.S. PATENT DOCUMENTS

| | | | |
|---|---|---|---|
| 4,696,003 | 9/1987 | Kerr et al. | 371/19 |
| 4,819,233 | 4/1989 | Delucia et al. | 371/19 |
| 4,958,345 | 9/1990 | Fujisaki | 371/21.3 |
| 5,022,028 | 6/1991 | Edmonds et al. | 371/25.1 |
| 5,086,393 | 2/1992 | Kerr et al. | 371/19 |
| 5,126,990 | 6/1992 | Efron et al. | |
| 5,157,782 | 10/1992 | Tuttle et al. | 395/575 |
| 5,218,605 | 6/1993 | Low et al. | 371/16.1 |
| 5,220,658 | 6/1993 | Kerr et al. | 395/500 |
| 5,233,611 | 8/1993 | Triantafyllos et al. | 371/16.1 |

*Primary Examiner*—Robert W. Beausoliel, Jr.
*Assistant Examiner*—Albert Decady
*Attorney, Agent, or Firm*—Ladas & Parry

[57] ABSTRACT

A system and method for automatic testing of computer software is disclosed. Additionally, a system for tracking and replicating the operation of a cursor manipulation device in a computer system is disclosed, wherein the computer system includes a monitor and a cursor manipulation device having an icon representing the location of a cursor on the monitor. The system for tracking and replicating includes recording apparatus for capturing a plurality of data points transmitted by the cursor manipulation device and a first multiplicity of events on the monitor. The datapoints and the events on the monitor occur while the icon travels between a first location and a second location on the monitor and the recording apparatus is also operative to identify the first and second locations. The system also includes apparatus for replicating the movement of the icon which includes apparatus for replaying the data points, apparatus for identifying a third location of the icon on the screen as a result of the replay of the data points and apparatus for causing the icon to move from the third location to the second location, if the third location is not generally identical to the second location.

10 Claims, 54 Drawing Sheets

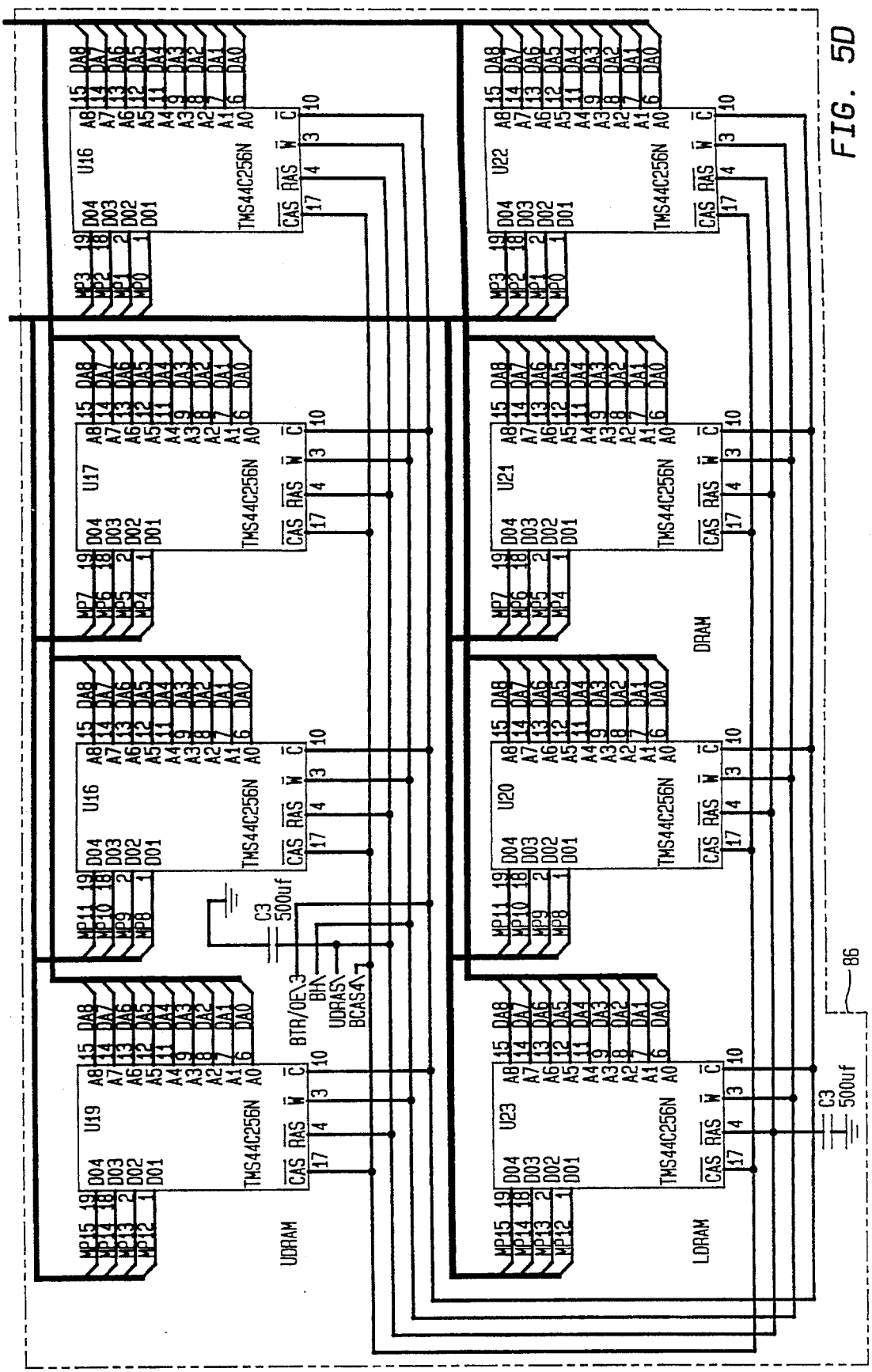

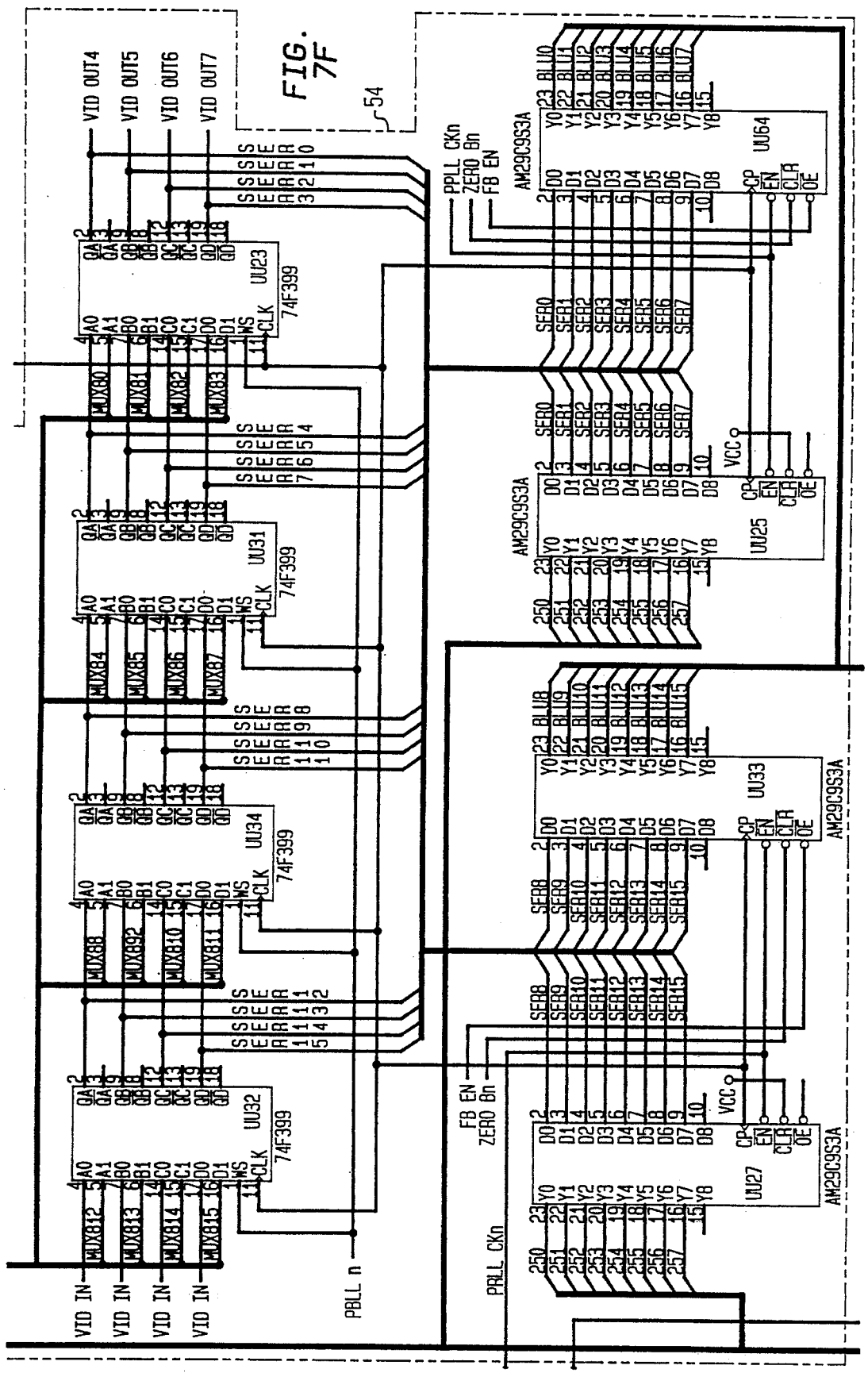

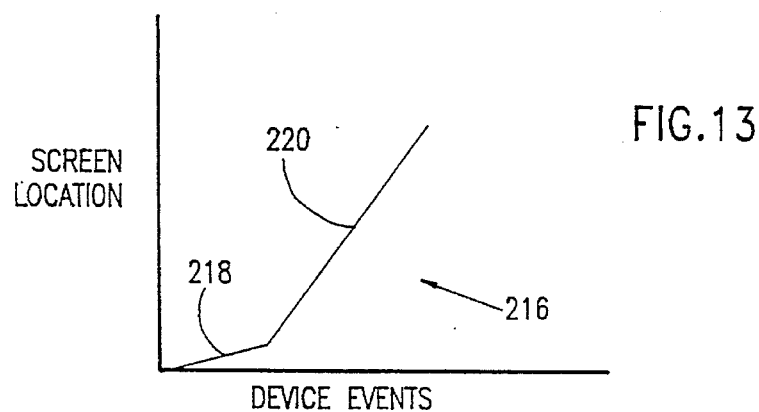
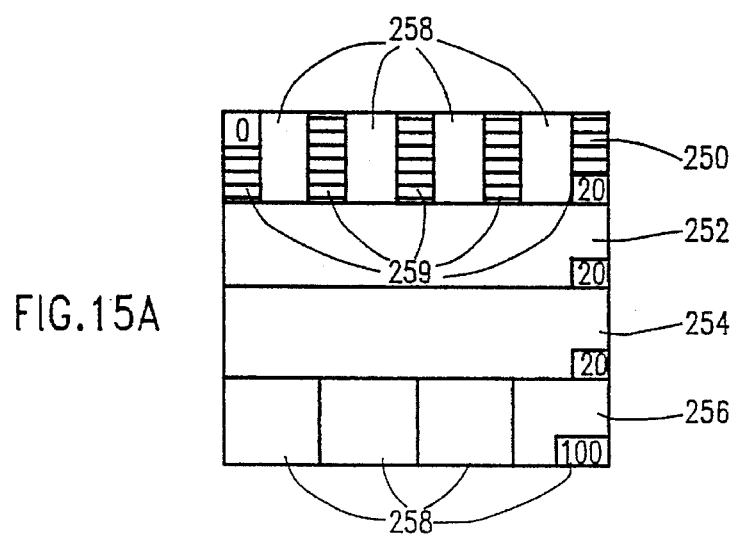
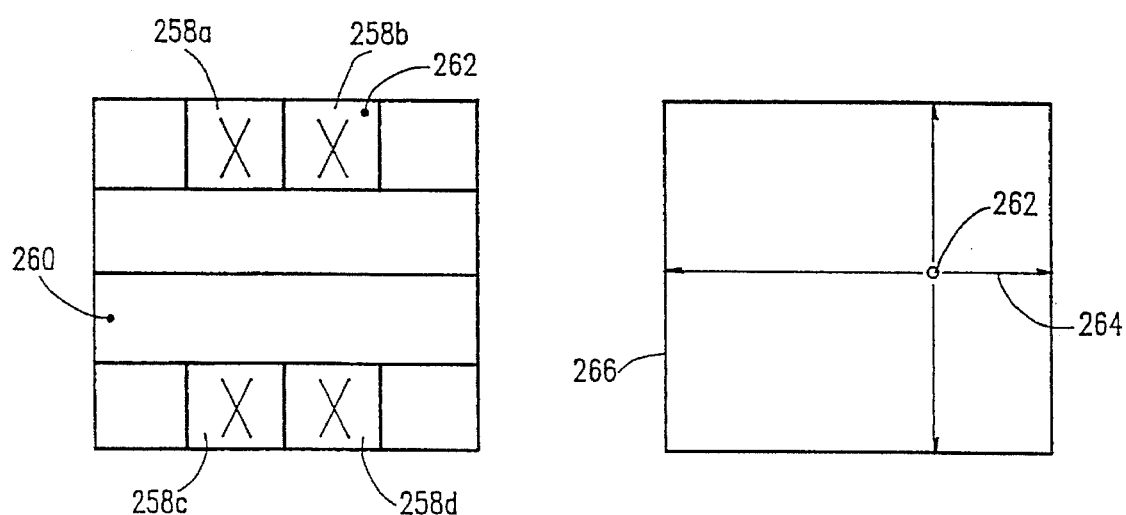

SYSTEM FOR AUTOMATIC TESTING OF COMPUTER SOFTWARE HAVING OUTPUT SYNCHRONIZATION AND CAPABLE OF RESPONDING TO ASYNCHRONOUS EVENTS

This is a continuation of application(s) Ser. No. 07/690,878 filed on Apr. 23, 1991, which is a continuation-in-part of Ser. No. 07/618,742 filed on Nov. 27, 1990, both abandoned.

FIELD OF THE INVENTION

The present invention relates to automatic testing systems for computer systems generally and in particular to testing of computer systems and applications utilizing cursor manipulators.

BACKGROUND OF THE INVENTION

There exist various test execution systems having the capability of recording and replaying input sequences to a system under test and comparing test results to a predefined captured ensemble.

The existing systems may be classified as either intrusive or non-intrusive. Most of the prior art systems are intrusive, in the sense that they employ resources of the system under test, such as CPU time, memory space and various device services. Some examples of such systems are:

Autotester, commercially available from Software Recording Corporation of Dallas, Tex.;

Check*Mate, commercially available from Cinnabar Software, a KMW Systems Company, of Austin, Tex.;

CapBak and SMARTS, both commercially available from Software Research, Inc. of San Francisco, Calif.;

TRAPS, commercially available from TravTech, Inc. of Hartford, Conn.; and

BLOODHOUND, commercially available from Goldbrick Software, of Fullerton, Calif.

A non-intrusive system also exists and is known as the "Evaluator" system and is commercially available from Elverex Ltd. of Limerick, Ireland.

None of the existing systems, whether intrusive or non-intrusive, samples raw frame buffer data. None of the existing systems is universal in that it can be used with any computer system.

It is desired, in computer systems testing applications, to be able to replicate a series of events which occurs during operation of a cursor manipulation device, such as a mouse or computerized stylus, in conjunction with a Central Processing Unit (CPU) and a monitor. In such a system, the location of the device with respect to the monitor is marked on the screen by a cursor or an icon.

Cursor manipulation devices can have absolute positioning or relative positioning where absolute positioning devices provide the precise coordinates of the location of the device and relative positioning devices provide the change in the location of the device. A mouse device typically utilizes relative positioning; computerized styluses typically utilize absolute positioning. For relative positioning devices, the entirety of the data is necessary to know exactly where the device is located.

The data from the device, herein termed "device events" can easily be stored and replayed. However, as is known in the art, due to a non-deterministic loss of device events, simply replaying the device events will not reliably repeat the motion of the icon on the screen. (i.e. the icon will not return to the same location on the screen). The loss typically occurs because recovery operations can occur at any point, and thus, the application software ignores part of the datastream from the cursor manipulation device when the software is occupied with other activities.

Some prior art systems ignore the abovementioned problem and simply replay the device events received from the mouse. Others attempt to solve the problem by assuming that the loss occurred between the CPU and the application and therefore, record the device events received from the mouse and transmitted between the CPU and the application. However, since the application itself ignores some of the device events, this solution still does not produce completely reliable responses.

The "Evaluator" is one such testing system which attempts to track and replicate mouse action.

SUMMARY OF THE INVENTION

The present invention seeks to provide an improved system fop carrying out automatic testing of computer software, including regression testing.

There is thus provided in accordance with a preferred embodiment of the present invention a system for automatic testing of computer software including interface apparatus communicating with a computer system under test, memory apparatus for storing inputs to be supplied to the system under test via the interface apparatus and for storing expected outputs to be received from the system under test via the interface apparatus in response to the inputs and comparison apparatus for indicating differences between the expected outputs and actual outputs and wherein the interface apparatus includes apparatus for sampling the contents of the frame buffer of the system under test.

There is also provided in accordance with a preferred embodiment of the present invention a system for automatic testing of computer software including interface apparatus communicating with a computer system under test, memory apparatus for storing inputs to be supplied to the system under test via the interface apparatus and for storing expected outputs to be received from the system under test via the interface apparatus in response to the inputs and comparison apparatus for indicating differences between the expected outputs and actual outputs.

There is also provided, in accordance with an embodiment of the present invention, a method for automatic testing of computer software including the steps of communicating via interface apparatus with a system under test loaded with software to be tested, storing inputs to be supplied to the system under test via the interface apparatus and storing expected outputs to be received from the system under test via the interface apparatus in response to the inputs and indicating differences between the expected outputs and actual outputs.

There is further provided, in accordance with the present invention, a method for automatic testing of computer software including the steps of communicating via interface apparatus with a system under test loaded with software to be tested, storing inputs to be supplied to the system under test via the interface apparatus and storing expected outputs to be received from the system under test via the interface apparatus in response to the inputs and indicating differences between the expected outputs and actual outputs by comparing the expected and actual frame buffer contents of the system under test.

Some of the principal features of a preferred embodiment of the present invention are summarized hereinbelow:

Sampling real pixel values from the frame buffer of the system under test;

Performing comparisons and other operations on frame buffer contents in Peal time;

Using screen signatures fop comparisons;

Capability for incremental error counting;

Screen stability detection;

Determination of minimum response time of system under test to given commands;

Hardware supported object recognition capability;

Simultaneous monitoring of multiple objects on a screen;

Ability to provide conditional testing;

Fast discrimination between similar objects; and

Capability to respond to asynchronous events.

There is also provided, in accordance with an embodiment of the present invention, a system for tracking and replicating the operation of a cursor manipulation device in a computer system, the computer system including a monitor and a cursor manipulation device having an icon representing the location of a cursor on the monitor. The system for tracking and replicating includes recording apparatus for capturing a plurality of data points transmitted by the cursor manipulation device and a first multiplicity of events on the monitor, the datapoints and the events on the monitor occurring while the icon travels between a first location and a second location on the monitor, the recording apparatus also being operative to identify the first and second locations and apparatus for replicating the movement of the icon which includes apparatus for replaying the data points, apparatus for identifying a third location of the icon on the screen as a result of the replay of the data points and apparatus for causing the icon to move from the third location to the second location, if the third location is not generally identical to the second location.

There is further provided, in accordance with an embodiment of the present invention, a system for tracking and replicating the operation of a cursor manipulation device in a computer system, the computer system including a monitor and a cursor manipulation device having an icon representing the location of a cursor on the monitor. The system for tracking and replicating includes capture apparatus for capturing a plurality of data points transmitted by the cursor manipulation device and a first multiplicity of events on the monitor, the datapoints and the events on the monitor occurring while the icon travels between a first location and a second location on the monitor, identification apparatus, utilizing the first multiplicity of events, for identifying at least the first and second locations, replaying apparatus for replaying the captured data points to cause the icon to travel between the first and a third location and for capturing a second multiplicity of events on the monitor and Feedback apparatus for causing the icon to travel between the third location and the second location.

Additionally, there is provided, in accordance with an embodiment of the present invention, a system for tracking the operation of a cursor manipulation device in a computer system, the computer system including a monitor and a cursor manipulation device having an icon representing the location of a cursor on the monitor. The system for tracking includes capture apparatus for capturing a plurality of data points transmitted by the cursor manipulation device and a first multiplicity of events on the monitor, the datapoints and the events on the monitor occurring while the icon travels between a first location and a second location on the monitor and identification apparatus, utilizing the first multiplicity of events, for identifying at least the first and second locations.

Further, in accordance with an embodiment of the present invention, the cursor manipulation device is a relative movement device. Alternatively, it is an absolute pointing device.

Still further, in accordance with an embodiment of the present invention, the apparatus for identifying utilizes an estimated location of the icon and an output to the screen.

Moreover, in accordance with an embodiment of the present invention, the apparatus for identifying include apparatus for preparing to identify operative while the icon travels between the first location to the second location and apparatus for performing the identification operative once the icon arrives at the second location.

Additionally, in accordance with an embodiment of the present invention, the first and second locations are track terminators.

Furthermore, in accordance with an embodiment of the present invention, the apparatus for identifying includes apparatus for actively searching the output to the screen.

Still further, in accordance with an embodiment of the present invention, the feedback apparatus includes apparatus for providing artificial cursor manipulation data points corresponding to the distance between the second and third locations.

Additionally, in accordance with an embodiment of the present invention, the system includes apparatus for learning shape characteristics of an icon. The apparatus for learning shape characteristics of an icon also includes apparatus for identifying the location of a hotpoint of the icon.

There is also provided, in accordance with an embodiment of the present invention, a method for tracking and replicating the operation of a cursor manipulation device in a computer system, the computer system including a monitor and a cursor manipulation device having an icon representing the location of a cursor on the monitor. The method includes the steps of capturing a plurality of data points transmitted by the cursor manipulation device and a first multiplicity of events on the monitor, the datapoints and the events on the monitor occurring while the icon travels between a first location and a second location on the monitor, and identifying the first and second locations and replicating the movement of the icon. The step of identifying includes the steps of replaying the data points, identifying a third location of the icon on the screen as a result of the replay of the data points and causing the icon to move from the third location to the second location, if the third location is not generally identical to the second location.

There is further provided, a method fop tracking and replicating the operation of a cursor manipulation device in a computer system, the computer system comprising a monitor and a cursor manipulation device having an icon representing the location of a cursor on the monitor. The method for tracking and replicating includes the steps of capturing a plurality of data points transmitted by the cursor manipulation device and a first multiplicity of events on the monitor, the datapoints and the events on the monitor occurring while the icon travels between a First location and a second location on the monitor, identifying at least the first and second locations by utilizing the first multiplicity of events, replaying the captured data points to cause the icon to travel between the first and a third location, capturing a second multiplicity of events on the monitor, and artificially causing the icon to travel between the third location and the second location.

Finally, there is provided, in accordance with an embodiment of the present invention, a method for tracking the operation of a cursor manipulation device in a computer system, the computer system comprising a monitor and a cursor manipulation device having an icon representing the location of a cursor on the monitor. The method fop tracking includes the steps of capturing a plurality of data points transmitted by the cursor manipulation device and a first multiplicity of events on the monitor, the datapoints and the events on the monitor occurring while the icon travels between a first location and a second location on the monitor and identifying at least the first and second locations by utilizing the first multiplicity of events.

BRIEF DESCRIPTION OF THE DRAWINGS

The present invention will be understood and appreciated more fully from the following detailed description, taken in conjunction with the drawings in which:

FIGS. 5A–E are schematic illustration of the graphic processor forming part of the system of FIG. 1;

FIGS. 7A–L are schematic illustration of the RT video ALU forming part of the system of FIG. 1;

FIG. 12A illustrates the recording operation and FIG. 12B illustrates the repeating operation;

FIG. 13 is a graphical illustration of a functional relationship between a cursor manipulation device and locations on a monitor;

FIGS. 15A and 15B are illustrations of block operations on a frame of an image useful in understanding the calculations of the flow chart of FIG. 14B;

FIG. 16 is an illustration of the limits of a passive search algorithm of FIG. 14B;

FIG. 17 is an illustration of an icon and its change points, useful in understanding the methods of FIGS. 14A, 14B 14C;

DETAILED DESCRIPTION OF A PREFERRED EMBODIMENT

Figure 1:
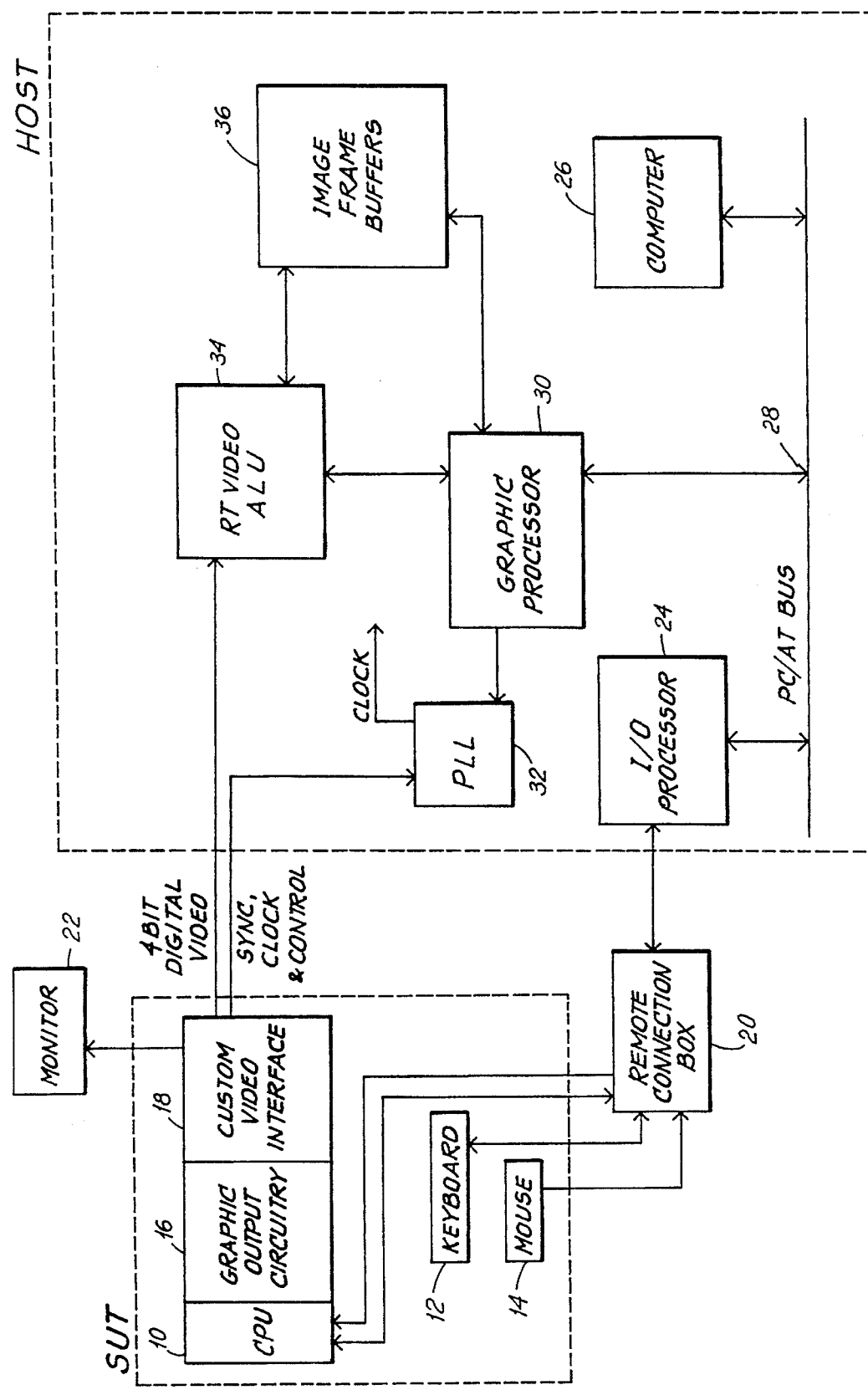
FIG. 1 is a block diagram illustrating an automatic testing system constructed and operative in accordance with a preferred embodiment of the invention.

Reference is now made to FIG. 1 which illustrates a test system constructed and operative in accordance with a preferred embodiment of the present invention. The system of the present invention is intended to test a system under test including hardware and software loaded into a CPU 10, which typically has associated therewith a keyboard 12, a cursor manipulation device 14, such as a mouse, a pen and tablet or a stylus, and graphics output circuitry 16. In accordance with a preferred embodiment of the present invention, a custom video interface 18, which will be described in detail hereinbelow, is installed in the SUT at the time of testing.

For personal computers, based on the DOS operating system, the graphics output circuitry 16 is typically a Video Graphics Adaptor (VGA). It is appreciated that the present invention is not limited to personal computers or to systems employing VGA. The custom video interface 18 is designed to translate the data of the graphics output circuitry 16 into a format used by the apparatus of the present invention.

For the purposes of the present specification and claims, the CPU 10, interface 18, keyboard 12 and mouse 14, to the extent that they are present, are included in the "system under test" (SUT), as indicated by a broken line. The custom video interface 18 is included within the broken line since it typically resides within the SUT.

The SUT is tested by the system of the present invention, denoted on FIG. 1 by the word "Host" and included within a broken line. A remote connection box 20, described hereinbelow in more detail, is, for the purposes of the present specification, also part of the Host system.

In accordance with a preferred embodiment of the present invention, the keyboard 12 and mouse 14 are connected to the CPU 10 by means of the remote connection box 20. The remote connection box 20 is, in turn, connected to the serial and/or parallel inputs of the CPU 10. A monitor 22 is associated with the CPU 10 via the VGA 16.

Associated with the remote connection box 20, for providing thereto input instructions for the CPU 10 is an I/O processor 24, which will be described hereinbelow in detail. The I/O processor 24 communicates with a host computer CPU 26 via a PC/AT bus 28.

A graphic processor 30 interfaces with PC/AT bus 28 and also, via Phase Lock Loop (PLL) circuitry 32 and custom video interface 18, with the graphics circuitry 16. Graphic processor 30, which will be described hereinbelow in detail, cooperates with a Real Time (RT) video Arithmetic Logic Unit (ALU) 34, which is coupled with the custom video interface 18 by means of a 4 bit digital video link. Video ALU 34 also cooperates with image frame buffers 36, which also interface with the graphic processor 30. PLL 32 provides synchronization, timing and control signals.

The overall operation of the apparatus of FIG. 1 will now be briefly summarized. The host computer 26 is operative to record and store input events from the mouse 14 and keyboard 12 of the SUT via the remote connection box 20 and the I/O processor 24, during test preparation.

Host computer 26 replays input events to the SUT via the I/O processor 24 and the remote connection box 20. The I/O processor 24, controlled by the host computer 26 via PC/AT-Bus 28, also has the capability to record and replay timing intervals between the input events.

Screens appearing on the monitor 22 of the SUT are captured via video interface 18 and RT video ALU 34 to the image frame buffers 36 while the PLL 32 provides correct sampling clock inputs.

Specific functions such as screen comparisons, screen compacting and object recognition, are performed on the RT video ALU 34 and image frame buffers 36, controlled by the graphic processor 30 which, in turn, is controlled by the host computer 26 via PC/AT bus 28.

Host computer 26 coordinates all the input activity via the I/O processor 24, and the output activity via the graphic processor 30.

Figure 2A:
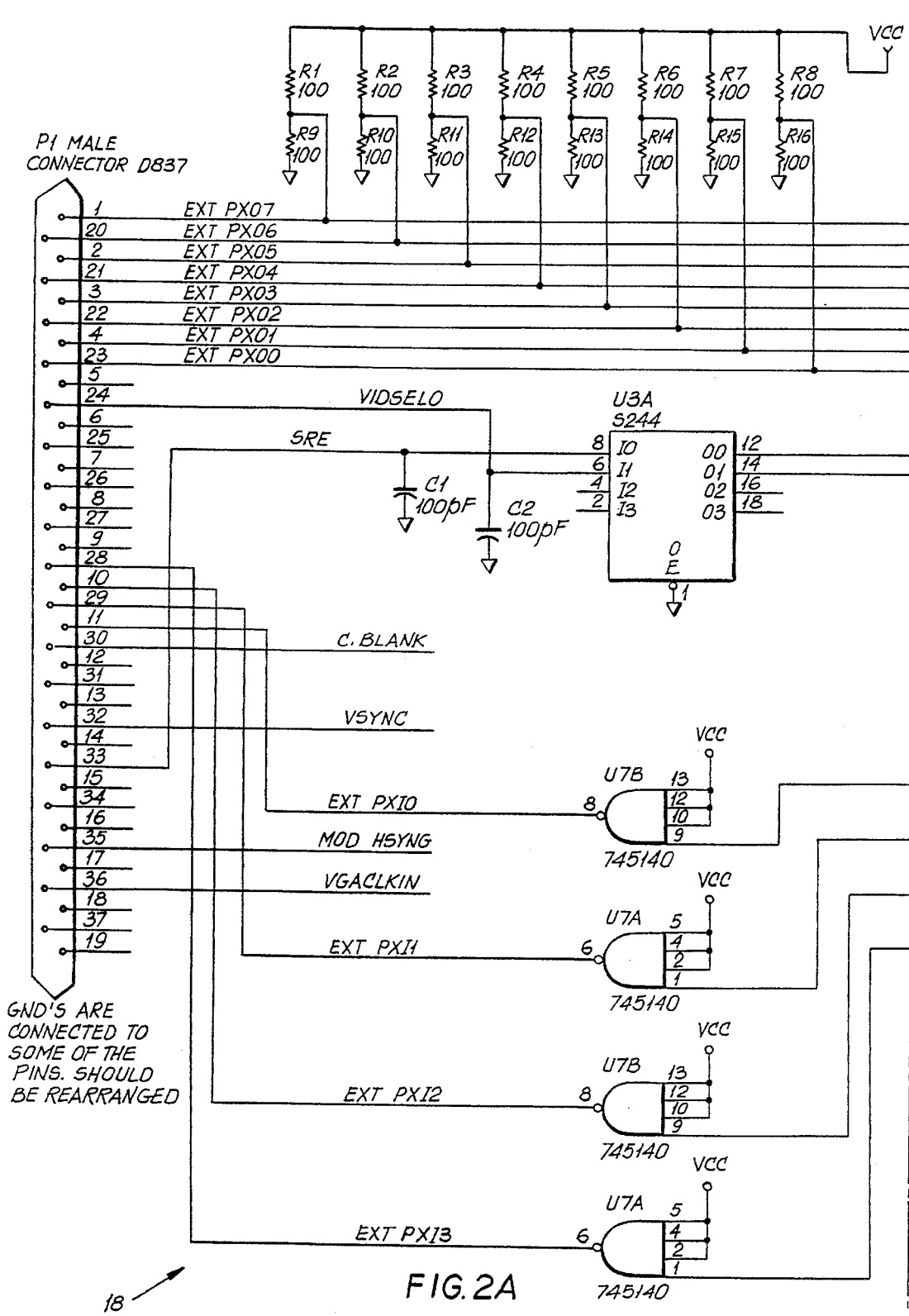
FIGS. 2A–C are schematic illustration of a VGA adapter forming part of the system of FIG. 1.
Figure 2B:
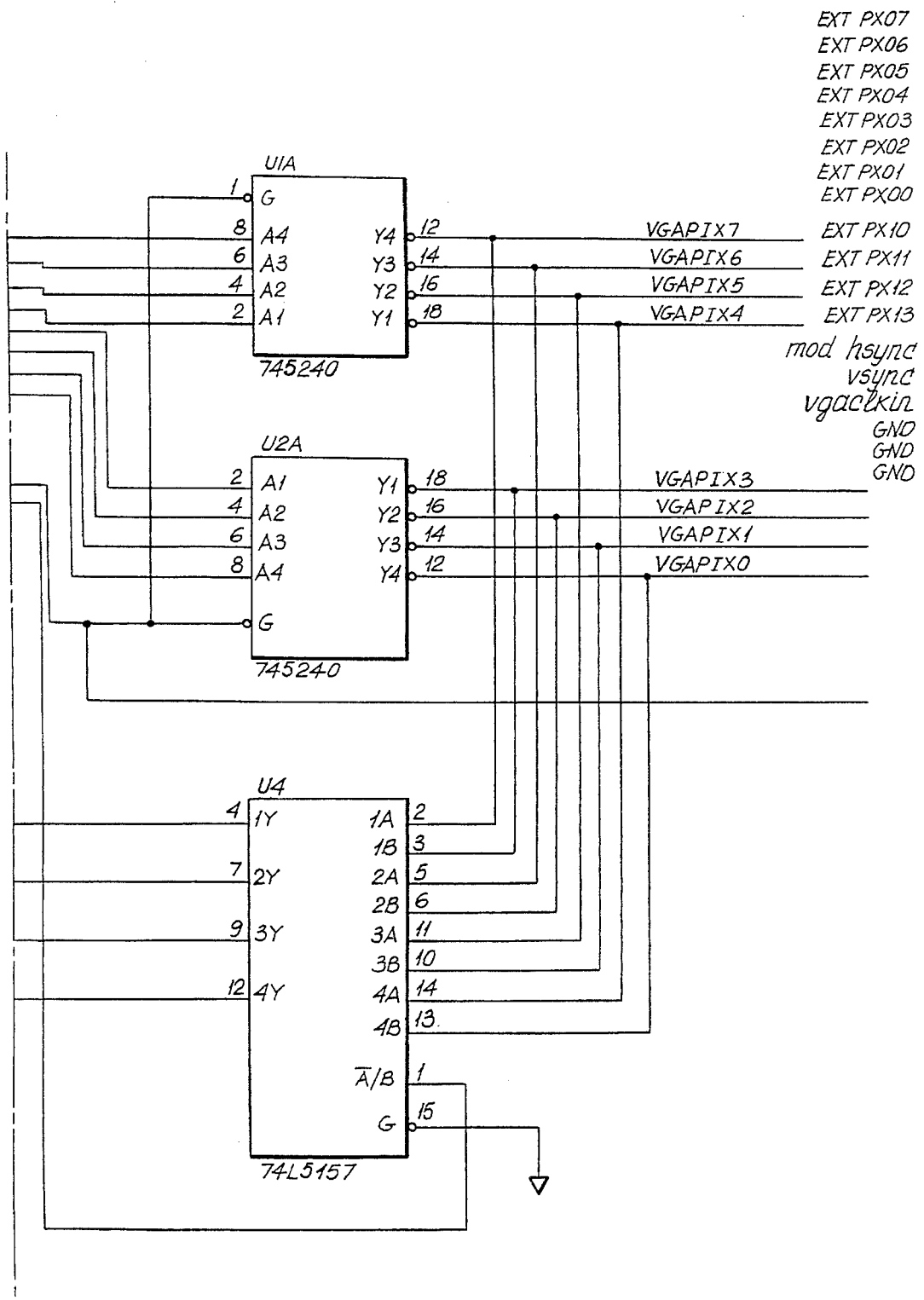
Figure 2C:
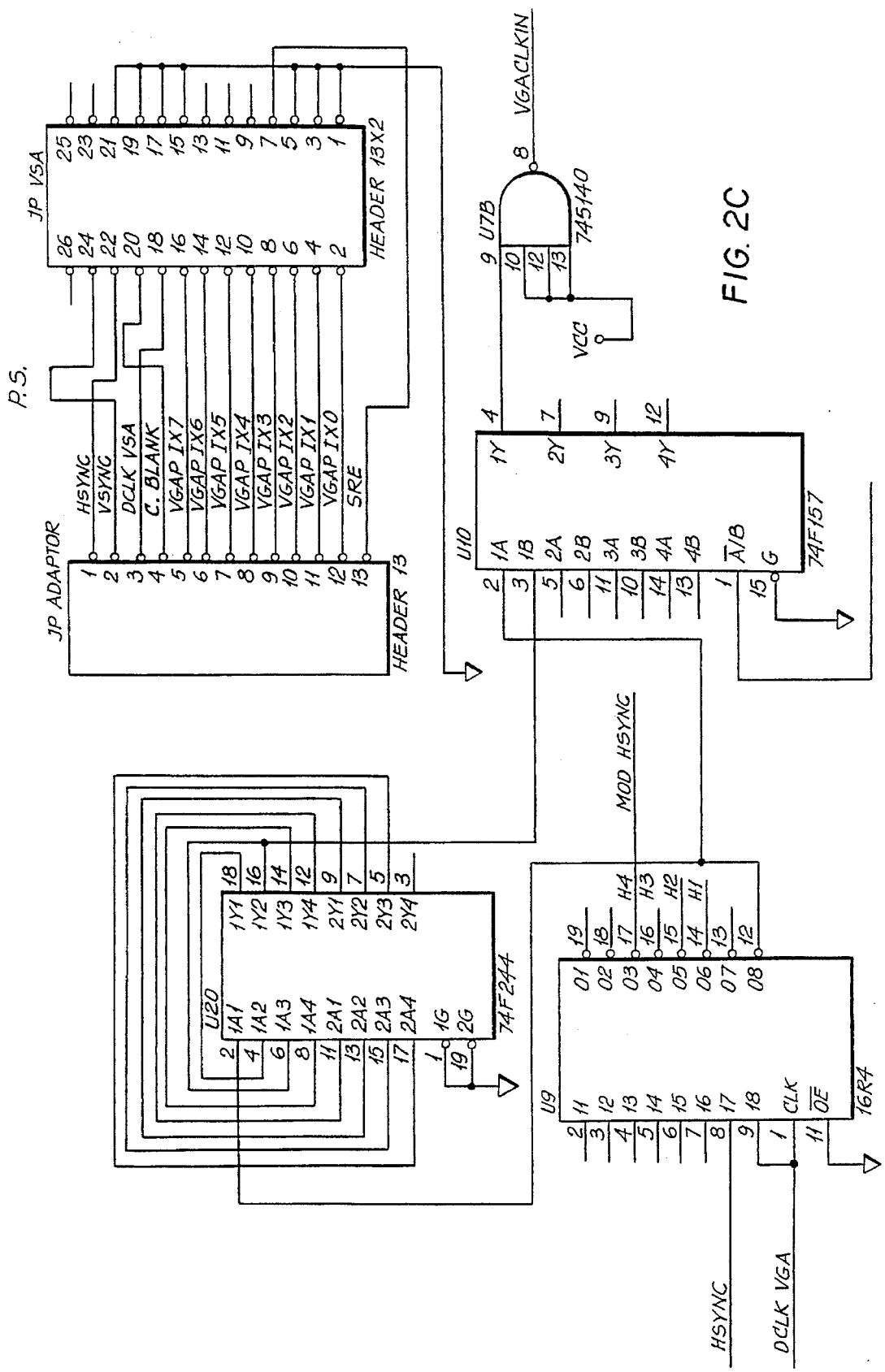

Reference is now made to FIGS. 2A–2C, which illustrate in schematic form video interface circuitry 18, customized to match graphic circuitry 16. In the example shown in FIGS. 2A–2C, graphic circuitry 16 is VGA. The full specification of all of the circuit components appears in the drawing and therefore, for reasons of conciseness, a verbatim description thereof is not provided here.

Figure 3A:
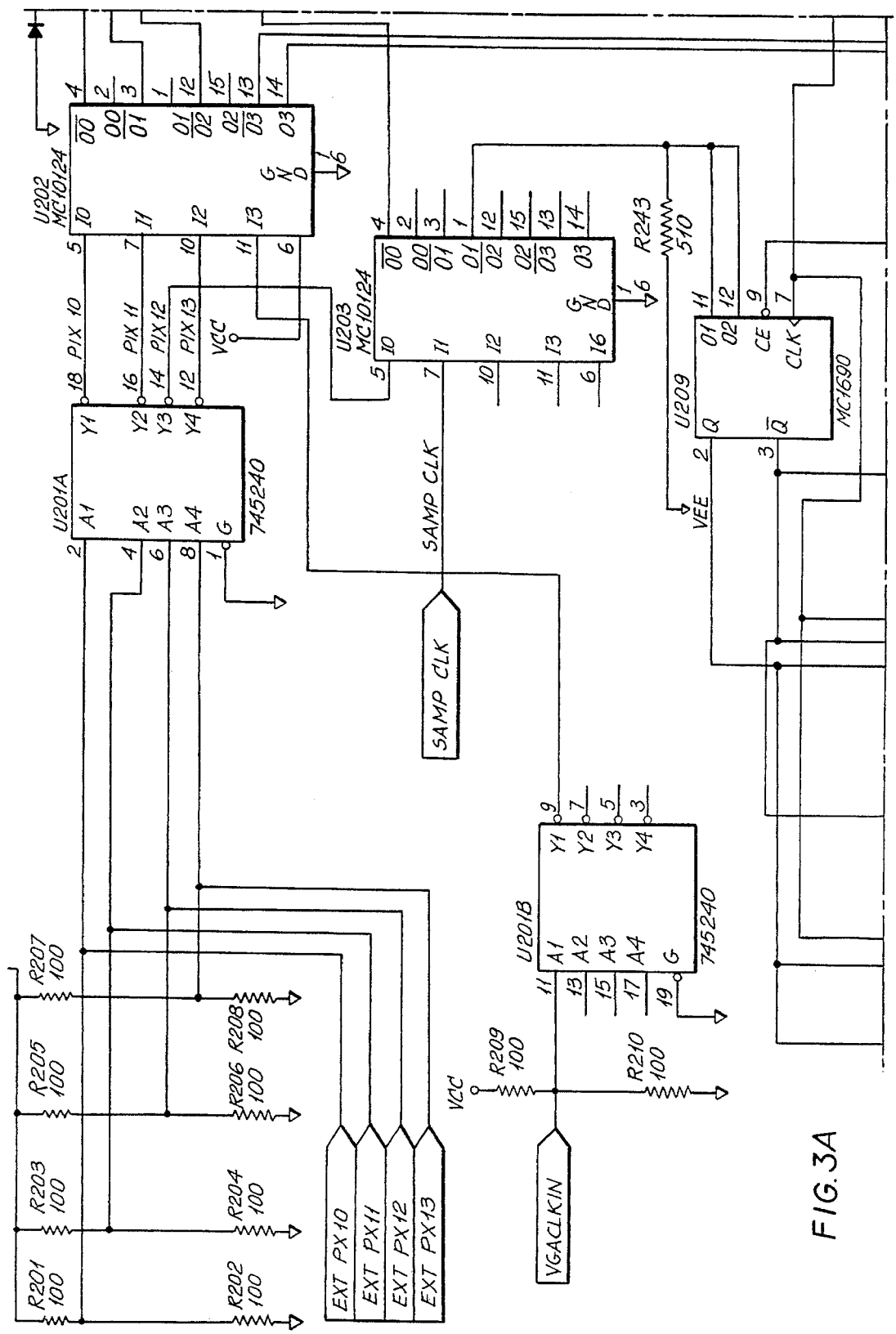
FIGS. 3A–D are schematic illustration of phase lock loop circuitry forming part of the system of FIG. 1.
Figure 3B:
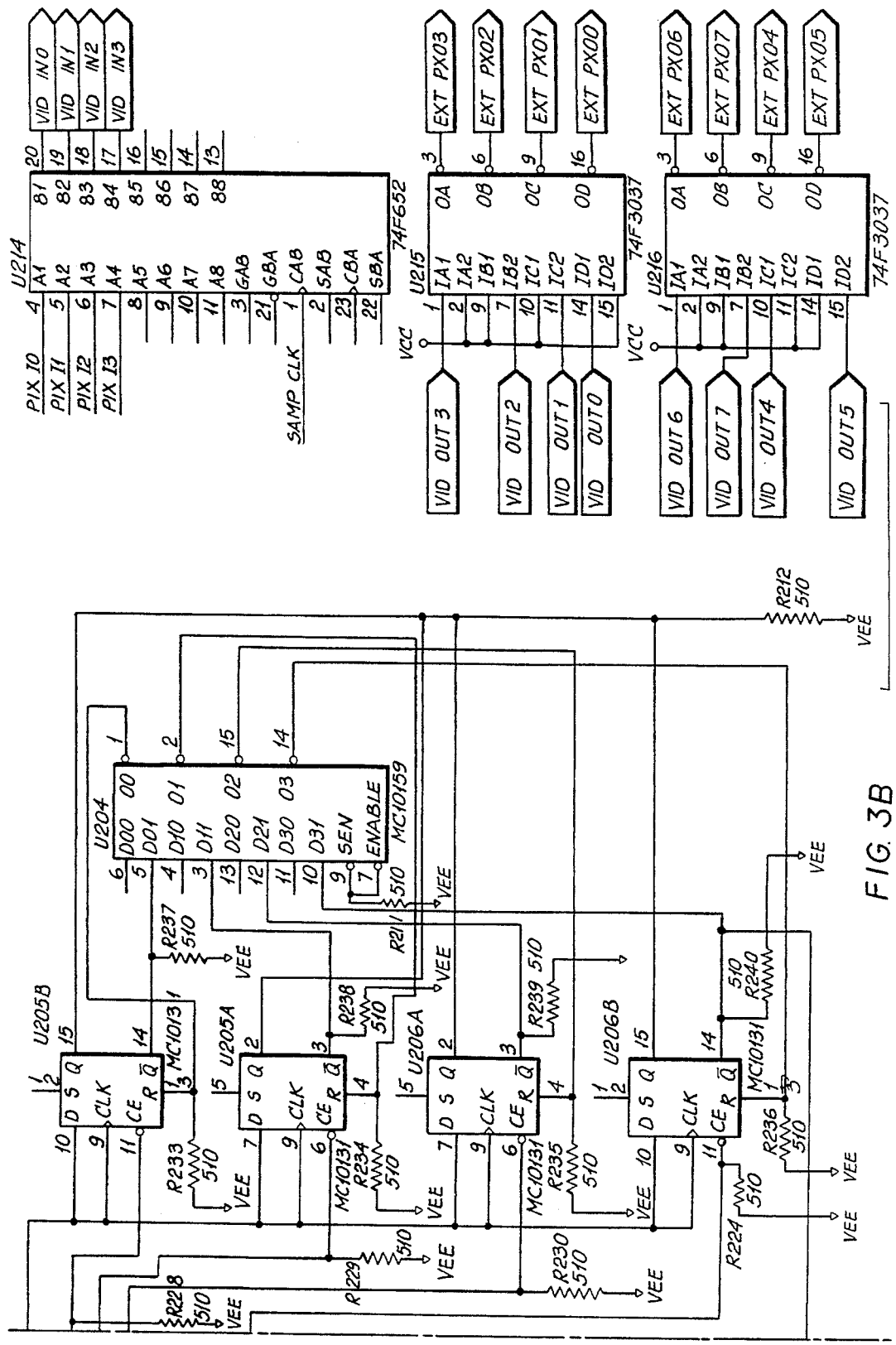
Figure 3C:
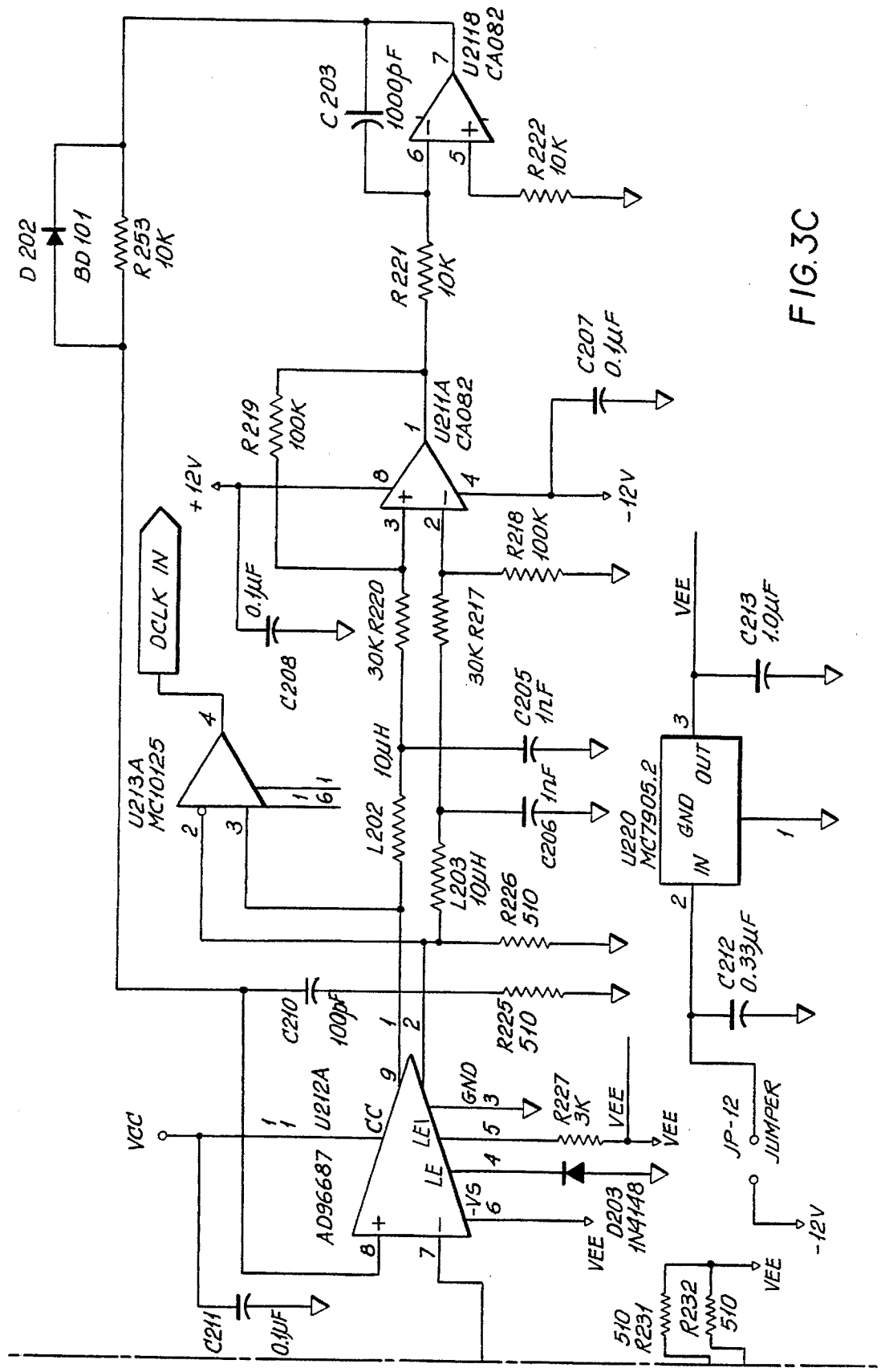
Figure 3D:
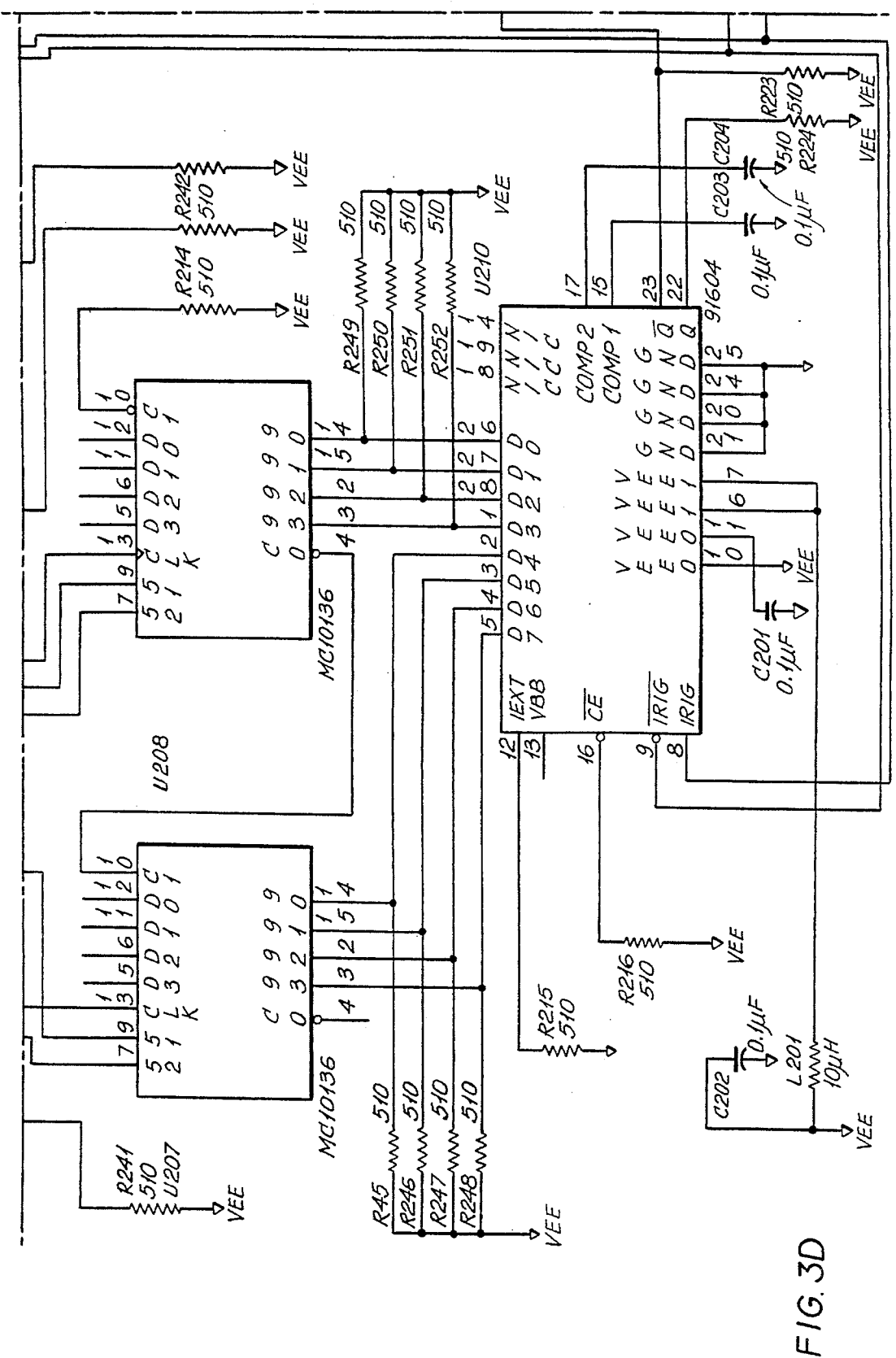

Reference is now made to FIGS. 3A–3C, which illustrate PLL circuitry 32 in schematic form. The full specification of all of the circuit components appears in the drawing and therefore, for reasons of conciseness, a verbatim description thereof is not provided here.

Figure 4A:
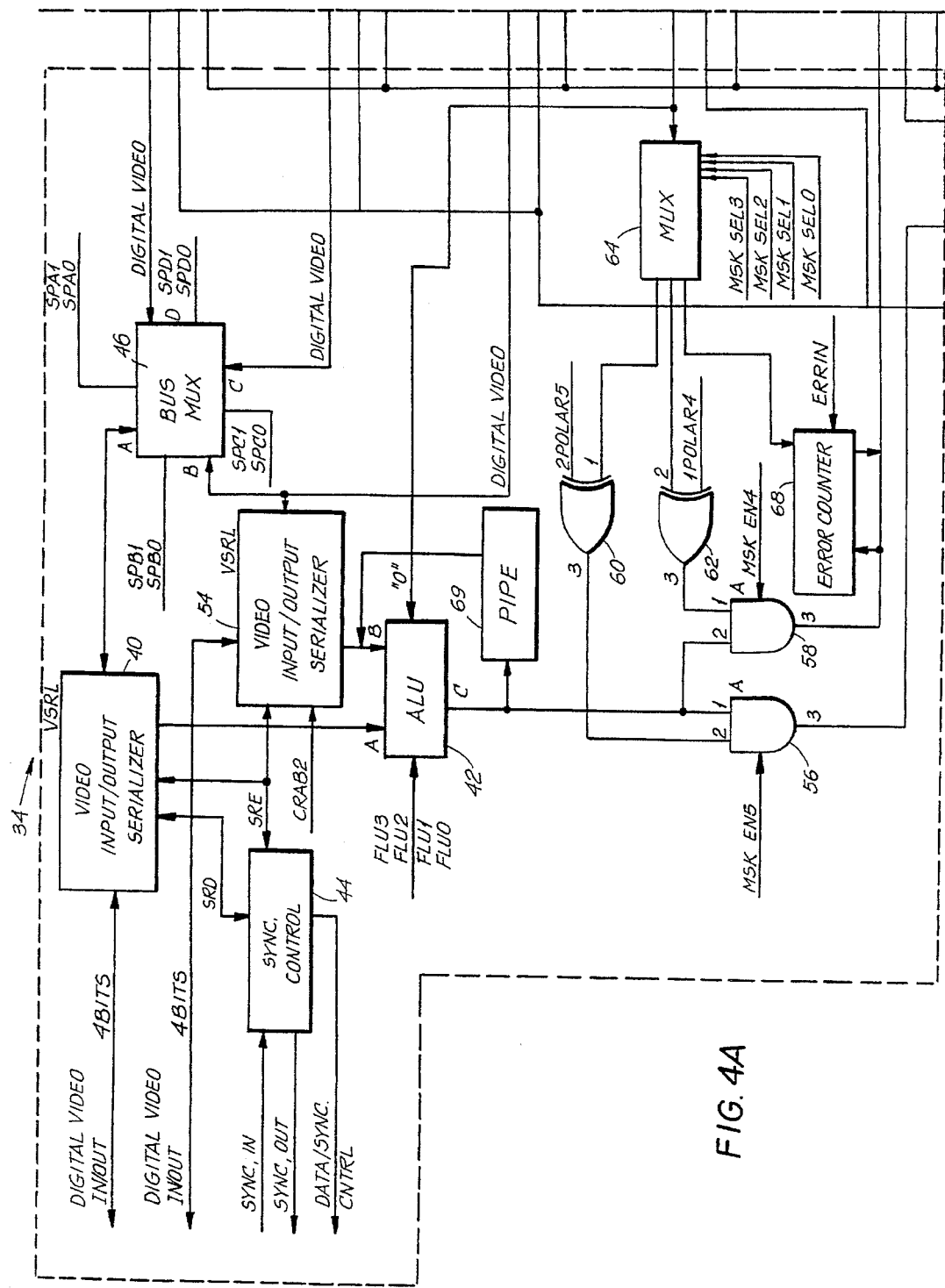
FIGS. 4A–B are intermediate level block diagram illustrations of an RT video ALU, a graphic processor and image frame buffers forming part of the system of FIG. 1.
Figure 4B:
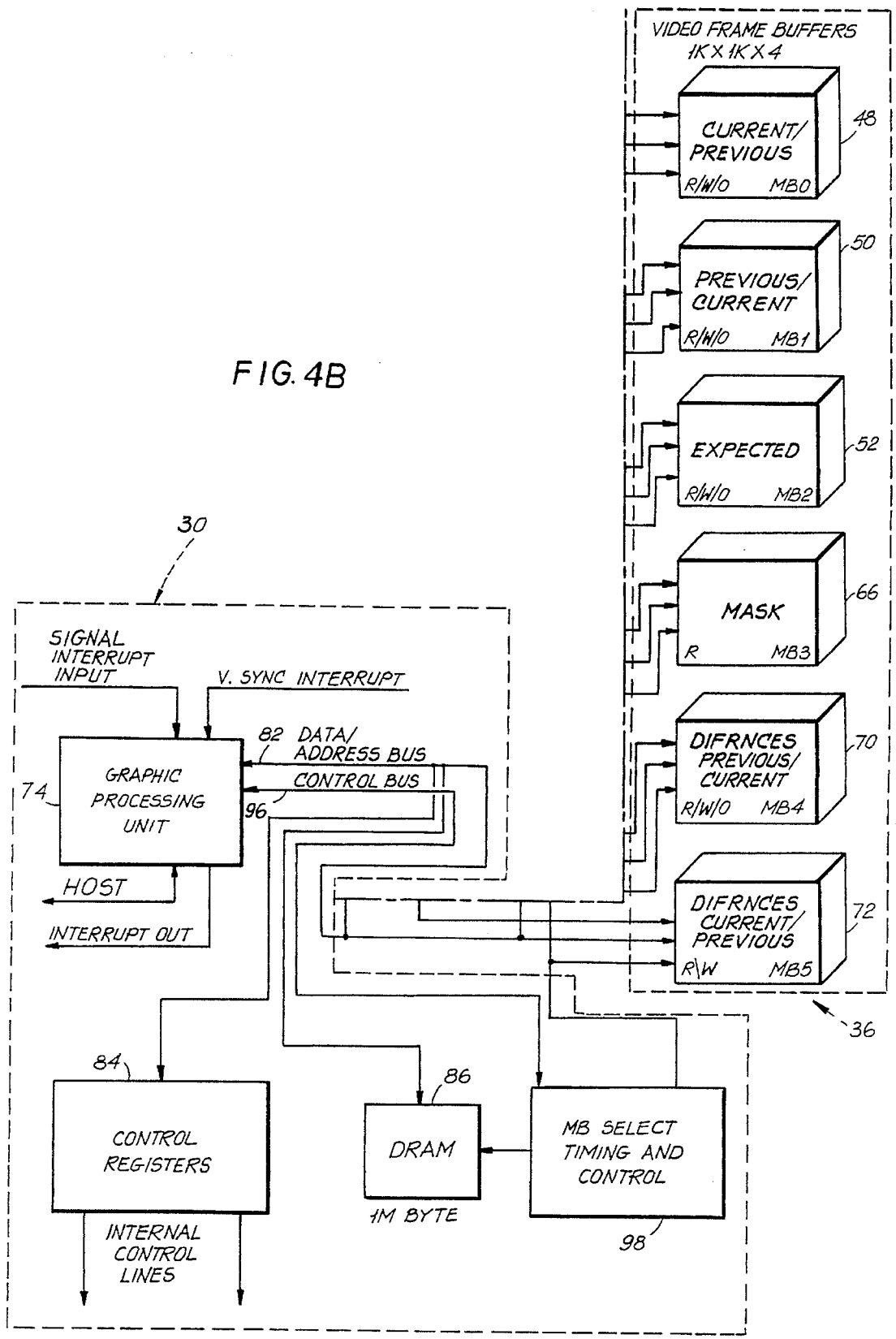
Figure 5A:
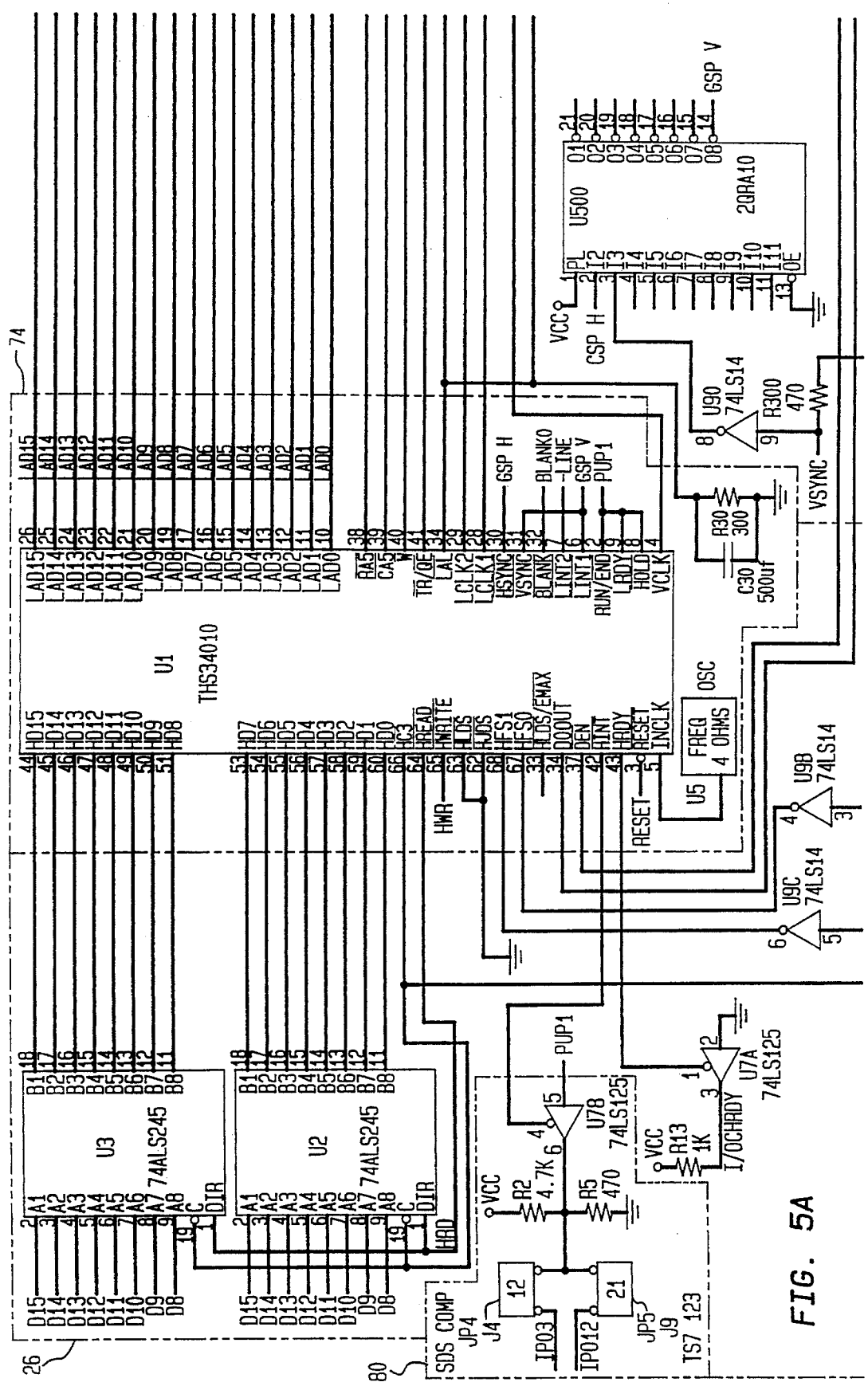
Figure 5B:
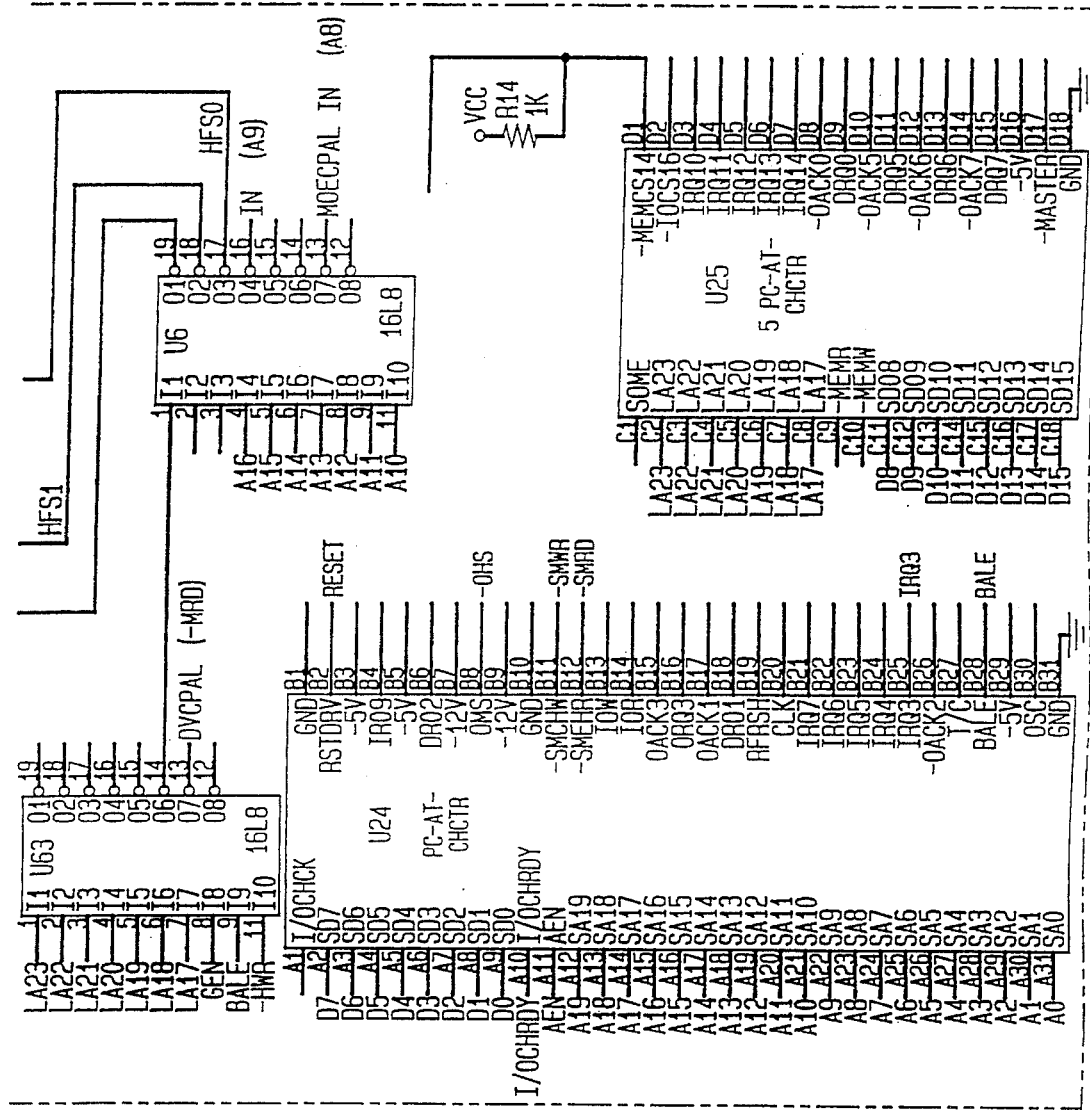
Figure 5C:
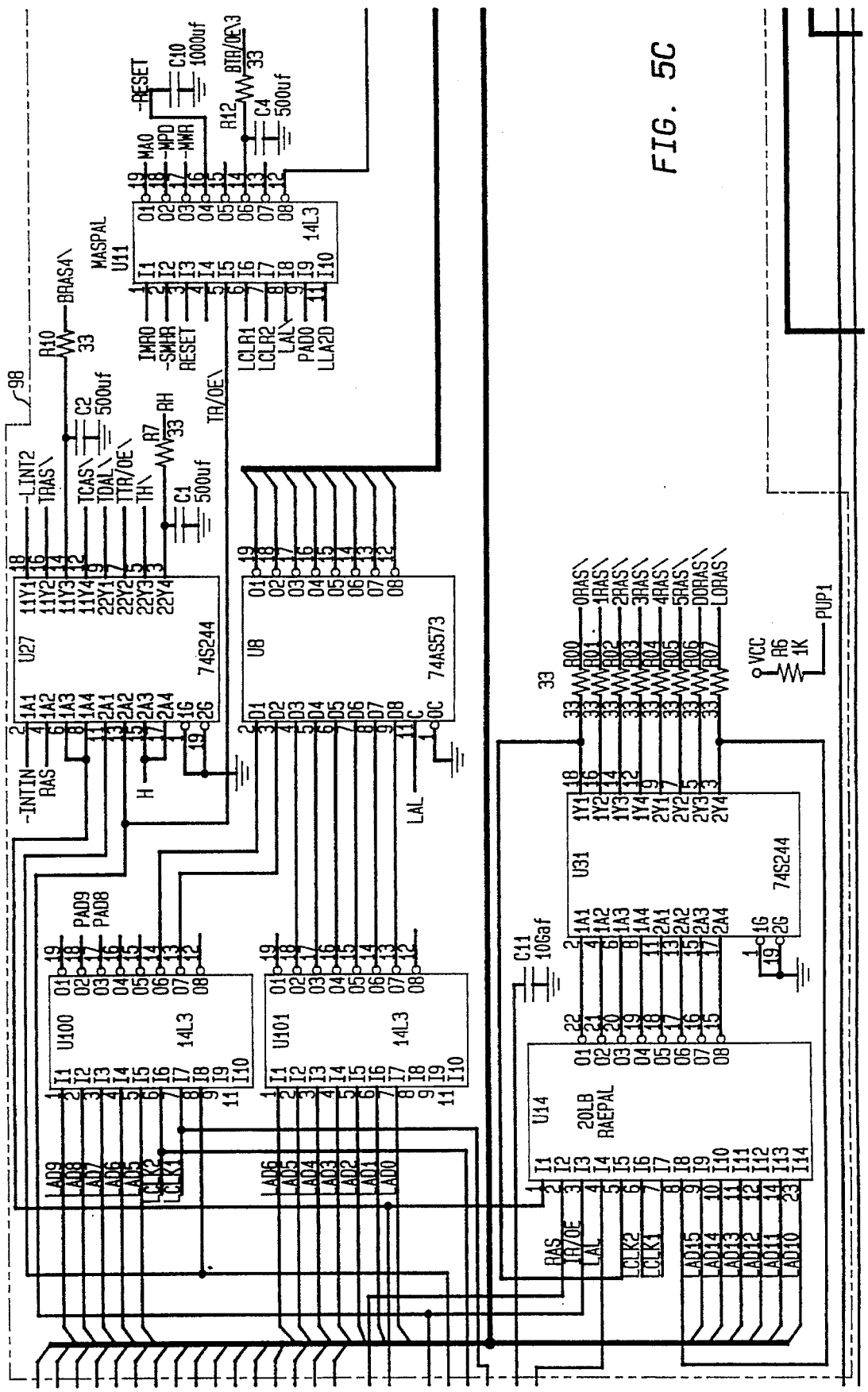
Figure 5E:
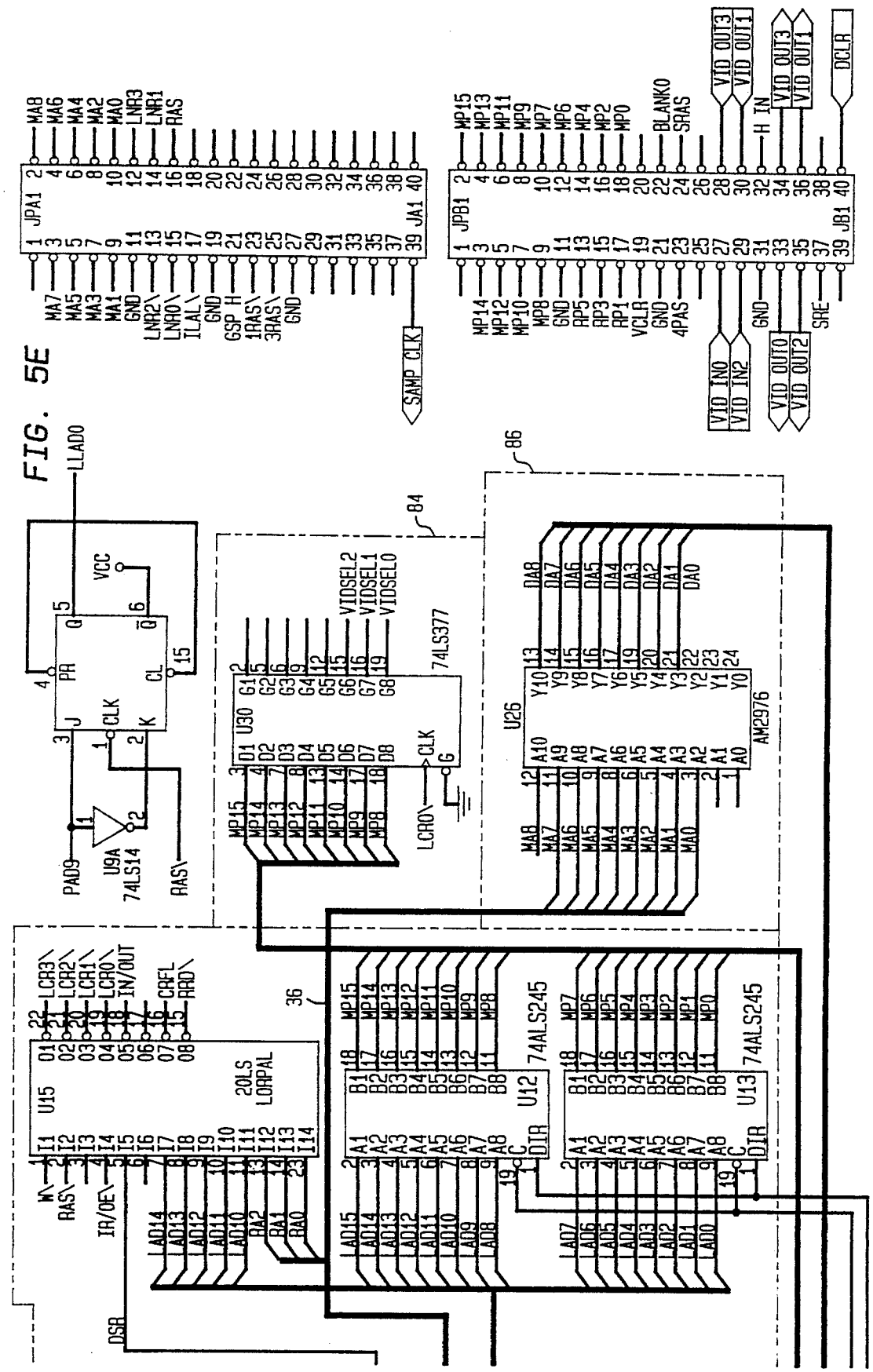
Figure 6A:
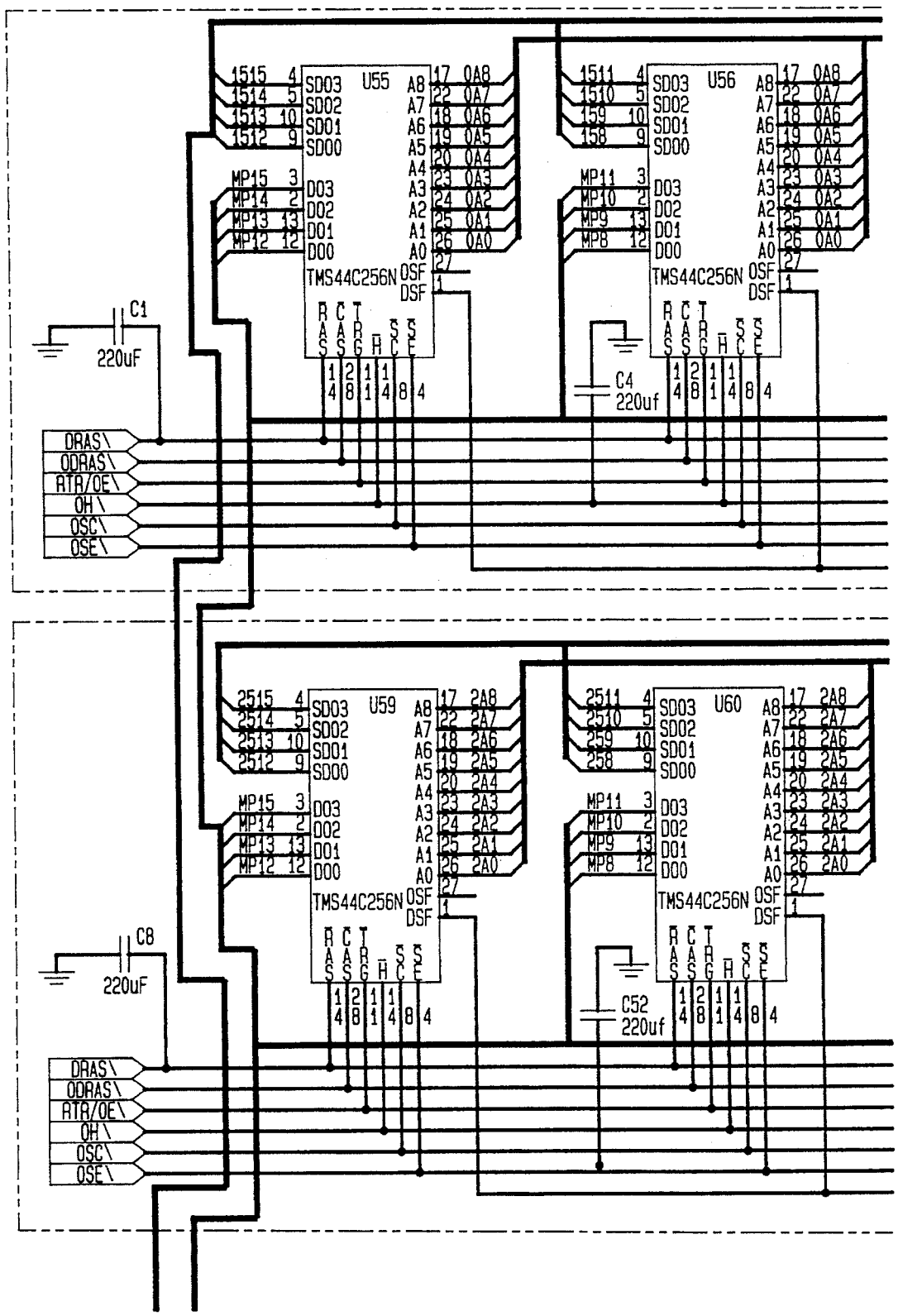
FIGS. 6A–H are schematic illustration of the image frame buffers forming part of the system of FIG. 1.
Figure 6B:
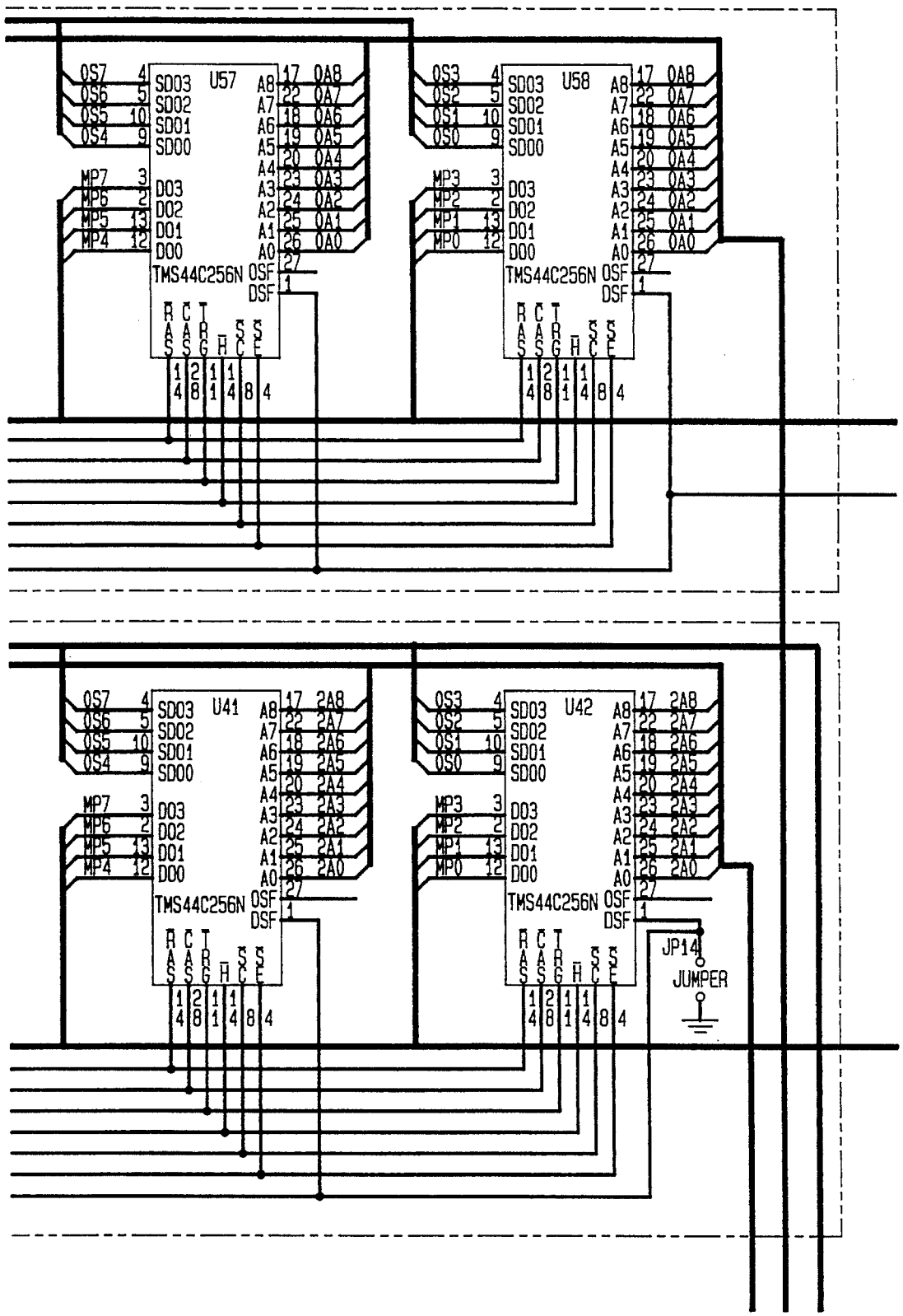
Figure 6C:
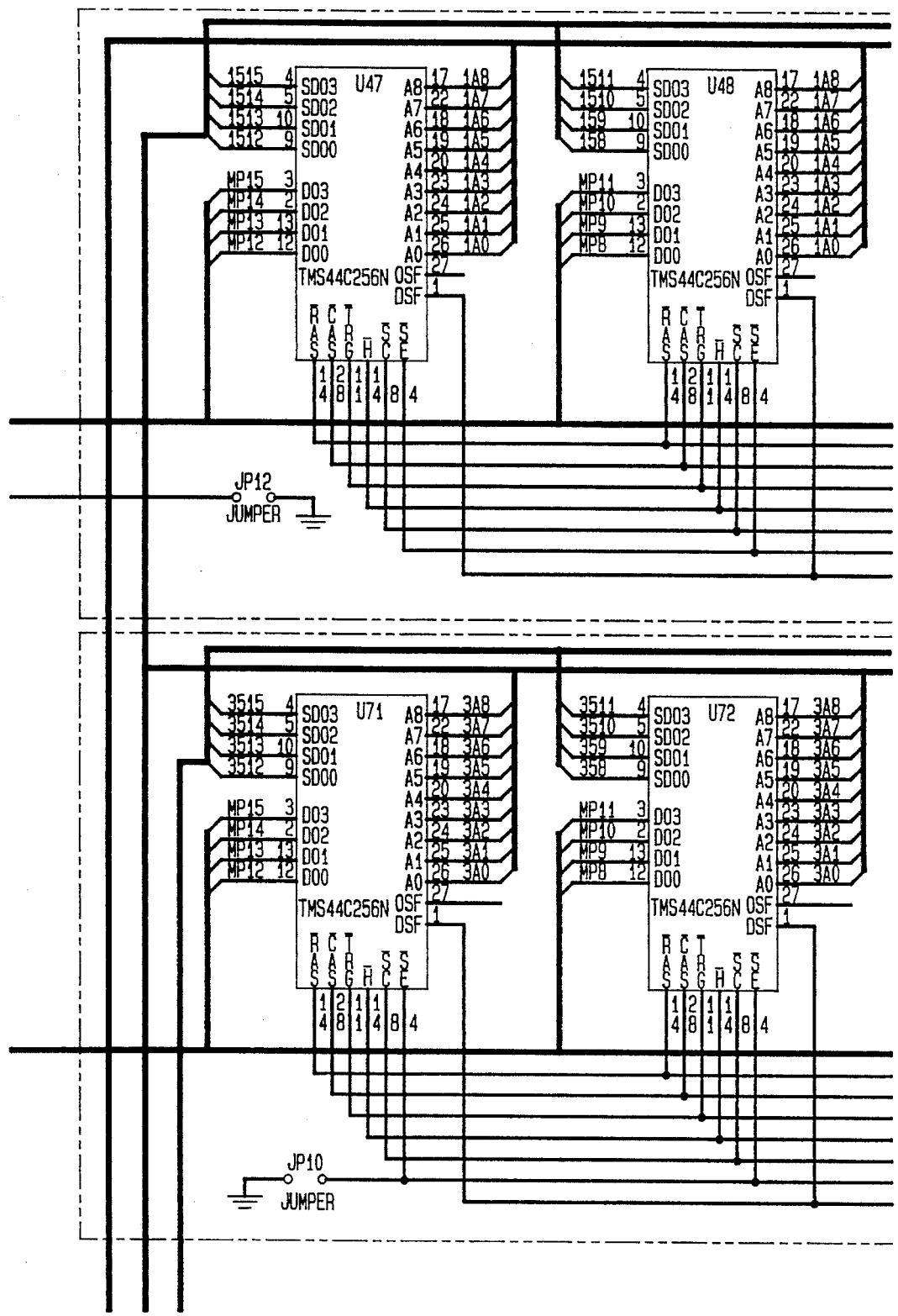
Figure 6D:
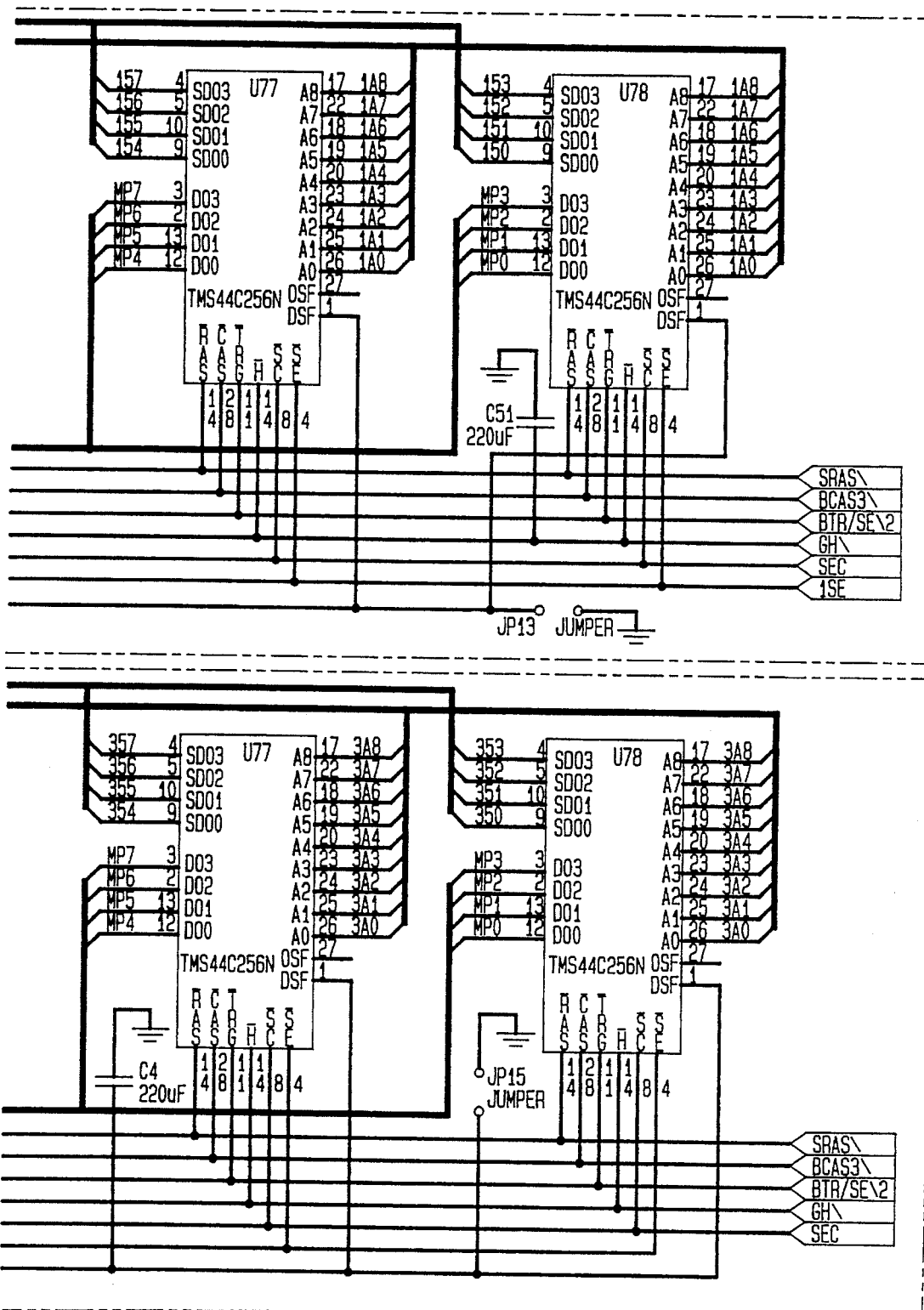
Figure 6E:
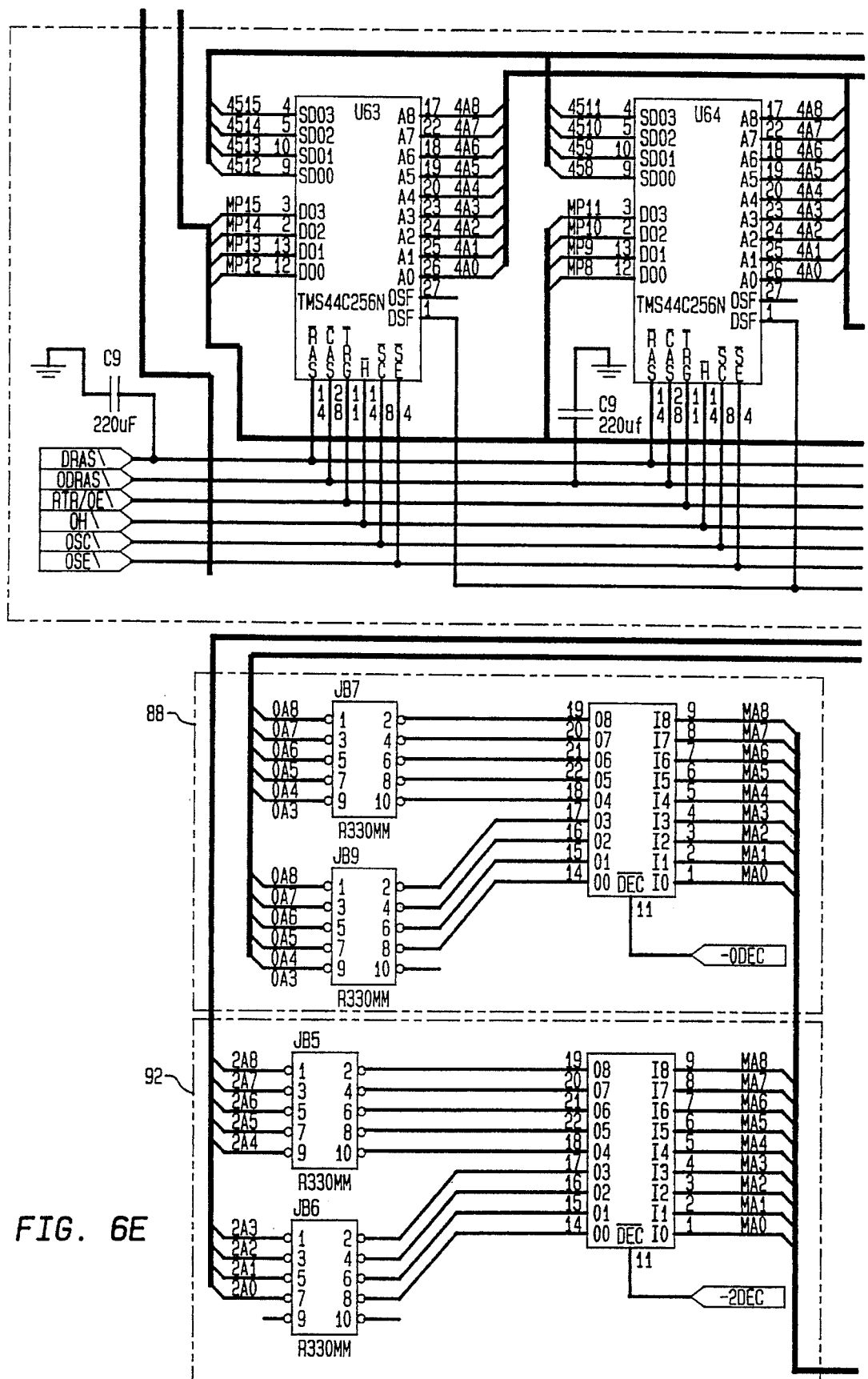
Figure 6F:
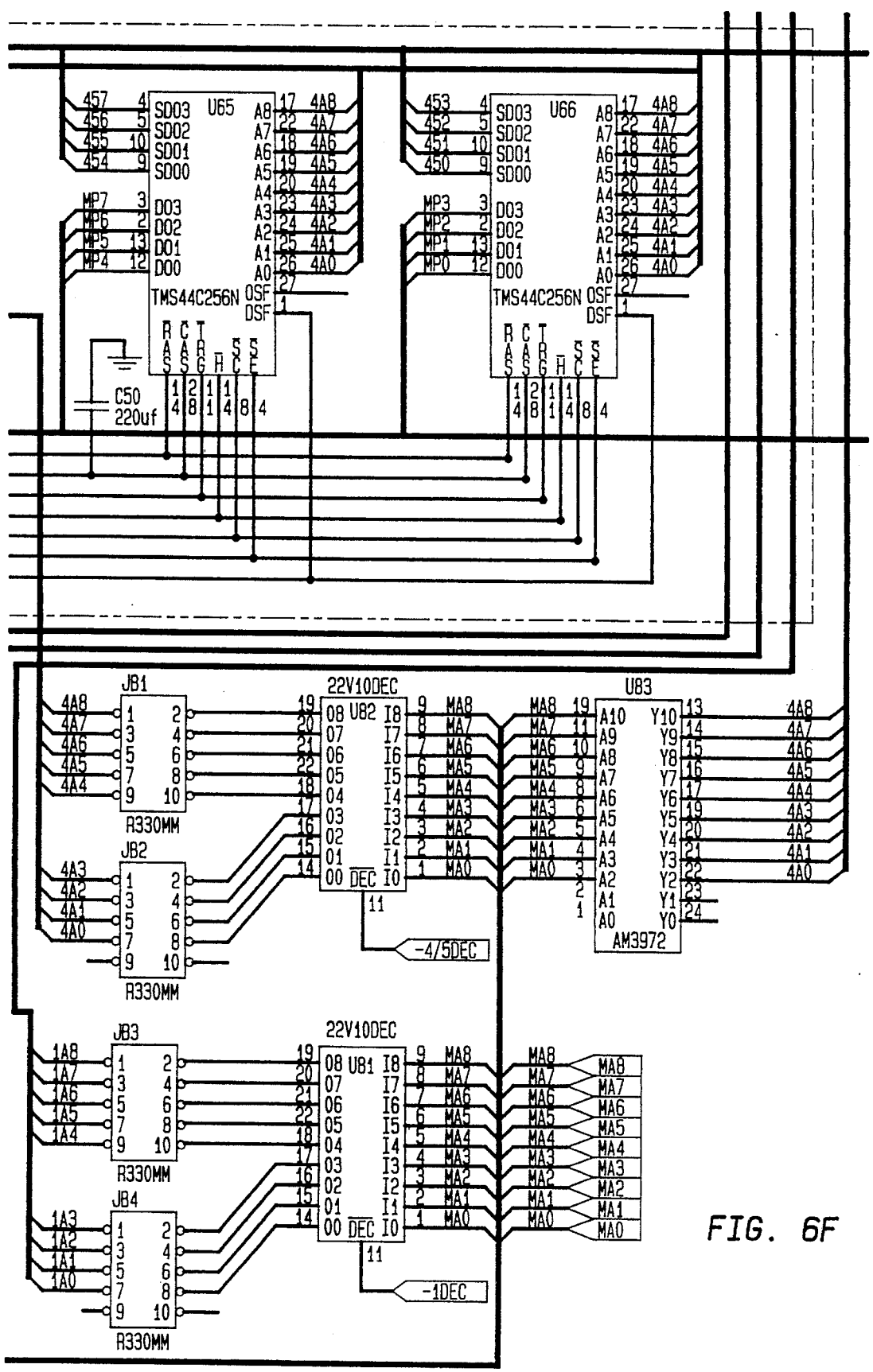
Figure 6G:
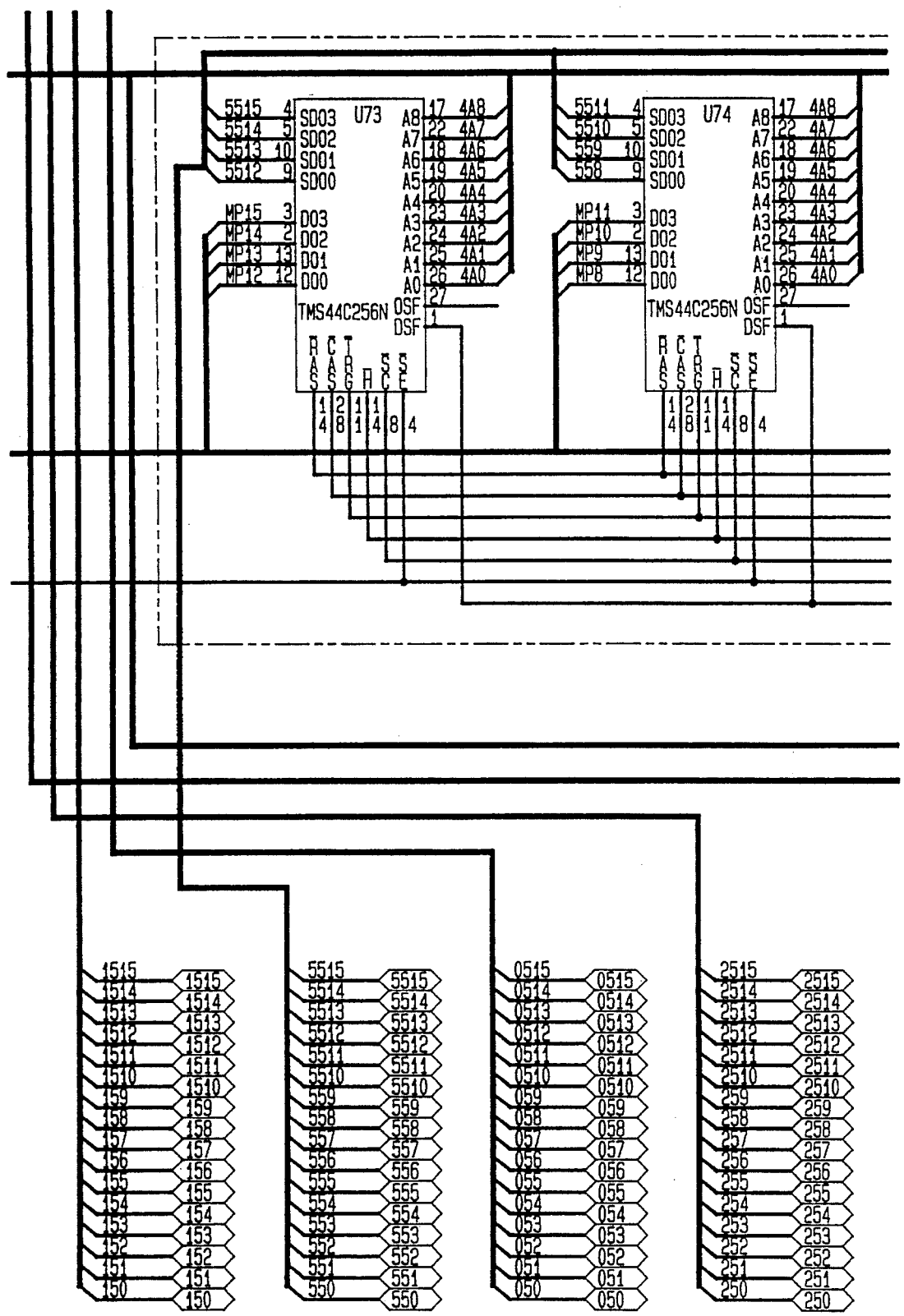
Figure 6H:
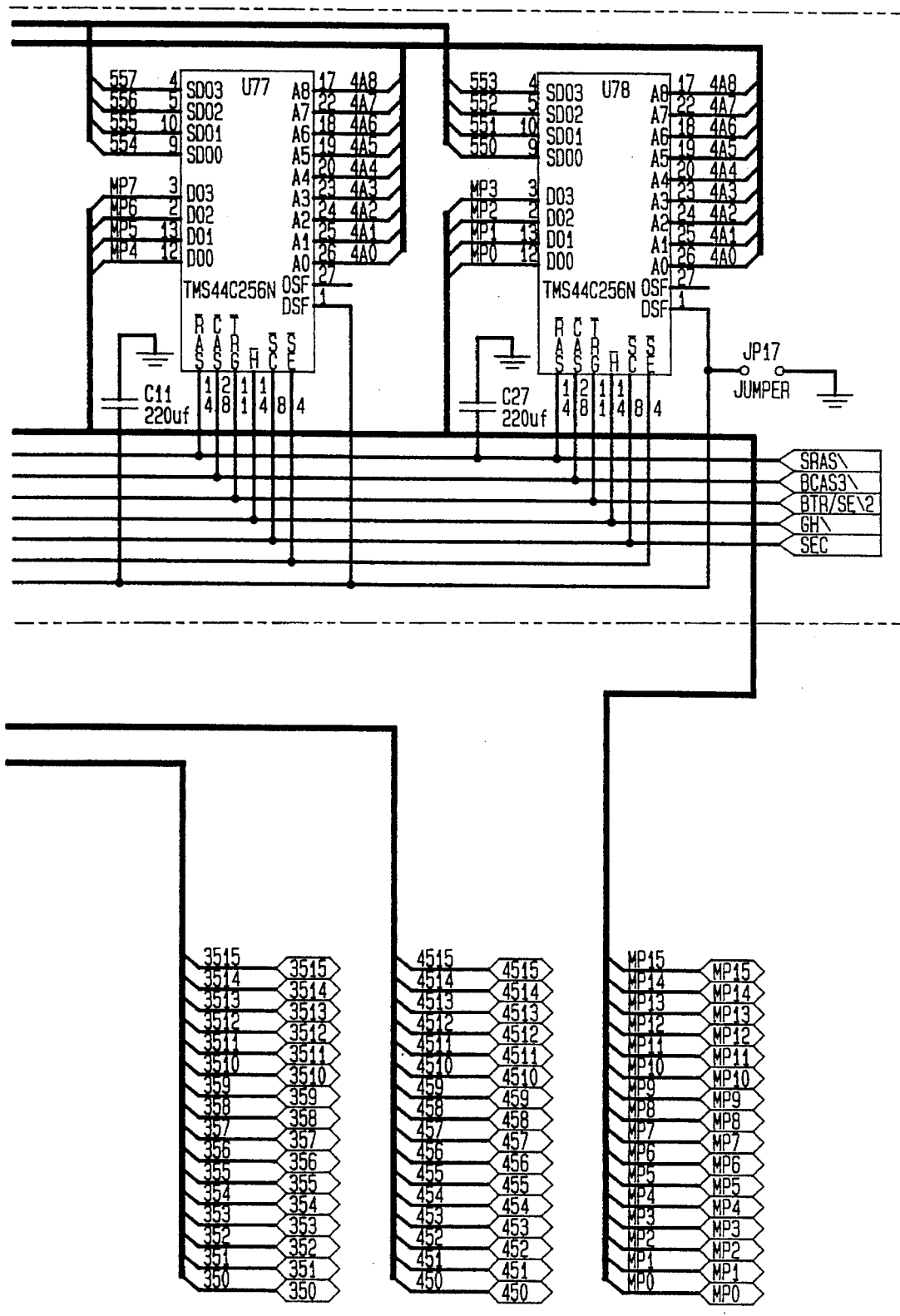
Figure 7A:
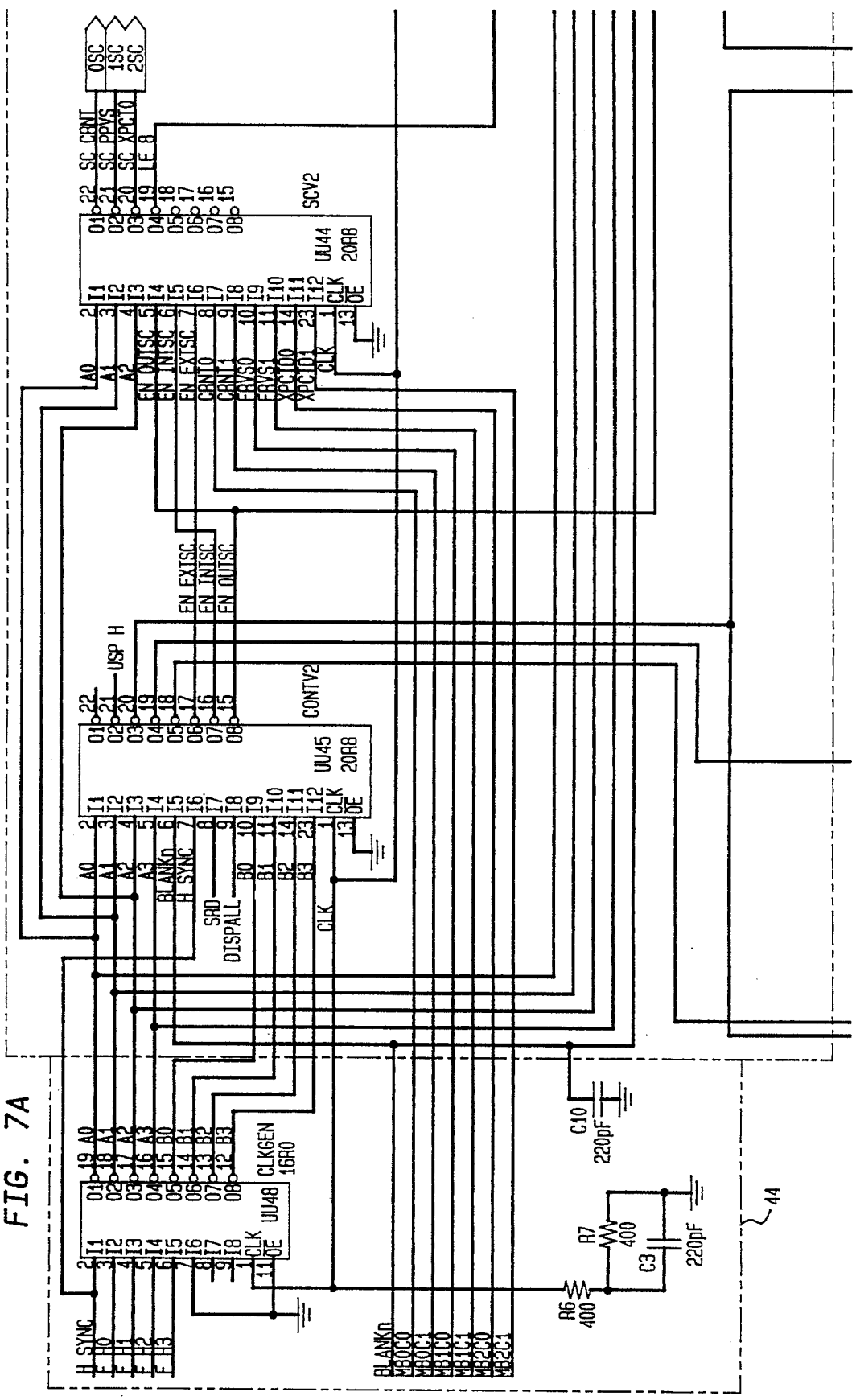
Figure 7B:
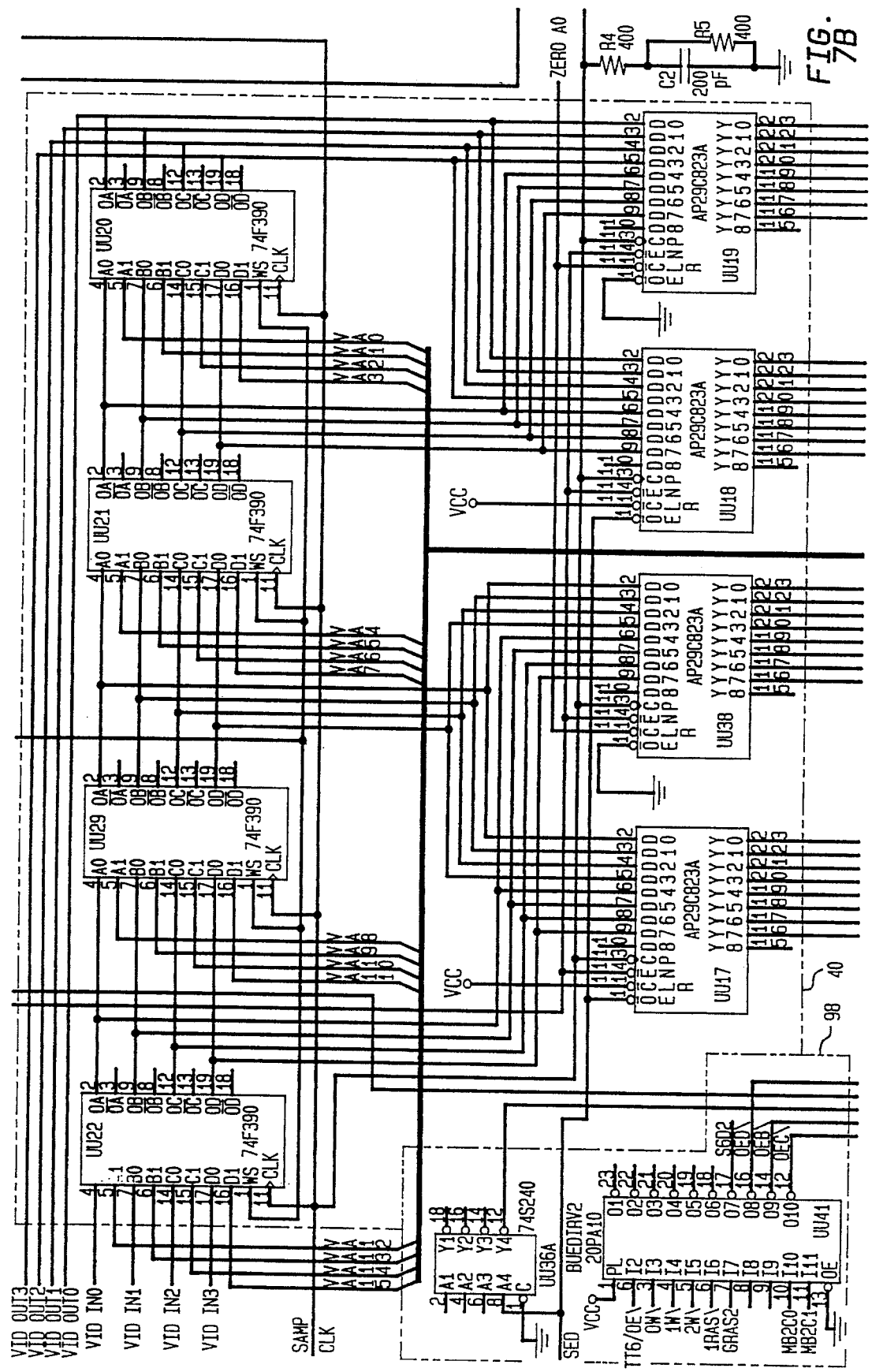
Figure 7C:
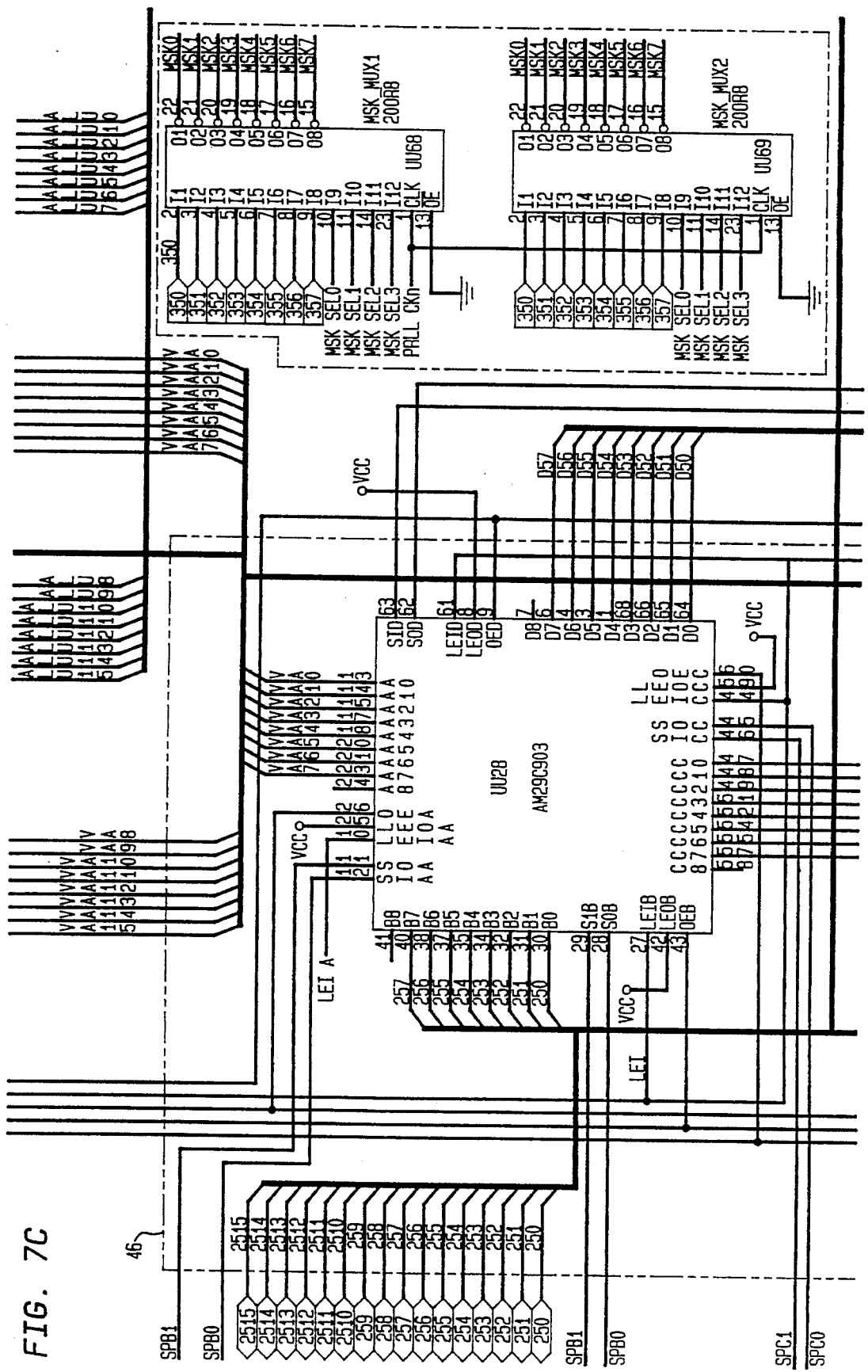
Figure 7D:
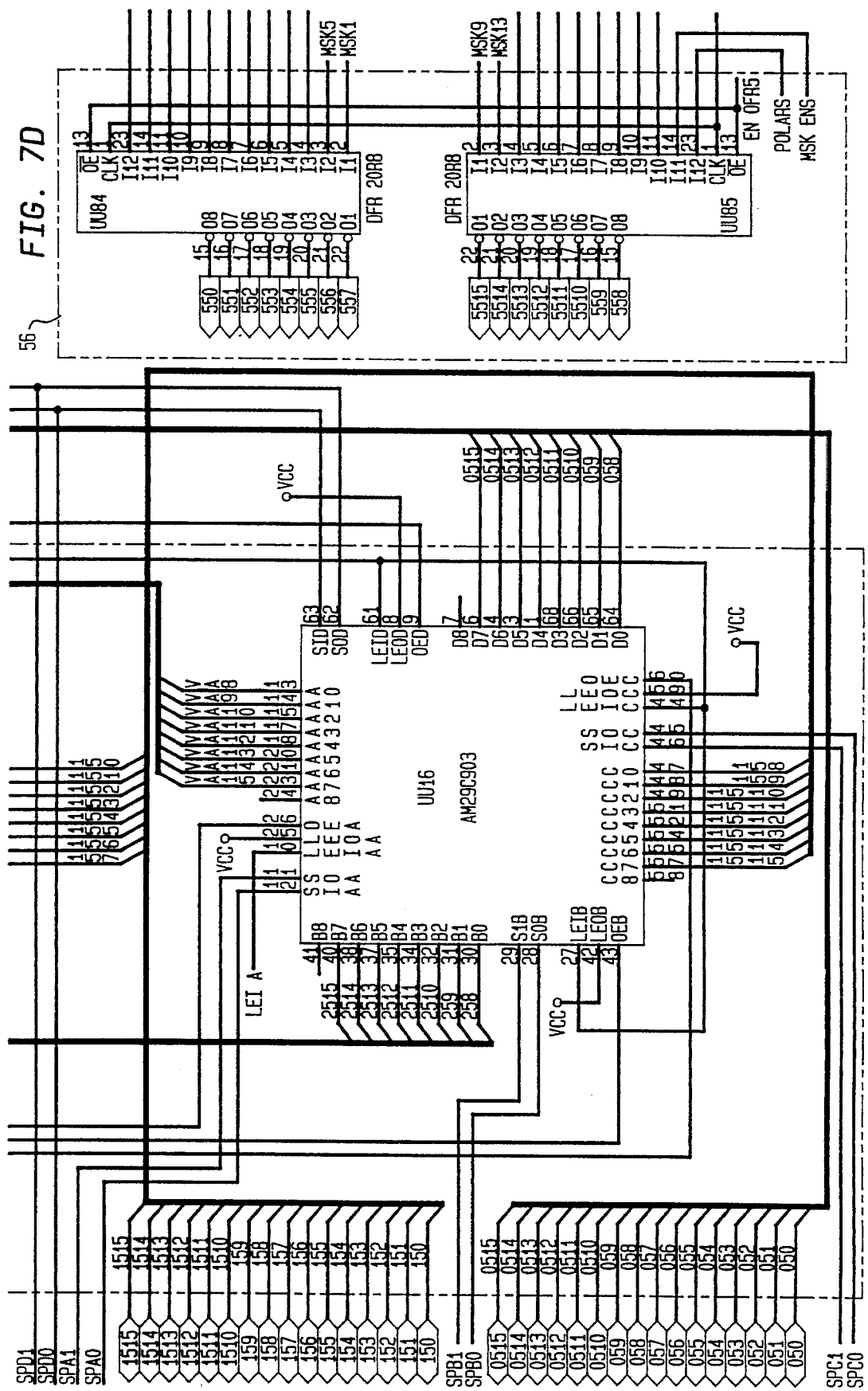
Figure 7E:
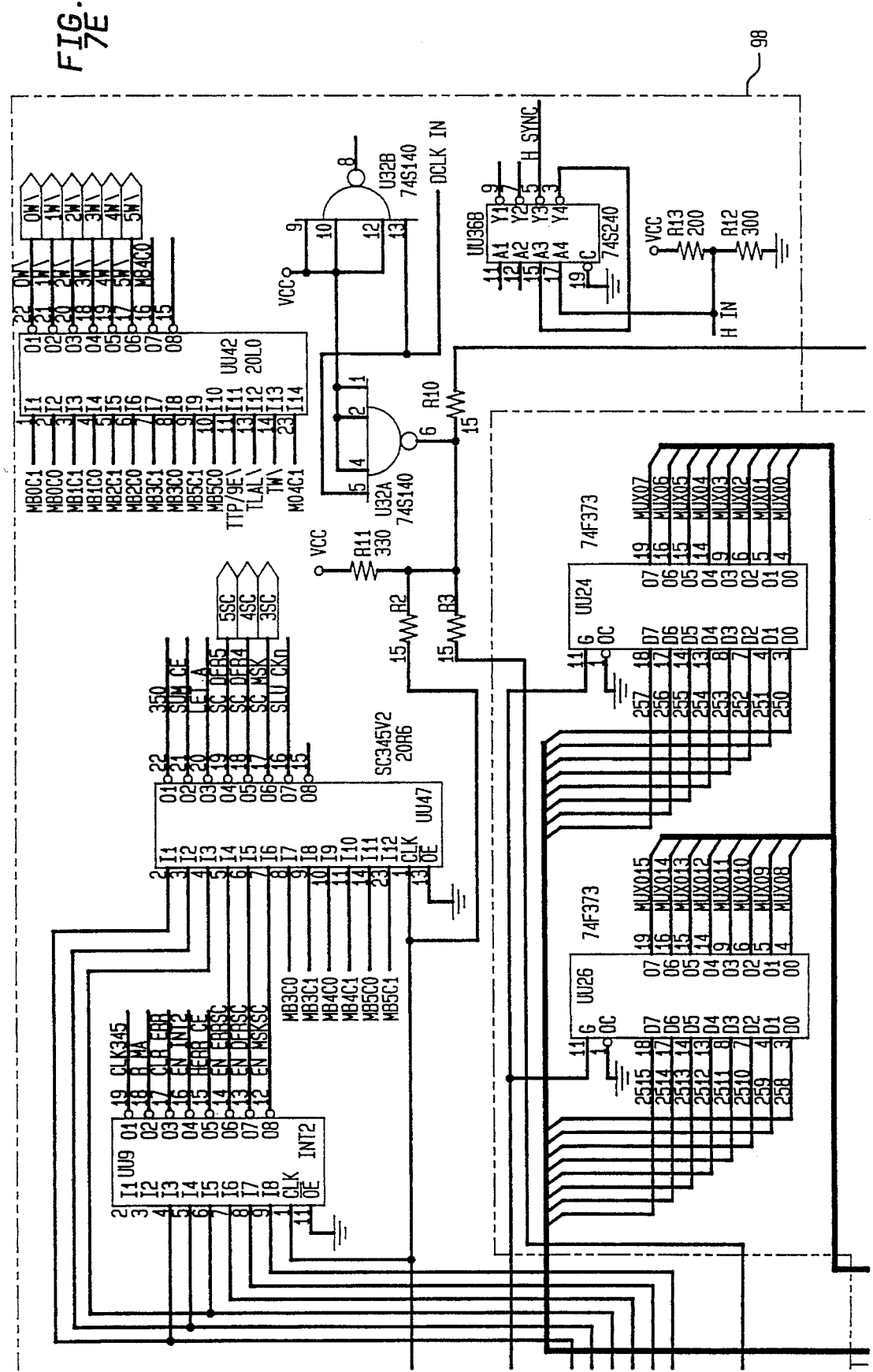
Figure 7G:
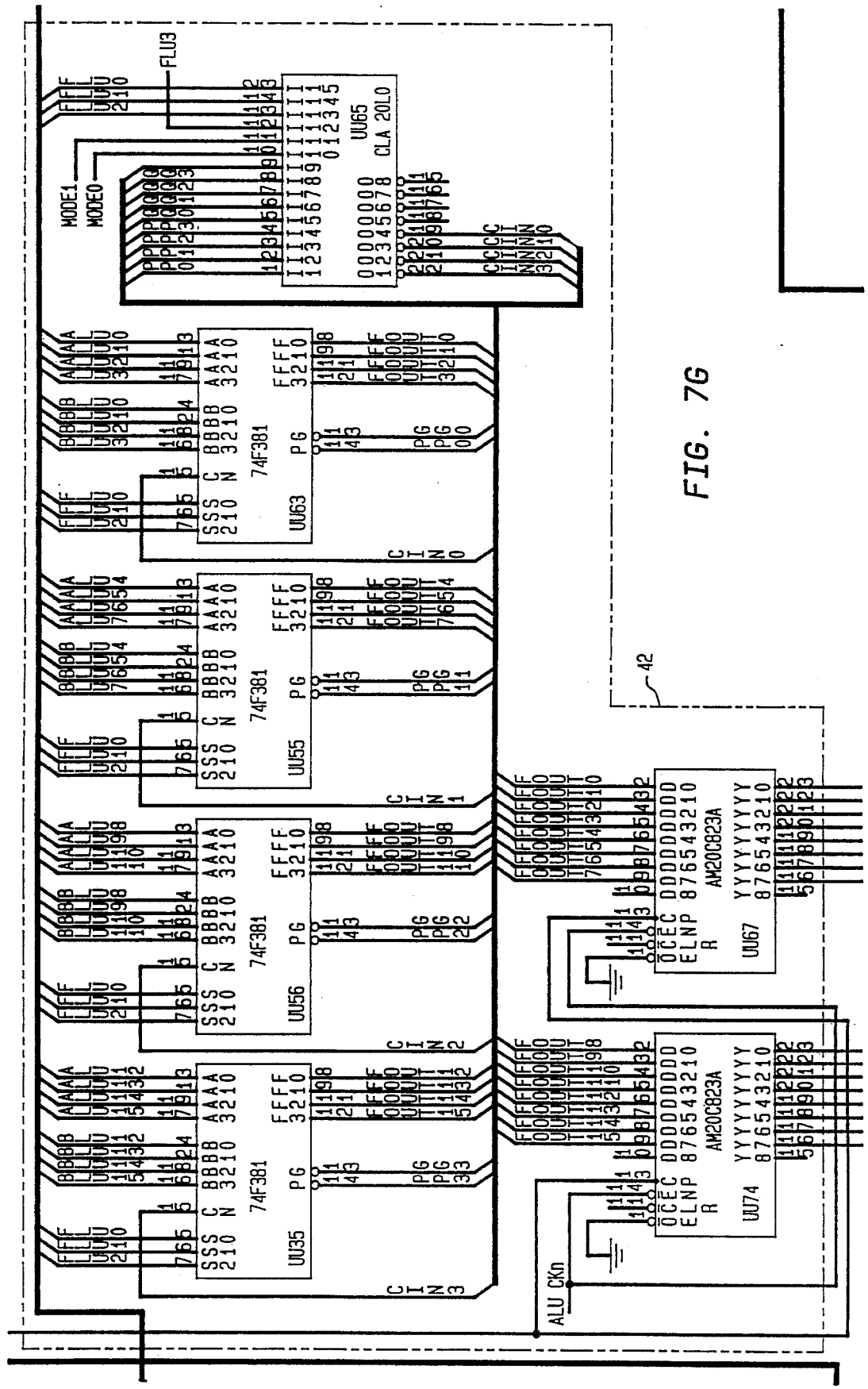
Figure 7H:
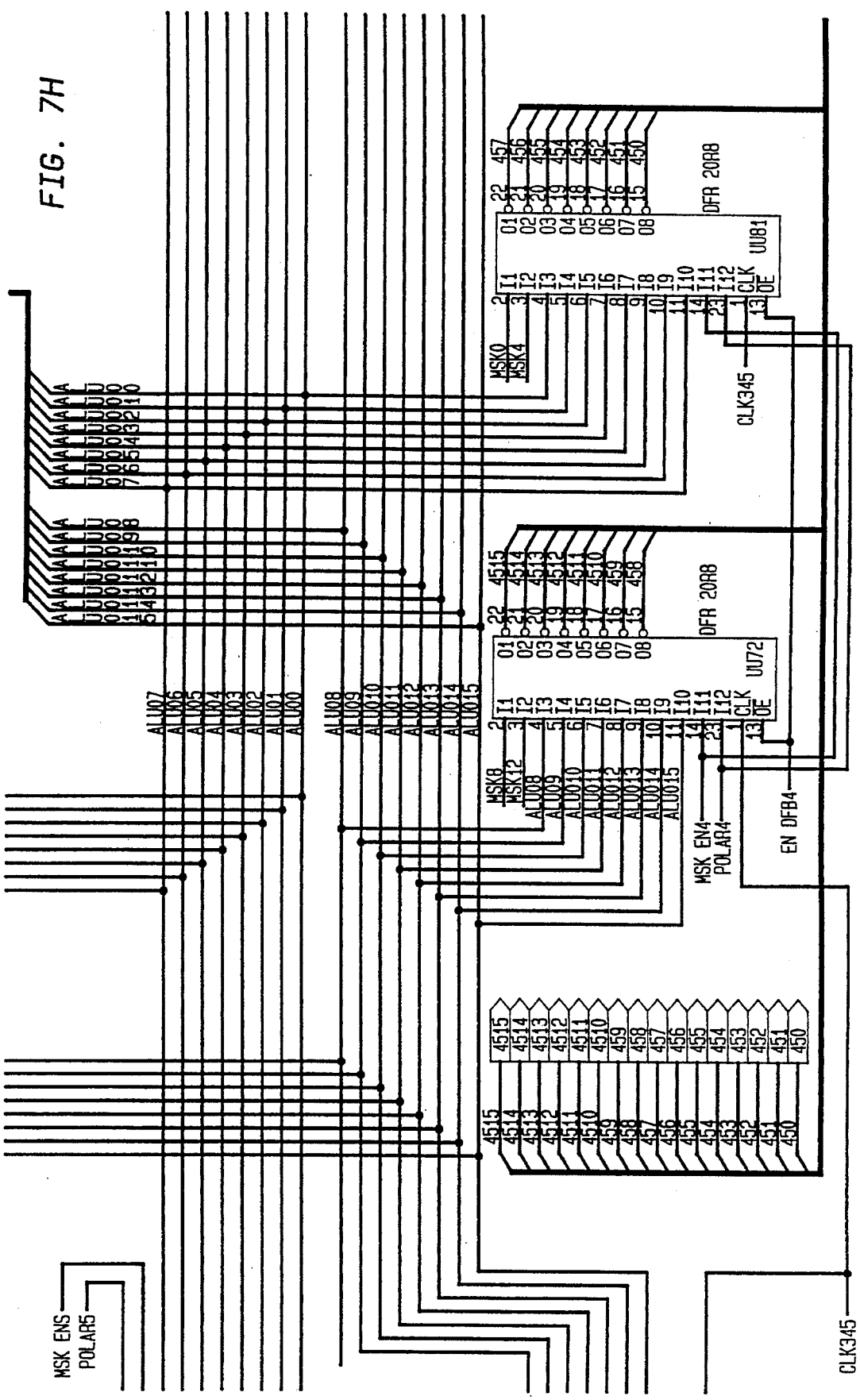
Figure 7I:
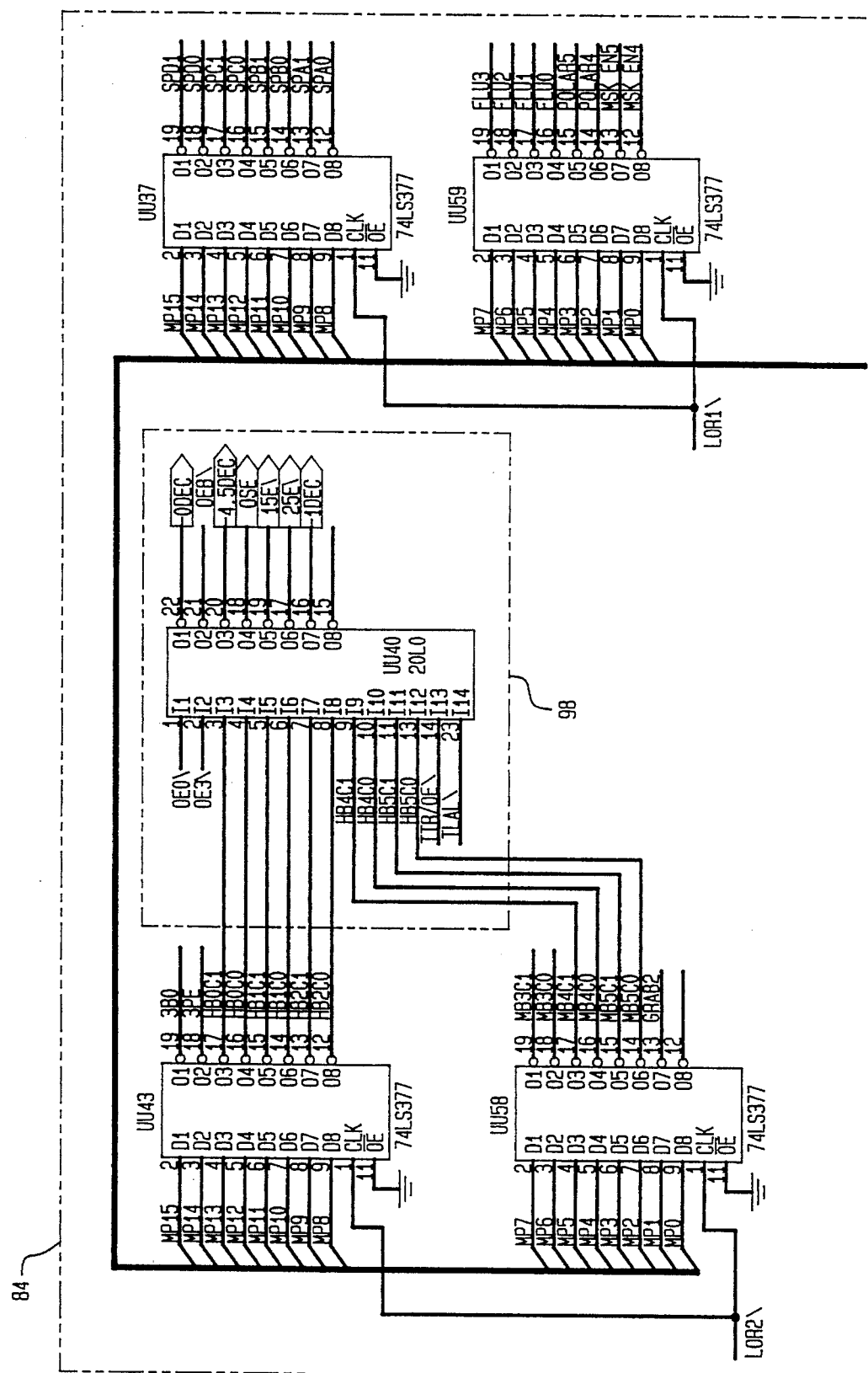
Figure 7J:
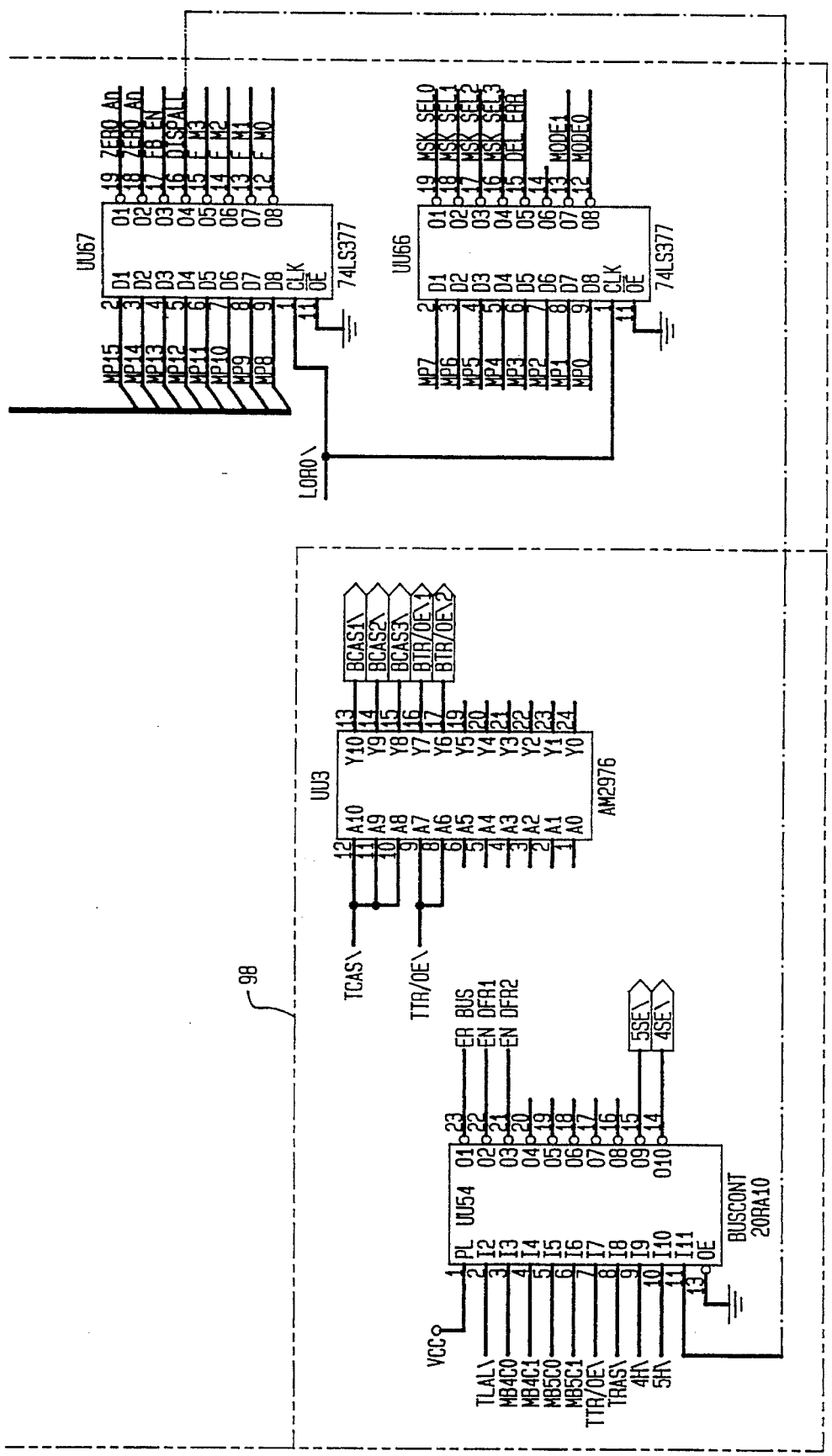
Figure 7K:
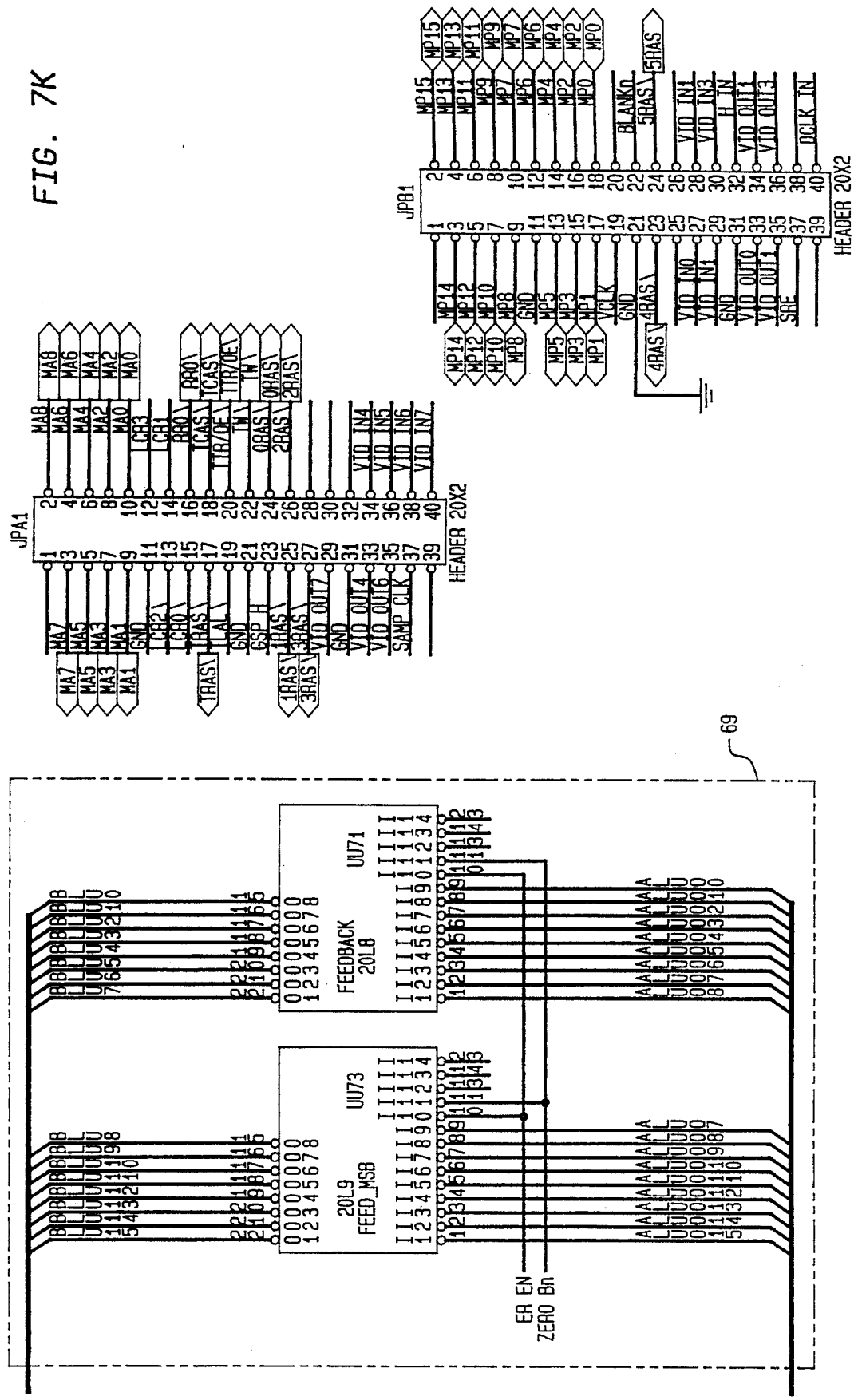
Figure 7L:
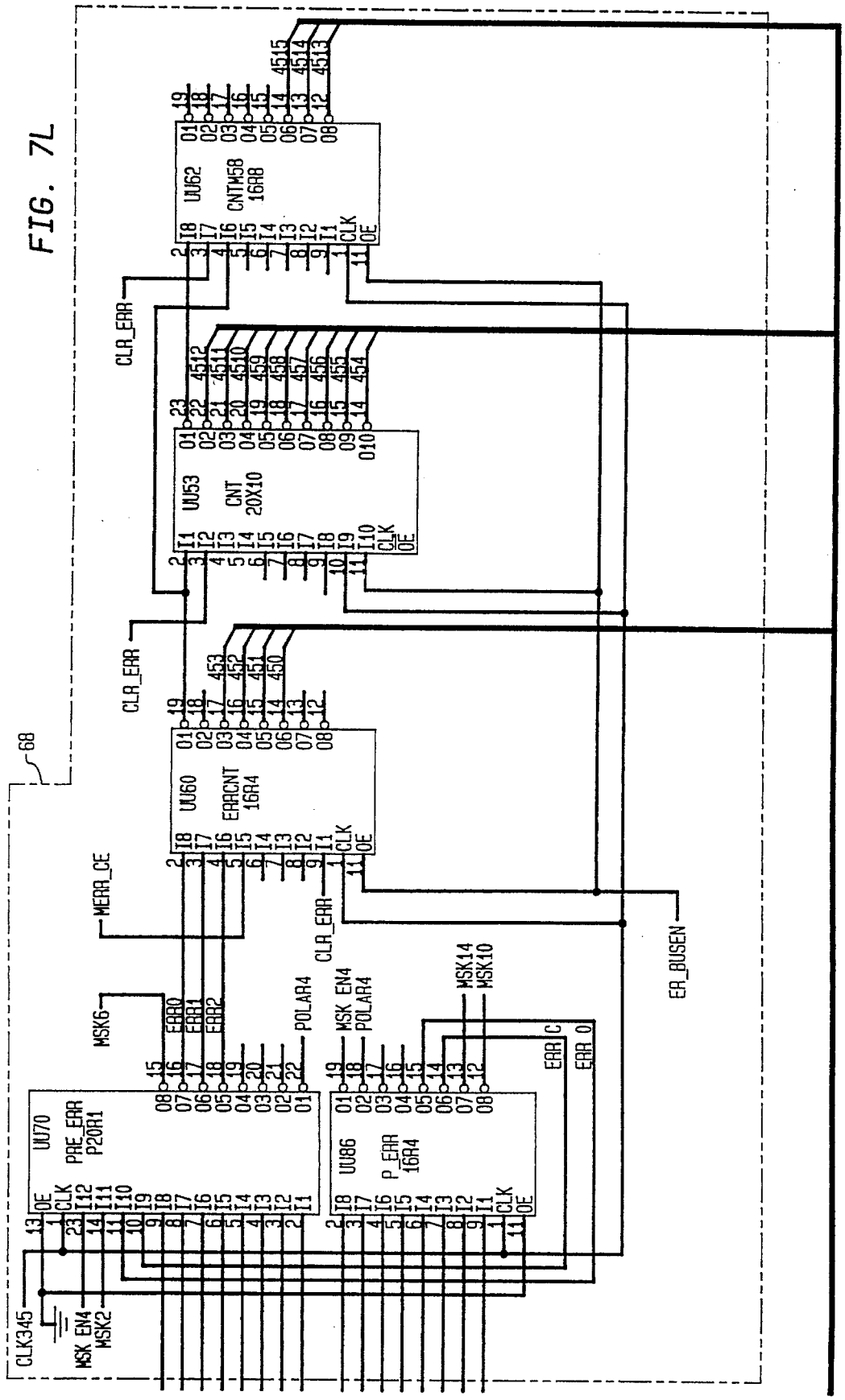

Reference is now made to FIGS. 4A and 4B, which are an intermediate level block diagram illustrations of RT video ALU 34, graphic processor 30 and image frame buffers 36 forming part of the system of FIG. 1. It is seen that the RT video ALU 34 includes a video input/output serializer 40 which communicates with the video interface 18 receiving from it and/or sending to it a stream of pixels. Serializer 40 converts the speed of the stream of pixels by converting every four four-bit pixels from the video ALU 34 into one, sixteen-bit pixel and vice versa. Serializer 40 outputs to an ALU 42. It receives a clocking input from synchronization control circuitry 44, which has a "sync in" input from video interface 18 and a data/sync control output to a corresponding input (shown in detail in FIGS. 5A–5E and FIGS. 7A–7L in the graphic processor 30.

A bus multiplexer 46 interfaces with serializer 40 and also interfaces via separate digital video channels with a CURRENT/PREVIOUS frame buffer 48, a PREVIOUS/CURRENT frame buffer 50 and an EXPECTED frame buffer 52. EXPECTED frame buffer 52 also interfaces with a second serializer 54, which outputs to ALU 42. The second serializer 54 is typically operative to enable communication with monitors with eight-bit pixels.

ALU 42 outputs to a pair of AND gate assemblies 56 and 58, each of which also receives a respective output from XOR gate assemblies 60 and 62. XOR gate assemblies 60 and 62 each receive an input from a multiplexer (MUX) 64, which interfaces with a MASK frame buffer 66. Multiplexer 64 also provides an output to an error counter 68, which also interfaces with a DIFRNCES (previous/current) frame buffer 70 which receives the output of AND gate assembly 58. The output of AND gate assembly 56 is supplied to a DIFRNCES (current/previous) frame buffer 72. A Feedback register circuit (PIPE) 69 provides a feedback from a C output of ALU 42 to the B input thereof.

Graphic processor 30 includes a graphic processing unit 74 which interfaces with the host computer 26. Graphic processing unit (GPU) 74 communicates via a data/address bus 82 with control registers 84, a DRAM 86, typically of 1 Mbyte capacity. Graphic processing unit 74 also communicates via a control bus 96 with Memory Bank (MB) select timing and control circuitry 98.

The operation of the circuitry of FIGS. 4A and 4B will now be described briefly. It is seen that the RT video ALU 34 is a processing unit capable of performing various arithmetic and logic operations on frame buffers 36, including XOR, arithmetic addition and error counting.

The operands originate either from the video input/output serializer 40, or from one of three orerand buffers 48, 50 and 52. Results are stored in one of the result frame buffers 70 and 72.

Frame buffer 66 contains four separate downloadable mask planes that may be employed using the multiplexer 64 and logic elements 60, 62, 56 and 58, to include or exclude parts of the frame buffer from any computation. Four mask planes can be stored at one time and new ones can be downloaded from the host computer 26 via graphic processor 30 as necessary.

Graphic processor 30 is operative to control, via control registers 84 and MB select timing and control circuitry 98, all RT video ALU 34 operations as well as the operations of frame buffers 48, 50, 52, 66, 70 and 72. Graphic processing unit 74 accesses, loads, reads and performs other operations on each of the frame buffers 48, 50, 52, 66, 70 and 72 via data/address bus 82.

Graphic processor 30 and RT video ALU 34 operations may be carried out in parallel. A DRAM 86 is employed to store programs and data to be utilized, as necessary, by GPU 74.

Error counter 68 typically continuously counts the number of times a comparison made by ALU 42 between two operands produces a non-zero value. For every comparison, regardless of the result, the value of error counter 68 is written to frame buffer 70.

Video I/O serializer 40 streams video data to/from the video interface 18 (FIG. 1). Sync control circuitry 44 provides all necessary timing signals and provides a data/sync control signal, composed of 4 signals, which is used by graphic interface 18 for properly registering each video frame in frame buffers 48 or 50 such that each pixel of each video frame is located in the frame buffer location allocated to it.

Reference is now made to FIGS. 5A–5E, which illustrate graphic processor 30 in schematic form. The full specification of all of the circuit components appears in the drawing and therefore, for reasons of conciseness, a verbatim description thereof is not provided here.

Reference is now made to FIGS. 6A–6H, which illustrate image frame buffers 36 in schematic form. The full specification of all of the circuit components appears in the drawing and therefore, for reasons of conciseness, a verbatim description thereof is not provided here.

Reference is now made to FIGS. 7A–7L, which illustrate RT video ALU circuitry 34 in schematic form. The full specification of all of the circuit components appears in the drawings and therefore, for reasons of conciseness, a verbatim description thereof is not provided here.

Firmware for the Programming Array Logic (PAL) elements of FIGS. 5A–5E, 6A–6H and 7A–7L is set forth in Annex A.

Figure 8:
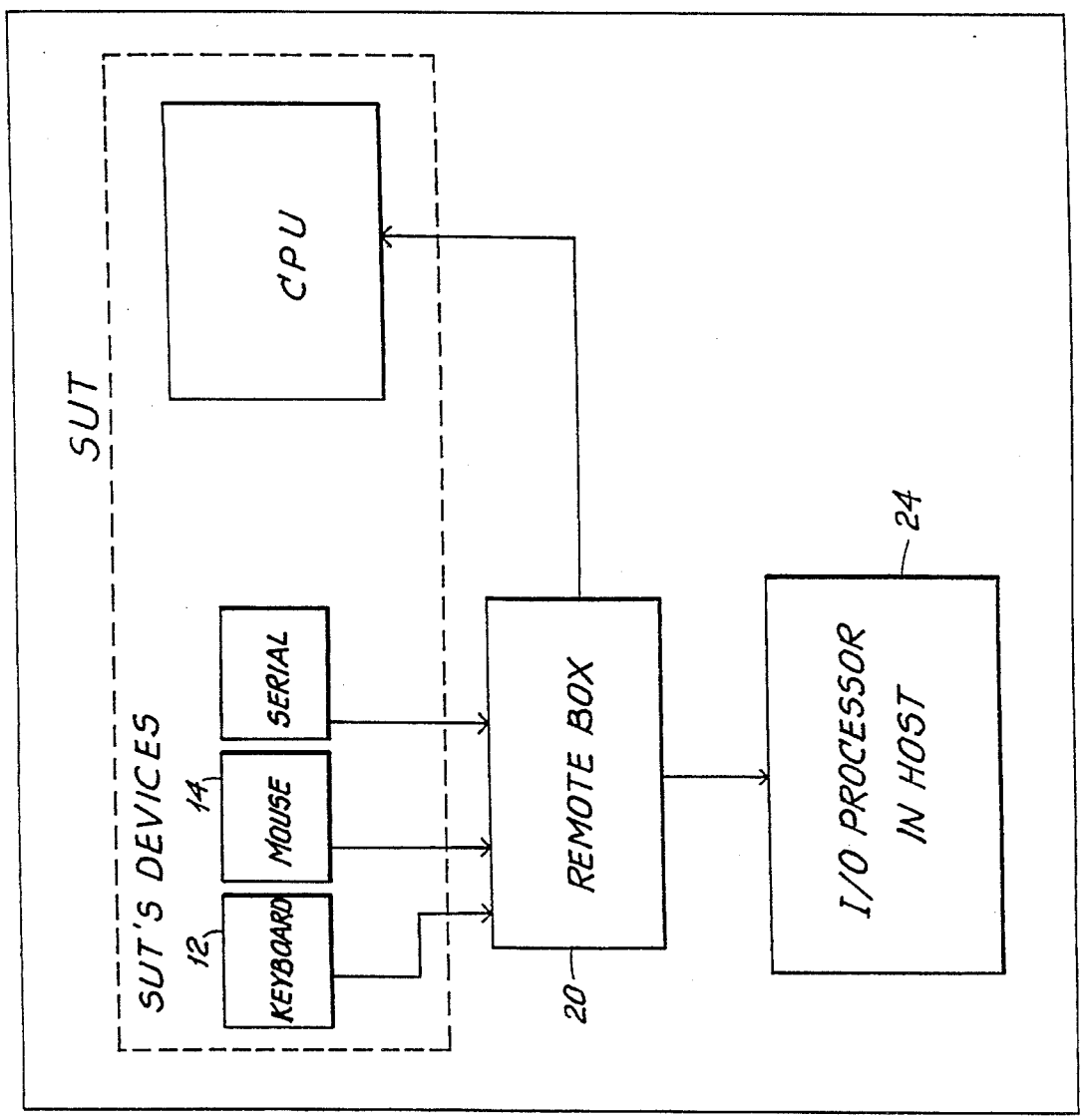
FIG. 8 is a block diagram illustration of the I/O processor and the remote connection box forming part of the system of FIG. 1.

Reference is now made to FIG. 8, which is a block diagram illustration of the I/O processor 24 and the remote connection box 20 forming part of the system of FIG. 1. I/O processor 24 controls the functions of remote box 20, in that it controls a switch in remote box 20 which directs input signals from the keyboard 12 and device 14 to the SUT's CPU 10 or to I/O processor 24. Remote box 20 can also direct signals from I/O processor 24 to the SUT's CPU 10.

Figure 9:
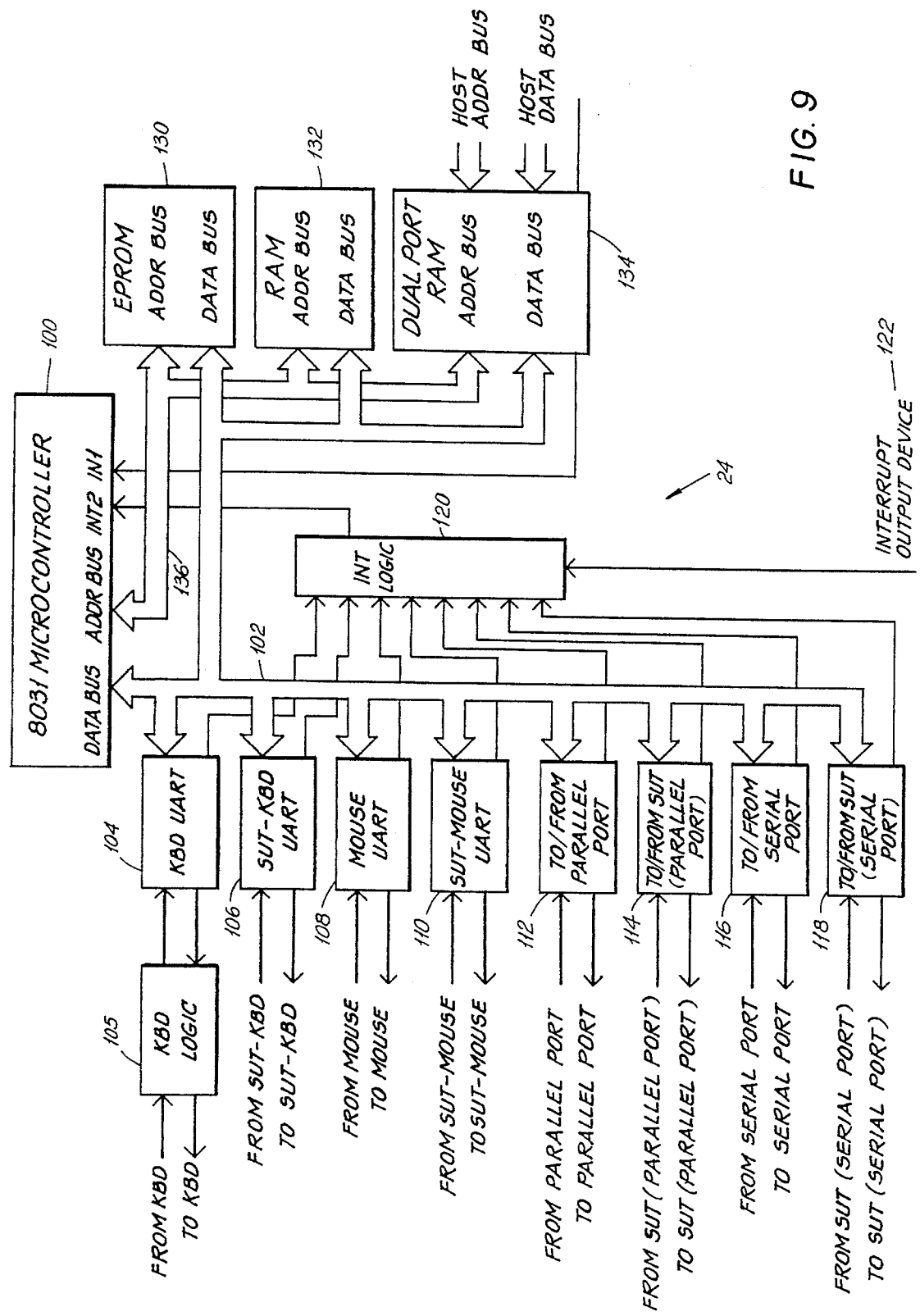
FIG. 9 is an intermediate level block diagram illustration of the I/O processor forming part of the system of FIG. 1.
Figure 10A:
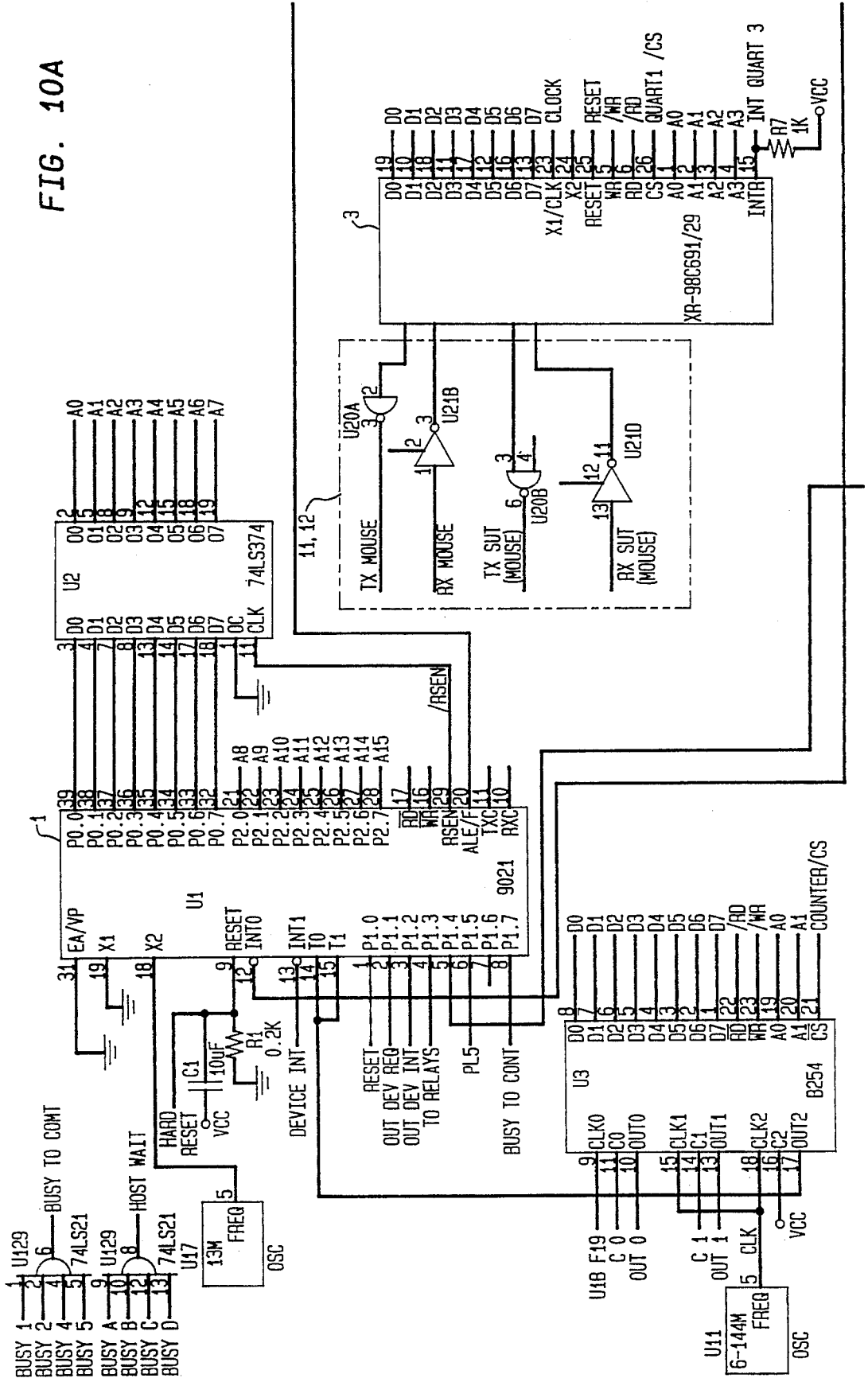
FIGS. 10A–F are schematic illustration of the I/O processor of FIG. 9.
Figure 10B:
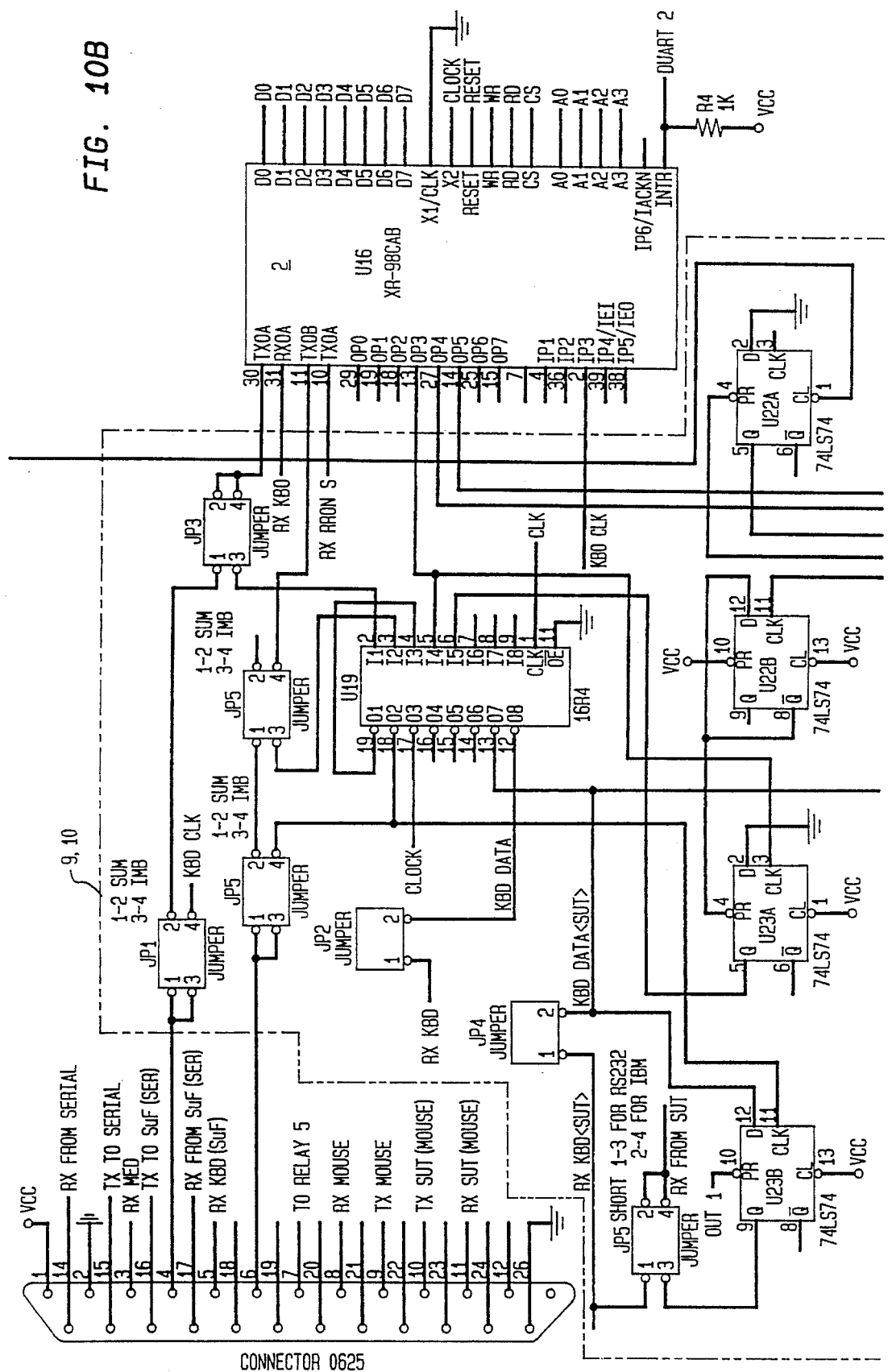
Figure 10C:
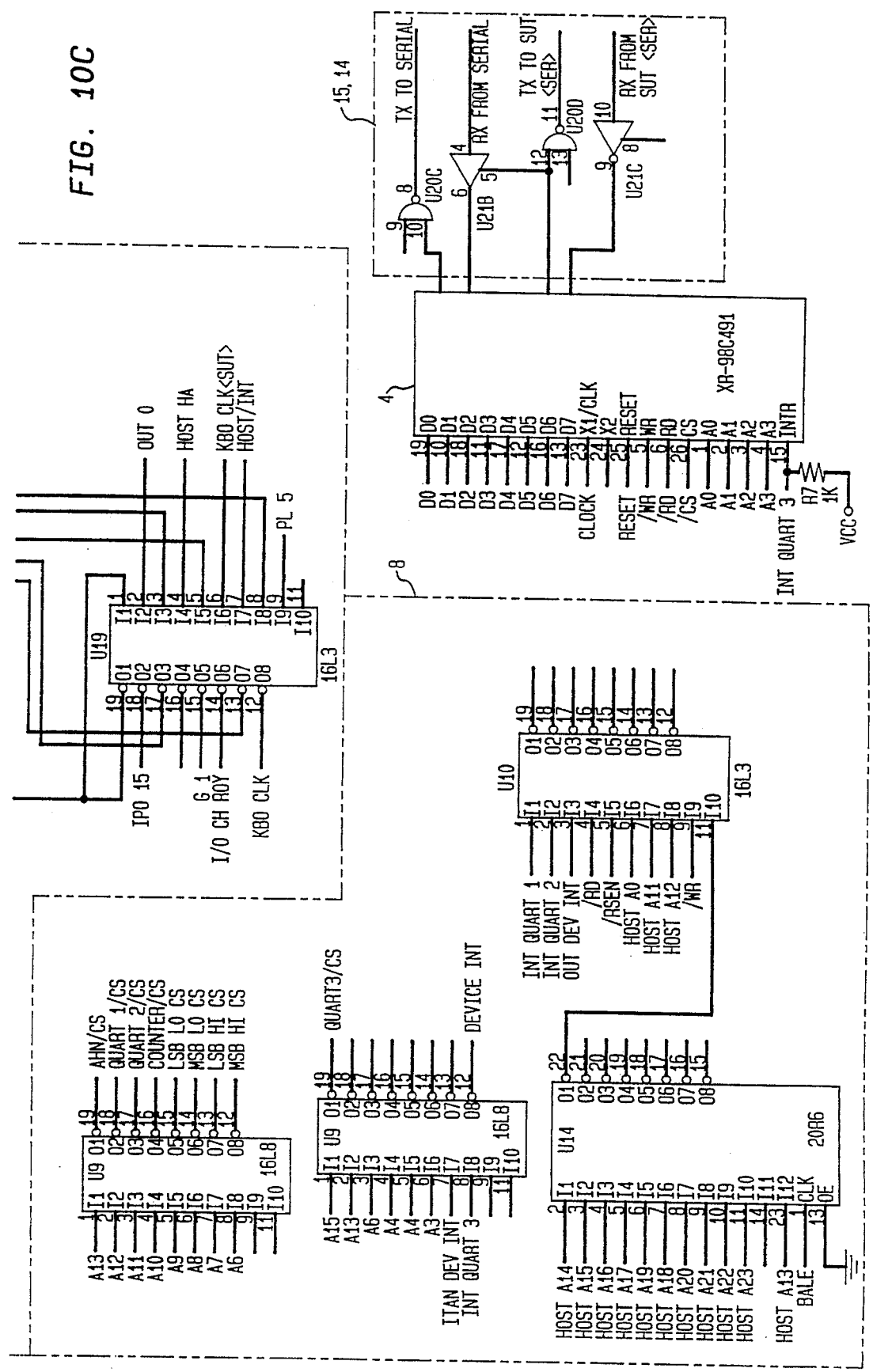
Figure 10D:
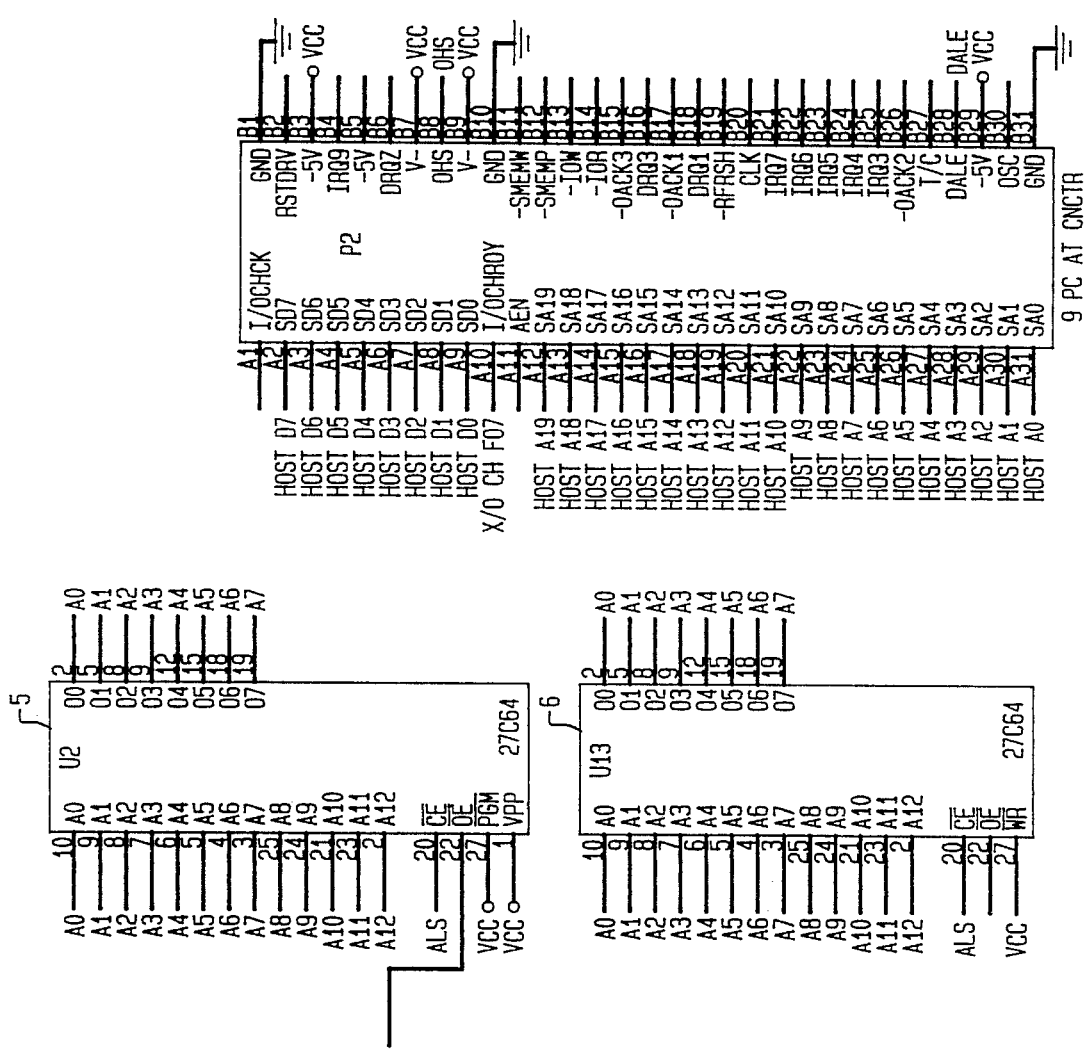
Figure 10E:
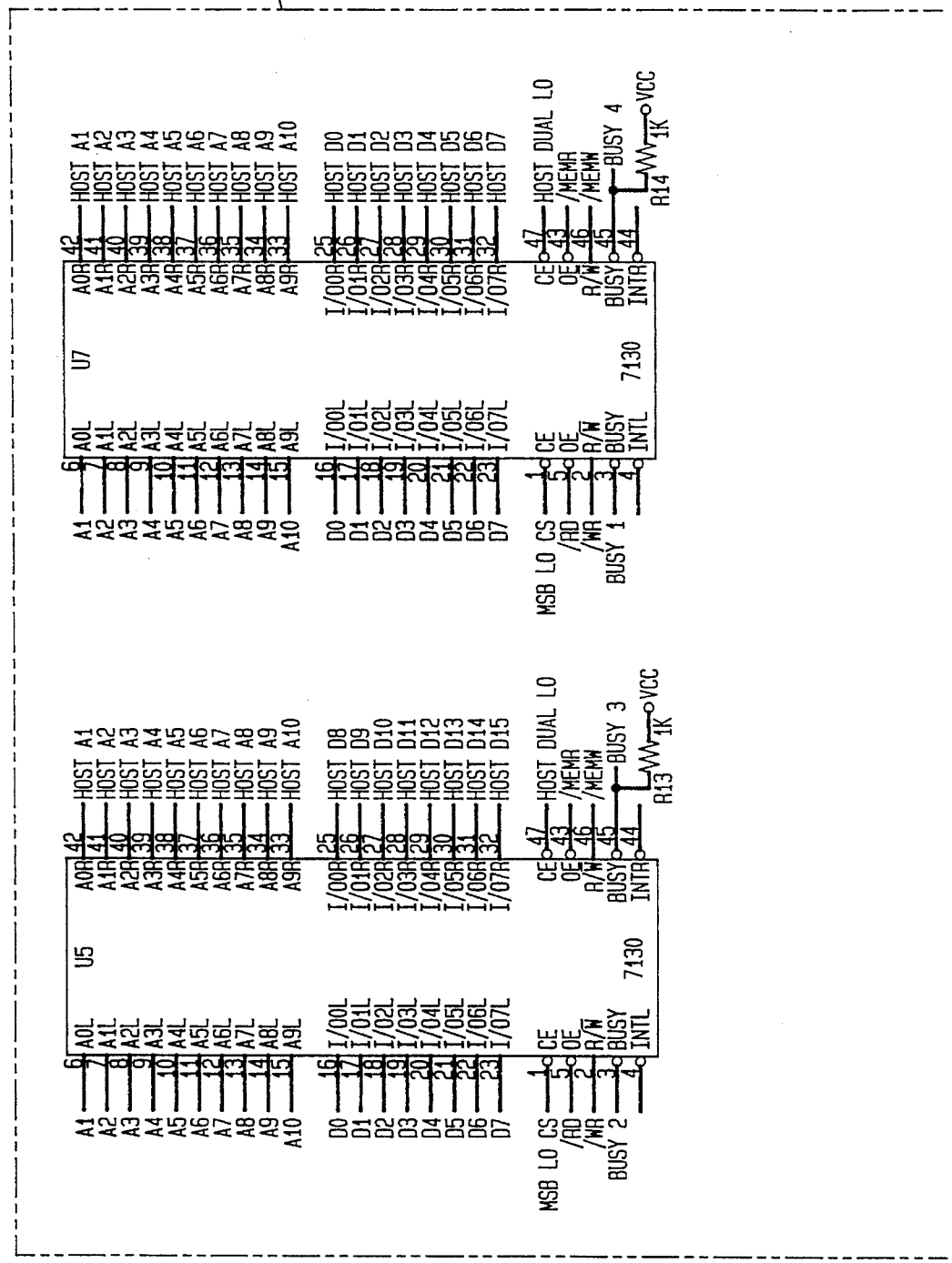
Figure 10F:
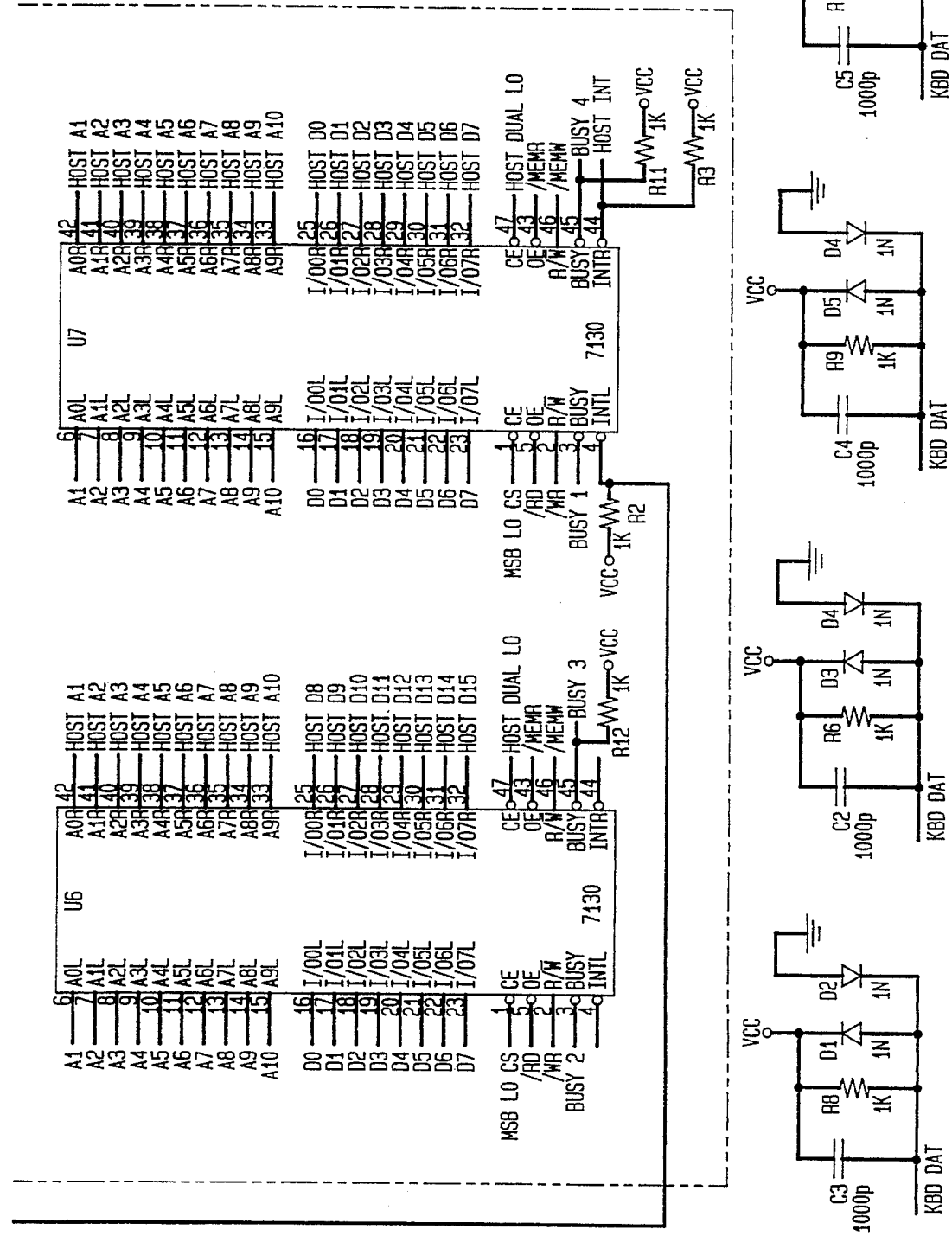

The I/O processor 24 is illustrated in intermediate block diagram form in FIG. 9 and is seen to comprise a microcontroller 100 which is coupled via a data bus 102 with a plurality of interface elements. The interface elements include the following:

a KBD UART 104, which communicates via a KBD interface 105 with a keyboard (KBD);

a SUT — KBD UART 106, which communicates with a SUT-KBD mouse UART 108, which communicates with a mouse;

a SUT — mouse UART 110, which communicates with a SUT-mouse;

a To/From Parallel Port circuit 112, which communicates with a parallel port of host computer 26;

a To/From SUT Parallel Port circuit 114, which communicates with a parallel port of the SUT 19;

a To/From Serial Port circuit 116, which communicates with a serial port of host computer 26; and a To/From SUT Serial Port circuit 118, which communicates with a serial port of the SUT;

The circuits 104, 106, 106, 110, 112, 114, 116 and 118 each provide an input to internal logic circuitry 120, which receives an interrupt signal from an interrupt output device 122 and outputs to microcontroller 100.

Data bus 102 also communicates with an EPROM 130, a RAM 132 and a dual port RAM 134, which also communicate with the microcontroller 100 via an address bus 136.

The I/O processor 24 is operative to read the input events coming from keyboard 12 and device 14 via connection box 20, temporarily store them and eventually send them to the ports of SUT 19 and of host computer 26 for storage as part of the test sequence. While doing this the I/O processor also records the timing between events which is then passed on to the host 26.

Another mode of operation is a sequence of I/O and timing events sent to the I/O processor 24 by means of dual port RAM 134 (FIG. 9) to be replayed to the SUT. The I/O processor then sends these events, with the correct timings, to the SUT ports via the connection box 20. Dual port RAM 134 is employed as a bidirectional FIFO between host 26 and I/O processor Firmware for EPROM 130 is set forth in Annex C.

Reference is now made to FIGS. 10A–10F, which illustrate the I/O processor circuitry 24 in schematic form. The full specification of all of the circuit components appears in the drawing and therefore, for reasons of conciseness, a verbatim description thereof is not provided here. Firmware for the PALs of FIGS. 10A–10F is set forth in Annex B.

Figure 11:
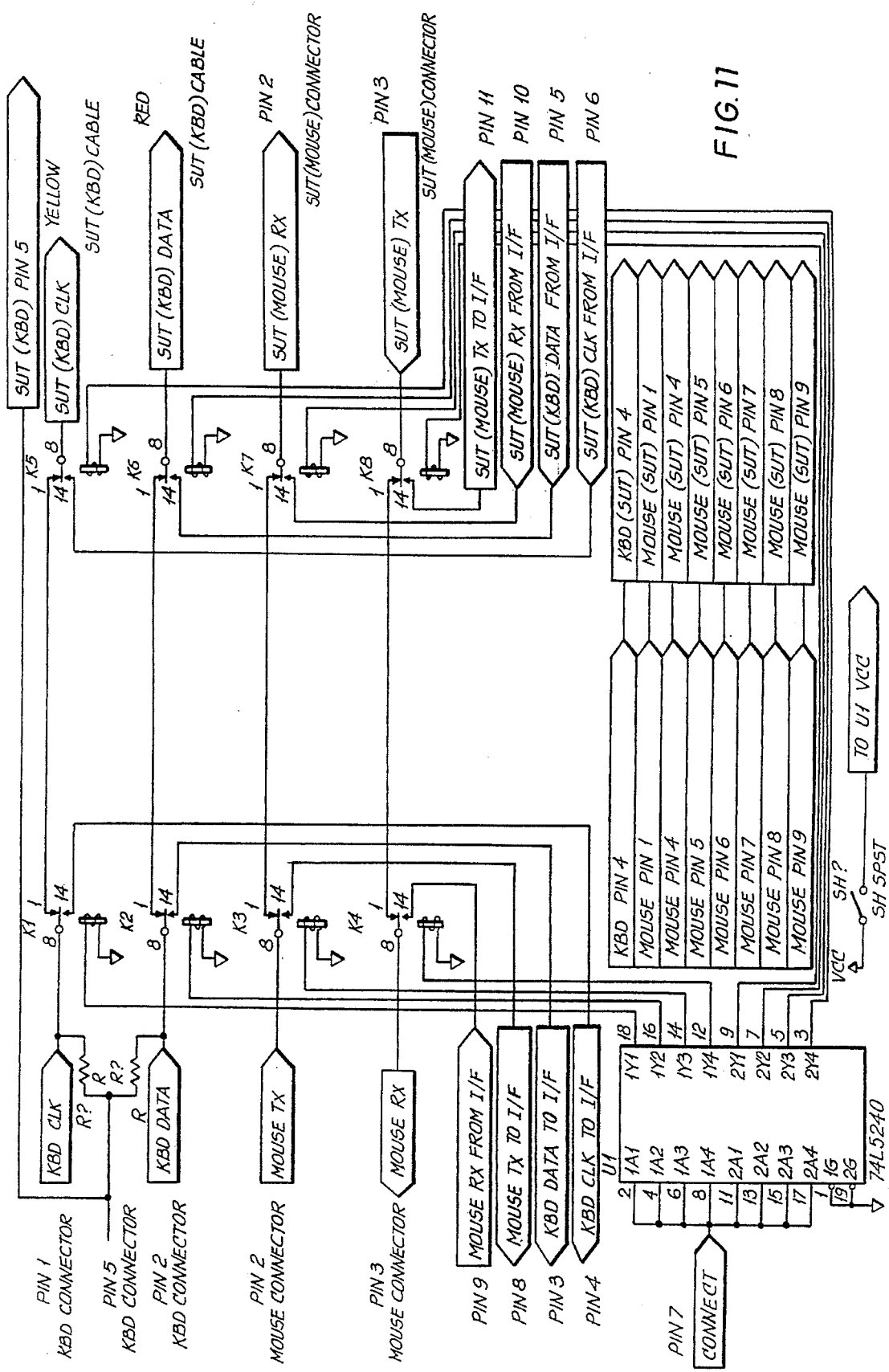
FIG. 11 is a schematic illustration of the remote connection box forming part of the system of FIG. 1.

Reference is now made to FIG. 11, which illustrates the remote connection box 20 in schematic form. The full specification of all of the circuit components appears in the drawings and therefore, for reasons of conciseness, a verbatim description thereof is not provided here.

Referring back to FIGS. 4A and 4B, a method and apparatus for providing operations on frame buffers in real time, whereby the contents of operands frame buffers are selected and selectably directed to A and B inputs of the ALU 42, will now be described in detail:

A result frame buffer 70 or 72 is selected.

A mask is set in frame buffer 66 and is activated by setting the controls MSK-SEL 0 to MSK-SEL 3, MSK-EN4, and MSK-EN5 of multiplexer 64 and gate assemblies 56 and 58, respectively. Through operation of the mask, parts of the frame buffer will be excluded from participation in the operation.

A specific operation is selected by setting FLU 0 to FLU 3 controls on ALU 42.

The above-mentioned actions occur simultaneously during the gap between two consecutive frames, i.e. during the conventional "vertical blank period", and the operation takes place on the frame which arrives after the controls have been set.

As noted above, the present invention provides various operative features including those listed hereinbelow. Descriptions of these features, with reference to the drawings, particularly to FIGS. 4A and 4B, as well as to the software employed therewith will now be provided. The features are as follows:

Sampling real pixel values from the frame buffer of the system under test;

Performing comparisons and other operations on frame buffer contents in real time;

Using screen signatures for comparisons;

Incremental error counting;

Determining screen stability;

Determination of minimum response time of system under test to given commands;

Output synchronization;

Conditional testing; and

Treatment of asynchronous events.

Sampling of Video Frame from the SUT graphic output circuitry 16:

When it is desired to capture the image currently on SUT's monitor 22, the custom video interface 18 retrieves the frame currently stored in the SUT graphic output circuitry 16 and outputs it as a digital video signal to serializer 40.

The digital video from video interface 18 streams to serializer 40, wherein the input stream is converted from serial to parallel and every 4 pixels of 4 bits are converted to one 16 bit word. This stream of pixel quartets is directed either to the A input of ALU 42, or through port A of bus multiplexer 46, to any of frame buffers 48, 50 or 52, or via the second serializer 54 to input B of ALU 42. Bus multiplexer 46 is a switching board capable of directing any port A, B, C, D to any other port.

If it is desired to use video signals stored in frame buffers 48, 50 or 52, the data can be streamed through bus multiplexer 46 to serializer 40 which then outputs the data to ALU The data remains as pixel quartets.

Each of frame buffers 48, 50 and 52 can be set to one of three modes: read mode, write mode and open mode. In read mode, data is read from memory, in write mode, data is read into memory, and in open mode the frame buffer is not active. In order to read the video stream into a designated frame buffer, that frame buffer must be set to write mode.

Serializer 54 can perform equivalent functions independent of serializer 40, such that two different 4 bit per pixel video sources may be sampled simultaneously. Each serializer can also be used to output video data from frame buffers 48, 50 and 52 to a display device. Serializers 40 and 54 are controlled by sync control module The operations described hereinabove and hereinbelow are typically controlled by GPU 74 through the setting of control registers 84.

Performing Comparisons and Other Operations on Frame Buffer Contents in Real Time:

The GPU 74 can directly write a reference frame into any one of frame buffers 48, 50 or 52 or it can be written via the video frame sampling procedure described hereinabove.

To perform a comparison or any other operation, the following hardware settings should be loaded from GPU 74 into the control registers 84:

A. The frame buffer 48 is set to its read mode.

B. The mode of bus MUX 46 is set to direct data from port D to port B.

C. Serializer 54 is designated to transfer incoming data from port B of bus MUX 46 to port B of ALU 42.

D. Serializer 40 directs incoming video signals to port A of ALU 42.

E. ALU 42 is set to XOR.

F. By setting MUX 64, a mask is selected. In addition, depending on the desired destination of the result, control 56 or 58 should be selected.

G. A result frame buffer, frame buffer 72 in this example, is set to its write mode.

The above settings are made via control registers 84 and are synchronized to the video input so that the setting occurs in the gap between two consecutive video frames, termed the "vertical blank period". Beginning at the start of the immediately following frame, a pixel-wise XOR operation will then be performed between the reference frame buffer 48 and the incoming video signal. The results are stored in frame buffer 72.

Using screen signatures for comparisons:

Screen signatures are generally compact representations of screen information that utilize a very small memory space for storage. It is possible that two different screens might have identical signatures but the incidence of that is extremely low. Thus, in accordance with the present invention, screen signatures, rather than the entire screen, can be used for storage and comparisons.

An area of interest is set by choosing an appropriate mask and signature operation is selected through setting of the appropriate control registers 84.

The signature operation may employ a "check-sum" operation, i.e., quartets of pixels are added via a modulo 16 arithmetic operation. The incremental result after every 4 pixels is known as a signature word and is stored in one of the result frame buffers 70 or 72. The actual screen signature is a vector of signature words.

The video output from serializer 40 is directed to input A of ALU 42 for summation with input B of ALU 42. The output from the ALU 42 is streamed via feedback register 69 to the input B of ALU 42. Thus, the output of ALU 42 is the running sum, or checksum, of the video signal.

The signature words are stored on the result frame buffer 70. Each location on frame buffer 70 stores the running sum of all the pixels beginning with the first pixel on the frame and ending with the pixel which resides in that location, exclusive of masked areas on the screen.

By utilizing the GPU 74, the signature data can be further processed to generate the actual signature of a screen.

In accordance with a preferred embodiment of the invention, signatures are calculated utilizing a technique including the following steps:

1. An input frame buffer, either directly from the input video or from one of the frame buffers 48 or 50 is divided into N x N rectangles.

2. One signature word is computed, by means of hardware and graphic processor software, for each rectangle. In other words:

loop i=N × N times where:
a. a mask is set to include only rectangle i,
b. signature computations take place as above,
c. The signature word from the last location in the frame buffer is stored as the i-th signature element.

3. The signature of N × N words, rather than a whole screen, is saved in a data base of host computer 26 and is used for comparisons. Comparisons are done between signatures rather than between screens.

It is appreciated that screen comparisons are essential operations to a regression test execution process. Such a process compares screens at a number of steps during the operation of a program under test. It is therefore necessary to store a large number of reference screens against which the screens of the program under test will be compared. Storing and comparing screen signatures saves storage space and time and, although the amount of information stored using signatures is considerably less (typically by a factor of approximately 1000) than would be the case were the entire screens stored, the screen signature operation is very reliable. As differences occur, they are noted. The technique may be summarized by the following steps:

a. a screen to be checked is captured.
b. signature computations are performed.
c. the signature is compared to the reference, element by element, by means of GPU 74.
d. in the event of dissimilar elements, the corresponding rectangle is flagged.
e. The actual screen to be checked is made available and the dissimilar areas are indicated to the user by means of the graphic display. It will be noted that the original reference screen is represented only by a small signature in memory.

The use of screen signatures greatly enhances the capability of the system to store test results.

Incremental Error Counting:

Reference is made to the description hereinabove regarding performance of comparisons on frame buffer contents in real time. If the following additional hardware settings are implemented:

H. Frame buffer 70 is set to write mode

I. Error counter 68 control is set to "on", the error counter 68 will count and write, for each location of frame buffer 70, the incremental number of pixel mismatches found up to that point since the beginning of the frame.

As mentioned hereinabove, MUX 64 can access four different masks. By selecting a suitable setting for MUX 64 and for gate assemblies 56 and 58, a separate mask can be implemented for error counter operation independent of the mask set for the comparison operation.

Incremental error counter 68 is operative to count the errors on a pixel-to-pixel basis. Error counter 68, utilizing the results of the XOR operation carried out by ALU 42, counts the non-zero results and continuously stores, in the frame buffer 70, the current number of errors. The error counter 68 is used to read the number of mismatches occurring within a certain area of interest and to support fast identification of moving objects on the screen by monitoring consecutive changing screens.

Because error counter 68 continuously writes the incremental number of mismatches existing in a frame, it indicates in one reading whether two frames are identical (i.e. if the error value is 0 in the last pixel location of the result frame, the two frames are identical). Error counter 68 does not increment within masked out parts of the screen.

Screen Stability Determination:

It may be desirable to determine whether an input screen is stable before certain operations are performed. A stable screen is one which has not changed substantially for a user-defined period of time, known as the "stability time period".

The stability time period is translated into the stability parameter, being the number of frames occurring during that time period, and is stored in the GPU 74 software. The current screen is read from the digital video port into frame buffer 48.

The following procedure may be followed:

1. A comparison is made between typically a masked version of the current video frame and the reference frame stored in frame buffer 48. The masking is done so as to concentrate on the areas of the screen where changes are anticipated. Areas where changes will occur due to cursor or mouse movements are typically masked out. The error counter 68 is read at the end of the comparison and if the value read is 0, indicating that the unmasked portions of the frames are identical, a stability counter typically maintained in software is incremented.

2. If the stability counter contents equals the stability parameter, a stability flag is set to "true" and the system returns to step 1.

3. If the error counter value is non-zero, indicating that the frames are not identical, the system proceeds to step 4.

4. The stability flag is set to "false."

5. The stability counter is set to zero.

6. The system reads the current screen from the serializer 40 to frame buffer 48 and then returns to step 1.

Determination of Minimum Response Time of SUT to Given Commands:

The system of the present invention is capable of measuring the time interim between any two commands. To that end, before testing the SUT, the user records a sequence of commands which are stored in a data base of host computer 26. It will be appreciated that the minimum response time to a given command must be recorded, rather than the user's response time since a user may delay between commands. The minimum response time is necessary so as to shorten the SUT testing process.

By monitoring screen stability, the apparatus of the present invention measures the minimal time required to perform the activity requested by the most recent command. A preferred implementation of the above is achieved as follows:

When the user issues the next command to the SUT, the system software counts the number of elapsed frames until the screen reaches stability. Once the screen reaches stability, the SUT is ready for another command. Thus, the number of elapsed frames is the minimal response time for the issued command and is the time used in the replay when testing the SUT.

Output Synchronization:

Reference is now made to FIGS. 20A, 20B, 21A and 21B which illustrate two types of output synchronization operations.

The output synchronization feature is based on the fact that interactive applications are designed to indicate to the user when the application is ready for the next input. The mechanism of output synchronization uses information from a current screen to schedule the next input event. A principal benefit is that test input flow is tuned to the SUT response.

The synchronization mechanism may utilize three synchronization techniques:

1. Time dependent event scheduling (input synchronization). This technique is known in the art and is based upon measurement of the time intervals between events.

2. Automatic synchronization based on screen signatures; and

3. Synchronization points based on user defined objects.

The latter two techniques are believed to be preferred and will now be described in further detail.

Automatic synchronization:

Automatic synchronization based on signatures requires minimal user intervention. At the beginning of a session the user defines "synchronization hot keys:" (keys such as carriage return (CR), and mouse clicks). During the recording of a test, after any hot key, the following procedure is executed:

a. The next input event is captured by the remote connection box 20 and stored in the host computer 26. It is not yet released to the SUT. Thus, the next input event does not yet appear on the screen.

b. A screen signature is generated.

c. The input event is released to the SUT.

During the replay of a test, after any hot key, the next input is released after the corresponding screen has appeared or after a timeout period.

A preferred automatic synchronization process comprises a test recording procedure and a test replay procedure.

Figure 20A:
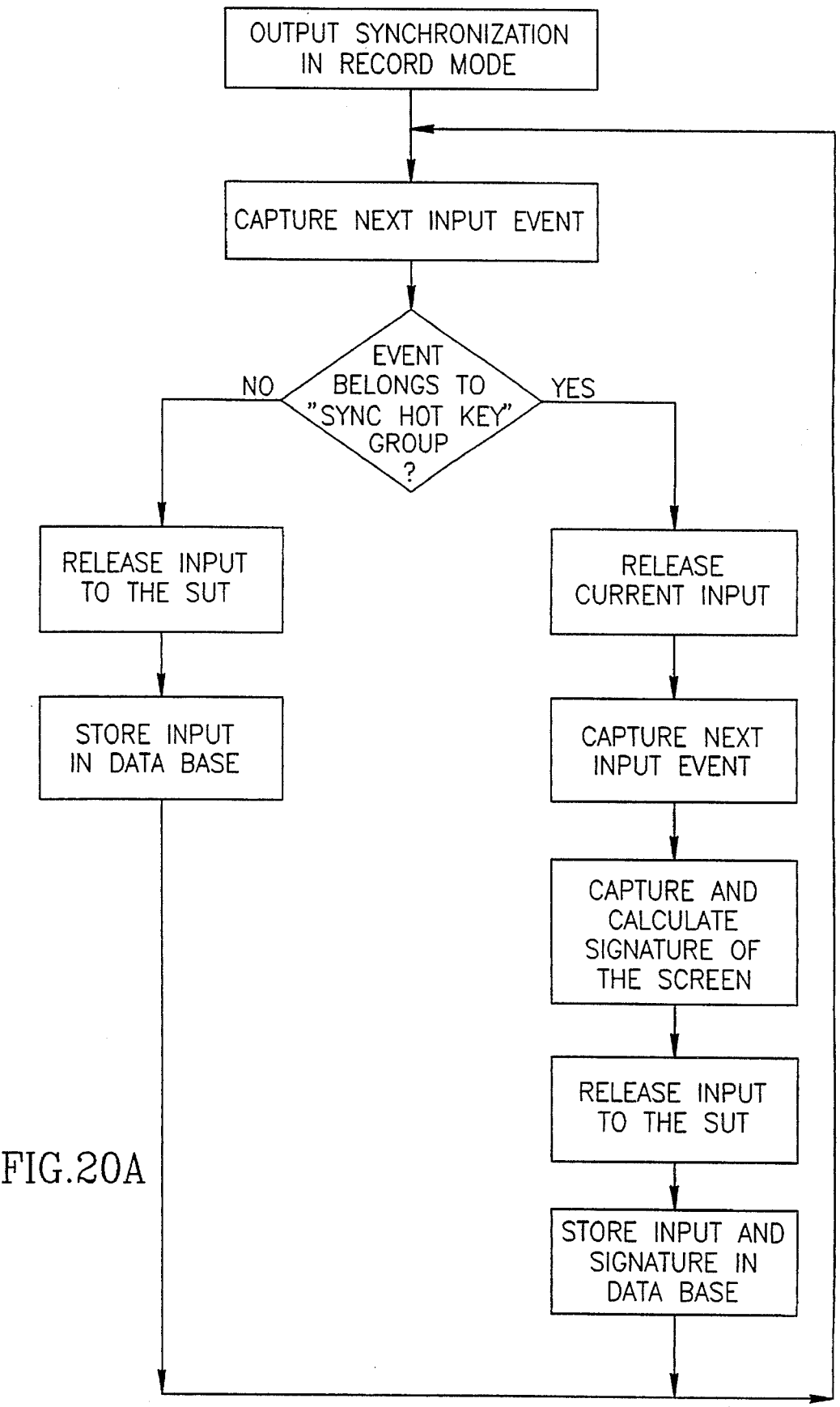
FIGS. 20A and 20B are flow chart illustrations recording and replaying, respectively, of an output synchronization operation.
Figure 20B:
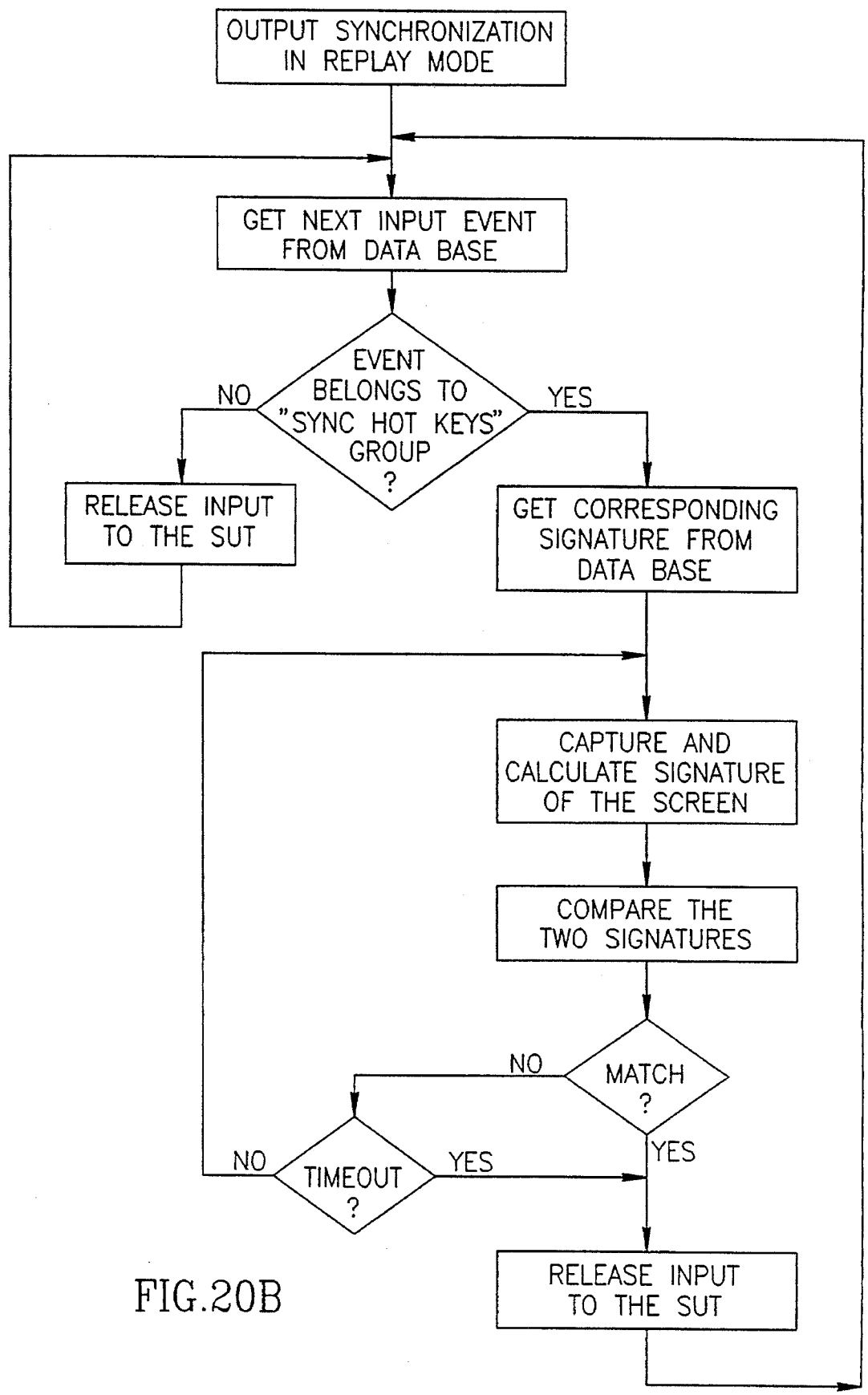

A preferred test recording procedure is as follows, reference being made to the system of FIG. 1 and to the flow chart of FIG. 20A:

1. The host computer 26 captures the next input event via PC/AT-bus 28, I/O processor 24 and connection box 20.

2. The input event is identified and if it belongs to the user defined group of "synchronization hot keys", step 3 is followed. Otherwise, step 11 is followed.

3. The input event is released and something happens on the screen. The next input event is captured as described in step 1.

4. The host computer 26 instructs the graphic processor 30 to acquire the signature of the current screen.

5. Graphic processor 30 activates RT ALU 34 and frame buffers 36 to perform a screen sampling and screen signature computation. The signature computation described hereinabove yields relatively fast results and a relatively small signature.

6. Graphic processor 30 indicates to host computer 26 that operation has been completed.

7. Host computer 26 releases the current event via PC/AT-bus 28, I/O processor 24 and connection box 20 to the SUT CPU 10.

8. The released event is stored in the memory of host computer 26.

9. Host computer 26 reads the signature from the graphic processor 30 and stores it in a location of a input stream data base corresponding to its specific location in the input stream.

10. Return to step 1.

11. The event is released to SUT CPU 10 via remote connection box 20.

12. The released event is stored as described in step 8.

13. Return to step 1.

Figure 21A:
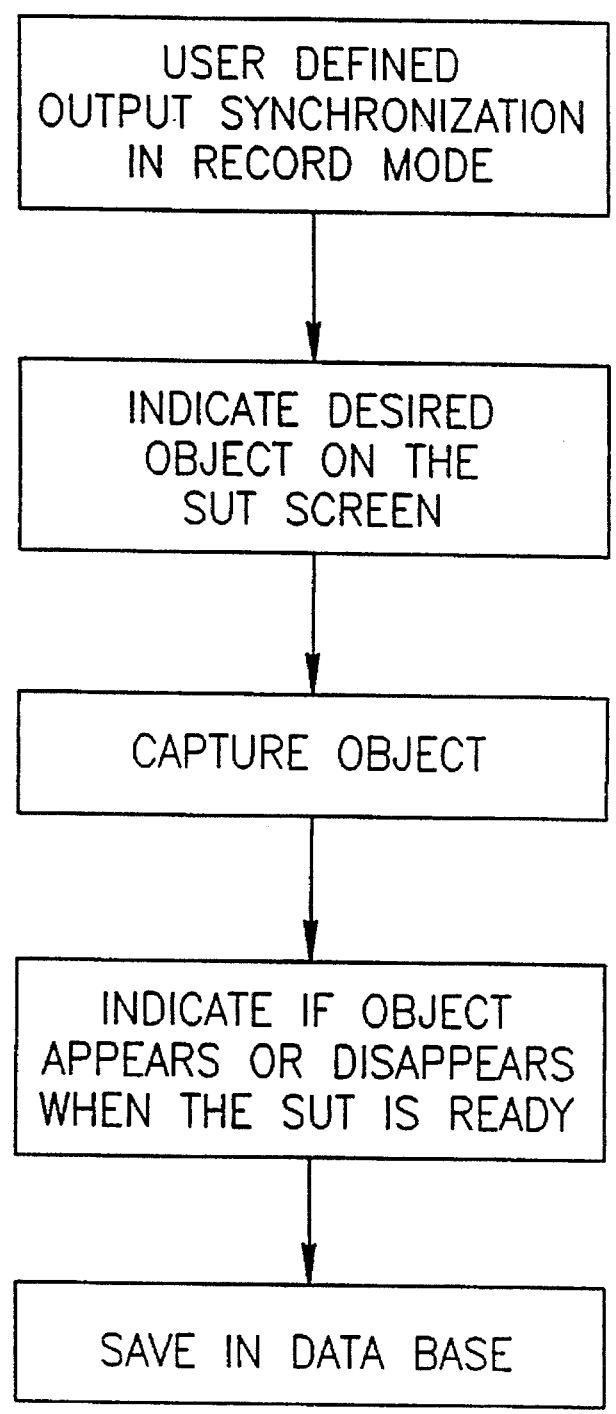
FIGS. 21A and 21B are flow chart illustrations recording and replaying, respectively, of an user-defined output synchronization operation.
Figure 21B:
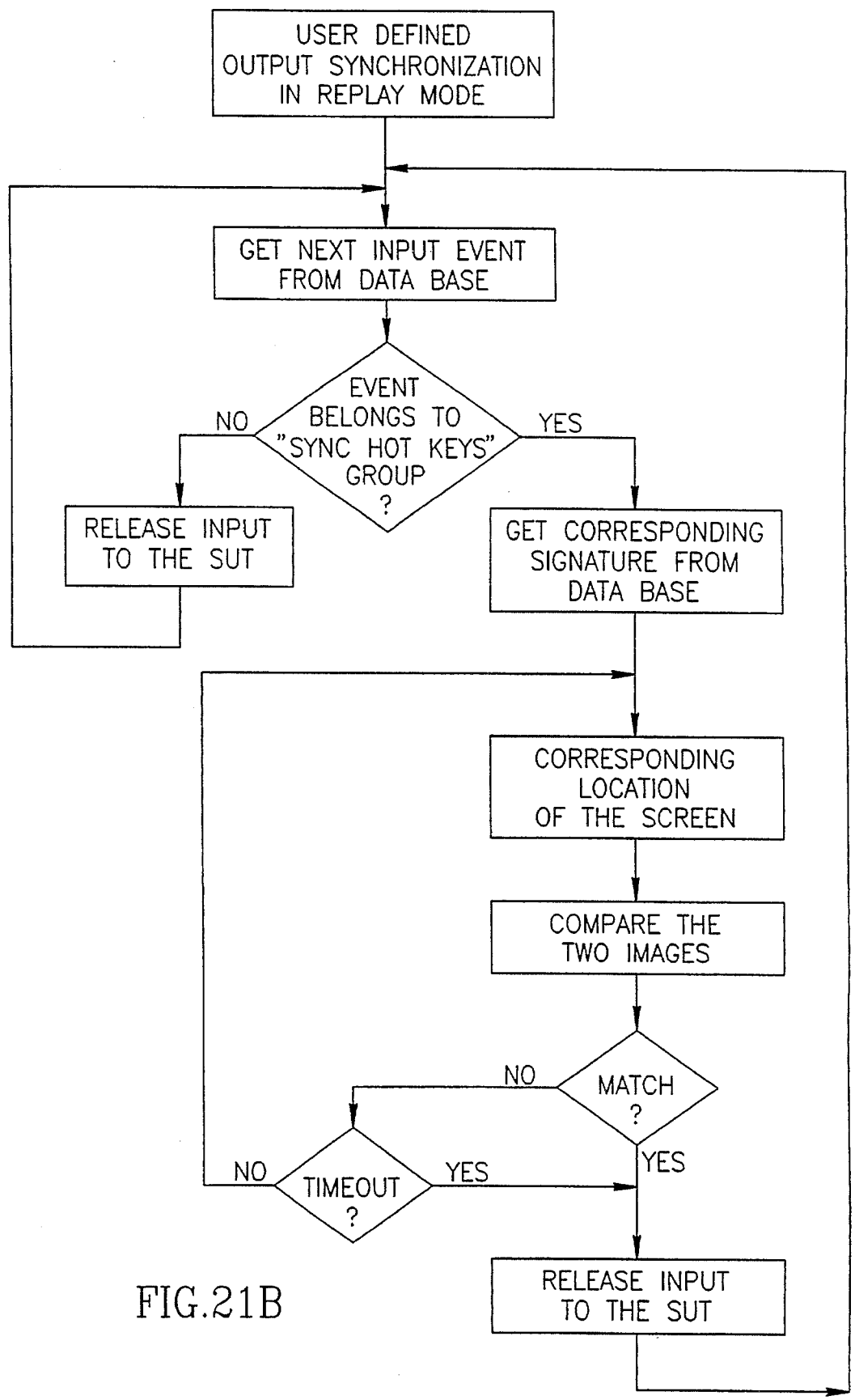

A preferred replay procedure is show in FIG. 21B and is as follows:

1. The host computer 26 retrieves from memory the input event next to be released to the SUT.

2. The next event is identified and if it belongs to user defined group of "synchronization hot keys", step 3 is activated. If not, the event is released to the SUT as described in recording step 7 above and then the system returns to replay step 1.

3. The event is released to the SUT and the signature which corresponds to the next input event is retrieved by the host computer 26 and reported to graphic processor 30.

4. The graphic processor 30, using RT ALU 34 and image Frame buffers 36, monitors the incoming video screens coming from the SUT via graphic interface 18, and the following is carried out:

a. a screen is captured.

b. a signature is computed by using the same computation as described in step 5 of the recording procedure above.

c. the result is compared to the reference signature that was input from the hot keys in replay step 3 above.

5. If a match is found, a message is generated to host computer 26. Otherwise a time-out counter, preferably implemented in software, is updated.

6. If a time-out occurs, a message is generated to host computer 26. If there is no time-out, the system returns to step 4.

7. Upon receipt of the response from graphic processor 30, the next input event is released by the host to the SUT as described above in recording step 7.

The input events to the SUT are released in a form similar to a human operator's response in that the system waits For a certain indication on the screen before releasing the event. This is independent of SUT response times which may react Faster or slower.

User-indicated object based synchronization:

User defined synchronization objects include, fop example, a "wait" message box provided on the screen, a clock icon, etc. A principal benefit thereof is that the user informs the system that a certain screen object indicates whether op not the application is ready for input. The system captures the specified object and uses it for synchronization during replay. The location of specified objects is either fixed on the screen of connected to the locator's icon. The following recording and reply procedures are preferably provided:

Recording procedure (see FIG. 21A):

1. The user defines "synchronization hot keys".

2. The user indicates, by means of a graphic user interface, an object on the screen.

3. Host computer 26 indicates to the graphic processor 30 to capture the object.

4. Graphic processor 30 captures the object and separates the indicated object from any marking made by the user and the graphic user interface (such as encircling of the object with lines). The graphic processor 30 sends the pixel map of the indicated object to the host computer 26 for storage. It will be noted that the user's marking is identified by the host computer 26 through recognition of the user's motions with the SUT mouse.

5. The user attributes to the captured object an indication whether the SUT is ready for the next input while the object appears on the screen.

Replay procedure (see FIG. 21B):

1. The host computer 26 sends an input event.

2. The host computer 26 scans for hot keys as described in steps 1 and 2 of the recording procedure.

3. When hot keys are detected, the host computer 26 commands the graphic processor 30 to wait for the synchronization object to appear on or disappear from the screen.

4. Graphic processor 30 compares stored pixel maps of objects to those on the screen in order to detect specific objects, as follows:

a. Graphic processor 30 imports the object's pixel map from the memory of host computer 26.

b. Graphic processor 30 writes the object's pixel map on frame buffer 48 (FIGS. 4A and 4B) to the location from where it was imported.

c. The graphic processor places a mask which excludes from comparison all pixels that do not belong to the object's pixel map as located in frame buffer d. The graphic-processor initiates a continuous comparison operation between any of the video frames and frame buffer 48.

e. The graphic processor 30 monitors the error counter 68. If its value at the end of the frame is zero, then the expected object appears on the current screen.

f. The graphic processor 30 notifies the host computer 26 that the synchronization object has appeared on the screen.

g. If the expected event fails to occur within a defined period, a timeout message is sent by the graphic processor 30 to the host computer 26.

5. Host computer 26 waits for the message and upon reception releases the next input event to the SUT.

The output synchronization principle employed by the two above-described techniques has the advantage of being sensitive to variations in the SUT's response time, in contrast to state of the art timing synchronization which is based on measuring time intervals between events.

Conditional Testing:

The conditional testing feature enables decision points to be defined from which a number of action paths can be taken. The path that will be taken in a certain instance of the test execution will depends on the outcome of an intermediate test result where a test result is any information or any outcome of a computation made during the test execution whose actual value cannot be determined prior to test execution. For example, a test result might be a screen or any part of a screen which is captured during a test or it might be the amount of time measured during the test execution between any two test events, such as between an input event and an output event indicated by a certain screen.

As a further example, a function of the SUT might be characterized in that after a certain sequence of inputs, the SUT can react in one of many modes by displaying one of a plurality of messages on the screen according to some data internal to the SUT whose values cannot be determined in advance. Each message requests a different response in order to conclude the operation.

In order to test such a function of the SUT, a conditional testing procedure is most suitable, a preferred embodiment of which follows.

Recording procedure:

1. The user records an introductory input sequence which must be played prior to the SUT conditional point reaction.

2. The user sets for the SUT the unique conditions that will cause the SUT to respond in one of its possible reaction modes.

3. The user replays the input sequence of step 1 and at the end indicates to the graphic processor 30 to capture the screen and store the result.

4. The user records the response sequence of input events which are the correct response to the mode which appeared on the screen.

5. The user repeats steps 2–4 hereinabove for each of the plurality of screen displays that the SUT can display.

6. The different screens and corresponding response input sequences are associated together by means of test description constructs which are implemented within system software set forth in Annex E.

Replay procedure:

1. After the introductory input sequence is replayed, the test execution reaches the conditional point. Host computer 26 indicates to the graphic processor 30 to capture the current screen.

2. The graphic processor 30 identifies the captured screen by comparing it to each of the possible screens which have been recorded. Comparison is performed according to any of the methods described hereinabove in the sections entitled Performing comparisons and other operations and Using screen signatures for comparisons.

3. The graphic processor 30 provides the host computer with the identified screen.

4. The host computer 26 replays the response sequence associated with the identified screen.

Treatment of asynchronous events: Asynchronous events are events regarding the status of an application which have a time of occurrence which cannot be predicted in advance. An example of this type of event is the Following: Software working with a modem may display at any time a "modem busy" prompt. This prompt requires a particular response From the user to remove it from the screen. The problems associated with asynchronous events include: a) the SUT's response is not the same during replay as during record; and b) due to their nondeterministic nature, asynchronous events are more difficult to test.

In accordance with a preferred embodiment of the present invention asynchronous events are treated as exceptions, i.e. as interrupts. Asynchronous events are regarded as being related to the test Flow just as hardware interrupts are related to a conventional program flow. A preferred method based on this solution is, briefly, as follows:

1. The user identifies to the system screen objects that correspond to asynchronous events.

2. For each object the user records a response sequence of "input events".

3. The data is preprocessed.

4. The system continuously monitors fop the appearance of any of the indicated objects.

5. Upon detection of one of the indicated objects, the context of the current test is saved, the response sequence is replayed, the test context is retrieved and the test is continued.

Steps 1 and 2 above are preparation steps which involve the user. Step 1 is based upon step 2 of the recording procedure forming part of the user defined object synchronization technique described above.

Step 2 involves recording input events via the connection box 20 and the I/O processor 24 and storing the input events in a database.

The objects and their corresponding response sequences are caused to be associated by means of data base software on the host computer 26 in FIG. 1. The data base software is incorporated in the system software set forth in Annex E.

Steps 3 and 4 form part of the algorithm which is described hereinbelow in detail.

Step 5 describes the sequence of actions taken upon the detection of an asynchronous event. The exact nature of the actions would be defined by the user according to the specific behavior of the SUT.

An algorithm described hereinbelow is operative to detect exceptions. The algorithm is based on relatively fast object recognition performed by the graphic processor, hardware and software, and operates on a group of predefined objects whose positions and shapes must be fixed. The indicated objects may overlap each other.

In detecting occurrences of an object on the screen, response times are of importance. In the present embodiment, described hereinbelow, negative indications of occurrence, such as a "no exception objects" prompt from the graphic processor 30 to the host computer 26 in FIG. 1, are provided within 100 milliseconds. Positive indications of occurrence, such as an "exception occurred" prompt and/or an identification of the detected object, are provided within 250 milliseconds.

The exception detector algorithm preferably comprises two separate phases, a first phase for preprocessing the data and a second phase for continuous acquisition of exception objects on the screen. These phases will now be described in detail.

The preprocessing phase is implemented by means of software, set forth in Annex E, and stored on the host computer 26. The input is a set of objects represented as location specific pixel maps of the SUT screen frame. The input is preferably processed as follows:

1. Upon measuring the similarities of the objects within the object set, the object set is divided into subsets of similar objects. The similarities are measured by calculating the relative number of identical pixels.

2. For each subset of similar objects, a representative agent is defined where the pixel map of the representative agent is the collection of pixels common to each object in the subset.

3. For each object within a subset, "discrimination data" are computed. The "discrimination data" is a set of pixels comprising a relatively small number of pixels which are unique to that object. The discrimination pixels for each object are determined by means of a pixel map intersection operation between the object and the representative agent. A preferred order according to which the objects may be checked is also important and will be discussed in the forthcoming description of the acquisition phase.

4. The representative agents of all the subsets are combined to create the following three inputs to the acquisition phase:

a. a combined pixel map being a map of only the representative agents.

b. a combined mask map being a mask which masks out all but the locations of the representative agents.

c. for each representative agent, a list of pixel locations, or "checkpoints", to be checked by the graphic processor software. Each checkpoint is typically a memory location on the result frame buffer whose incremental error counter value is to be read by the software. The incremental error counter value stored in the checkpoint typically indicates whether or not the representative agent is found on an input screen frame. For most objects, only two checkpoints are necessary. For overlapping objects, many checkpoints are necessary to distinguish if one, some or none of the overlapping objects are present.

These inputs are used in conjunction with the RT ALU 34 and image frame buffers 36 of FIGS. 4A and 4B, as controlled by graphic processor 30, to detect the occurrence of one object out of many objects some of which may be fully or partially overlapping.

5. The three inputs are communicated by the host computer 26 to the graphic processor 30. Input "a" is downloaded directly to frame buffer 52 by means of GPU 74 (FIGS. 4A and 4B) and bus 82. Input "b" is downloaded directly to frame buffer 66 to be used as a mask. Input "c" is stored in DRAM 86 to be utilized by GPU 74 software. The discrimination data of step 3 is downloaded by similar means to DRAM 86, there to be utilized by the GPU 74 software.

6. The graphic processor 30, ALU 34, and buffers 36 now operate in accordance with the acquisition phase described below. The host computer 26 may activate or deactivate the acquisition phase by issuing a suitable prompt to the graphic processor 30.

The acquisition phase will now be described with particular reference to FIGS. 4A and 4B:

1. A comparison operation is set between frame buffer 52, in which is stored the combined pixel map, and the incoming video from serializer 40. The mask plane (input b of step 4 of the preprocessing phase) is selected to affect the error counter 68 operation and the results are directed into frame buffer 70. A detailed description of the setting was previously given under the heading Incremental Error Counting. For this operation, though, the incoming video is also captured into frame buffer 48 for later use in step 6 below.

2. The error counter values at predetermined checkpoints are read by using input c from step 4 of the preprocessing phase. Their values indicate whether or not a given agent was detected.

3. If the result in step 2 above is negative, a suitable prompt is sent by graphic processor 30 to the host computer 26. In response, the host computer 26 may command the graphic processor 30 to proceed with the current operation or to terminate it.

4. If the result in step 2 above is positive, a suitable prompt is sent to the host 26, causing a discrimination algorithm, described hereinbelow in step 6, to be activated automatically in the graphic processor.

5. The host computer 26 terminates the current test, but saves its context, and awaits identification of the exception event.

6. The graphic processor 30, preferably by software means, examines the current video image in frame buffer 48 (FIGS. 4A and 4B) for the presence of discrimination data which would identify which object of the identified subset is the object present. The operation performed is a comparison between the discrimination data points and their counterparts in the object in the current video image. Thus, the "discrimination data" of step 3 of the preprocessing phase are used to rapidly identify the object within the subset.

Once the object has been identified, the graphic processor software updates in the data base an objects list which orders the objects within each class according to their likelihood of appearance. This order of objects determines the order by which the objects of each subset are examined by the detection and discrimination procedures described hereinabove, thereby generally shortening the mean time for full object identification.

7. The graphic processor generates an identification prompt to the host computer.

8. The host computer receives the prompt and activates the proper response sequence associated with the identified object as explained in step 5 above.

It is appreciated that the above technique allows an indication of whether particular objects have appeared to be provided, wherein objects may overlap partially or fully, and without performing a complete comparison for each object.

A preferred object code for implementing the apparatus and method of the present invention is set forth in Annex E.

Annex D describes an installation, environment and operating instructions for the object codes of Annex E.

Cursor Manipulation Device Tracking and Movement Replication:

The present invention is also operative to track and replicate the operation of cursor manipulation device 14.

Figure 18:
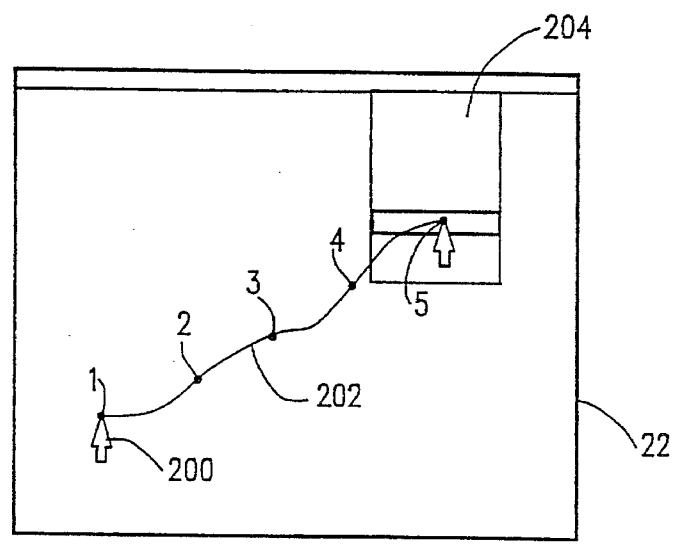
FIG. 18 is a pictorial illustration of a screen of a monitor of a system under test in response to the movement of a cursor manipulation device.

Reference is now made to FIG. 18 which illustrates a path for an example cursor manipulation device. The cursor, represented by an icon 200, begins at a first location, marked 2. As an operator moves the cursor manipulation device 14, the icon 200 travels along a track 202 on the monitor 26, finally arriving at a point, labelled 5, where the operator selects a desired operation.

Movement along track 202 comprises the following four types of operations:

1. Physical level communication operations: These are physical operations performed by the cursor manipulation device 14 in its communications with the system. Example operations are a reset command to the cursor manipulation hardware or a recovery sequence from a transmission error.

2. Cursor manipulation movement events: These are events which signify the movement of the device 14. They are shown on the monitor through movements of the icon 200. Most of the cursor manipulation operations are such events.

3. Cursor manipulation selection events (Clicks): These events, termed "track terminators", are mainly a result of pressing and releasing cursor manipulation buttons. They are typically interpreted by the application as a selection of an object on the monitor and typically cause the application software to change the display.

A typical change in the display is to "drop" a menu 204. The icon 200 is displayed against the menu 204, typically by overlaying the menu 204.

4. Cursor manipulation timing events: The timing is measured between cursor manipulation events. The timing is not an output of the cursor manipulation device but is an important aspect of its operation. If other cursor manipulation events are recorded and replayed without consideration of the time intervals between events, the application will typically not react in the same way.

The actual track 202 is not unique; other tracks reasonably close to track 202 will produce the same results. However, it is desired to replicate track 202, as much as possible, because, as is known in the art, different tracks to the same final location may produce different responses from the application software due to the action of menus and other cursor sensitive locations. Furthermore, from a user-interface point of view, the quality of the replication depends on how closely the sequence of the movements on the monitor 26 matches those of the recording operation.

Thus, the system of the present invention preferably replicates the track 202 by ensuring that:

a) the select events during a replication session are performed while the icon 200 is positioned exactly in the same location on the monitor 26 as it was during a recording session;

b) the timing of the selection events is output synchronized; and c) the track 202 is replicated as closely as possible.

Therefore, the present invention stores the beginning and ending locations, locations 1 and 5, of the icon 200 and a multiplicity of locations along the track 202 between locations 2 and 5. The other locations are labelled 2–4.

Figure 12A:
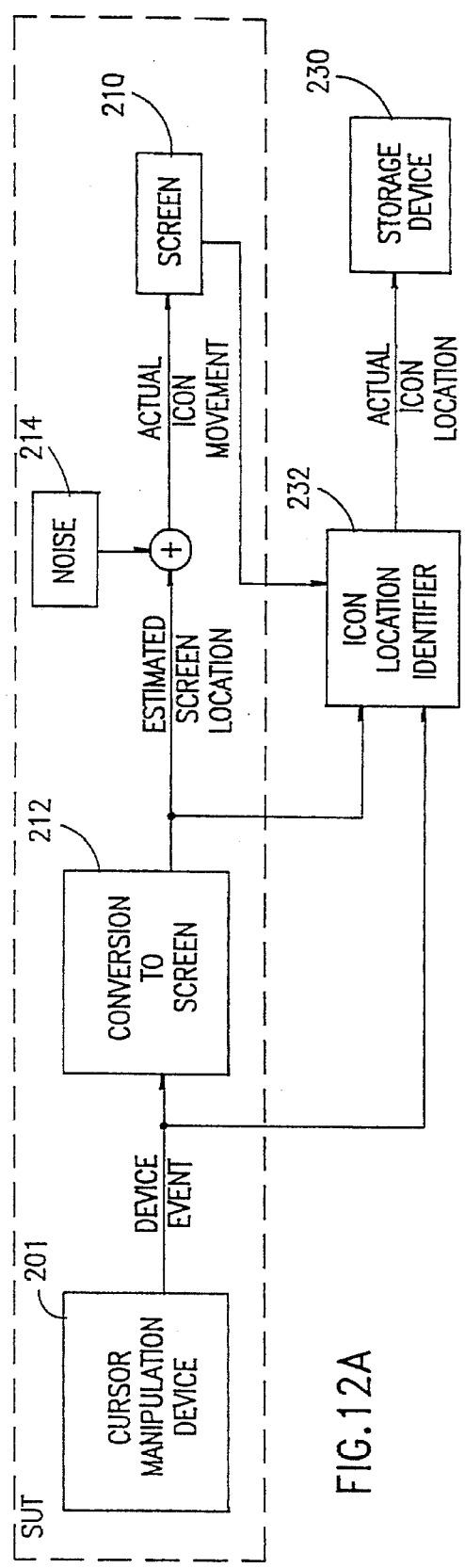
FIGS. 12A and 12B are block diagram illustrations of a system For recording and for repeating the movement of a cursor manipulation device, constructed and operative in accordance with an embodiment of the present invention, where
Figure 12B:
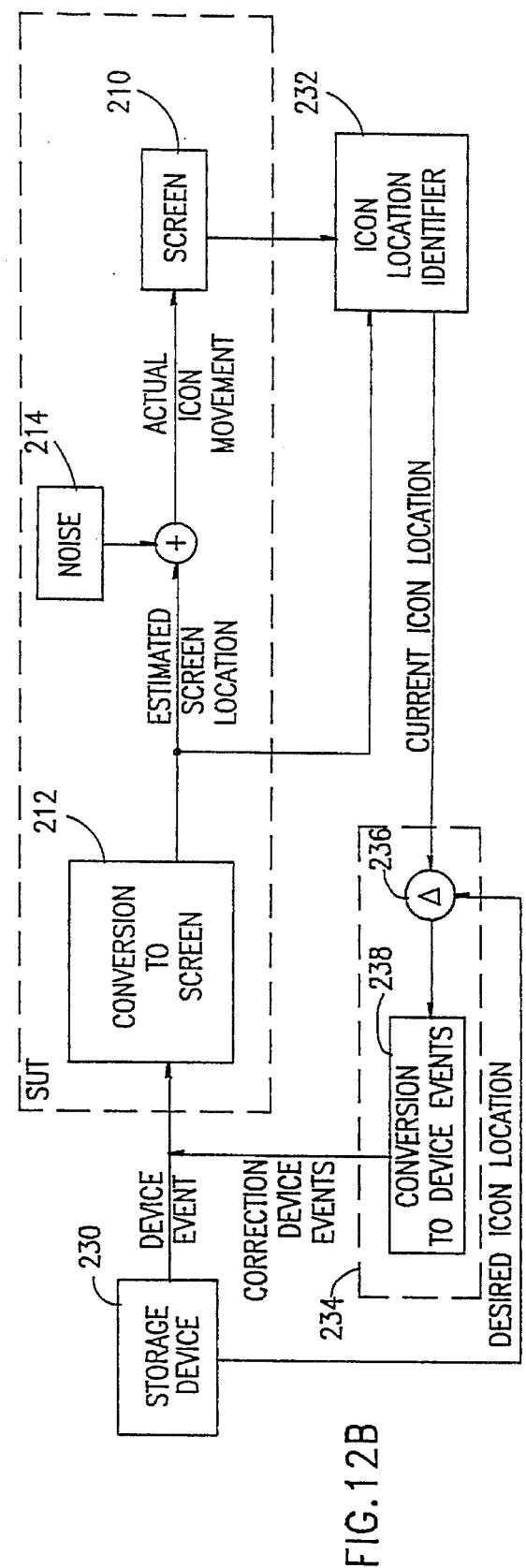

Reference is now made to FIGS. 12A and 12B which illustrate a system fop recording and replication the operation of cursor manipulation device 14 forming part of the system of the present invention wherein FIG. 12A illustrate the elements of the system operative during a recording mode and FIG. 12B illustrates the elements operative during a replication mode.

During recording of a series of operations with cursor manipulation device 14, the device 14 produces a datastream of device events which are converted, via the SUT, to movement on a screen 210 of monitor 26. Due to the non-deterministic nature of the conversion, the conversion can be conceived as comprising a deterministic conversion portion 212, which provides an estimated location of icon 200 on the screen, and an unknown random noise source 214 which models the random loss of some of the device events. The noisy signal from the noise source 214 is added to the estimated location of icon 200 and the result is the actual movement of icon 200 which is seen on the screen 210.

The deterministic conversion portion 212 estimates the location of the icon 200 on the screen 210 from a known scaling function between device events and screen movement.

A typical scaling function 216 is shown in FIG. 13 to which reference is now briefly made. The function 216 is typically piecewise linear and typically includes two sections 218 and 220. Section 218 typically has a small slope thereby to amplify small movements of the device and section 220 has a large slope, thereby to provide large movements in response to a large device events.

In accordance with the present invention, the actual location of the icon 200 in a multiplicity of locations between and including track terminators, as well as the entirety of device events between track terminators, are stored in a storage device 230, such as computer memory or a hard disk.

The actual icon location is identified in an icon location identifier 232 which receives the estimated screen location of icon 200 from device 212 and captures the output on screen 210. The estimated location is used to identify areas of the screen 210 where the icon 200 is most likely to be found. These areas are then searched and the location of the icon 200, if it is found, is noted. If the icon 200 is not found in an area of high probability, then the remainder of the output on the screen 210 is searched.

The operation of the identifier 232 is described in more detail hereinbelow. It will be noted that the identifier 232 is comprised of the graphic processor 30, the host computer 26, the frame buffers 36 and the RT video ALU 34 and is operative, for this purpose, to identify the location of icon 200.

In the replication operation, shown in FIG. 12B, the storage device 230 releases the stored device events which are converted to actual icon movements via the BUT, as described hereinabove. The icon location identifier 232 identifies the current icon location from the estimated icon location and the actual output on the screened 210, as described in general herinabove.

In accordance with a preferred embodiment of the present invention, the system for replicating the operation of device 14 additionally comprises feedback apparatus 234 for correcting, if necessary, the icon location to the desired location, as defined by the recording operation and as provided by storage device 230. The feedback apparatus operates on the current icon location, provided by identifier 232, and the desired icon location, to provide a correction signal to the device events datastream to move icon 200 from its current location to the desired location.

Feedback apparatus 234 typically comprises a differencing unit 236 for providing the difference between the current location and the desired location of the icon 200 and a conversion device 238 for converting the difference from a screen difference to a datastream of device events which cause the icon to move from its current location to the desired one. The output of conversion device 238 is provided to the SUT. The operation is repeated until the icon 200 is in the desired location.

Figure 14A:
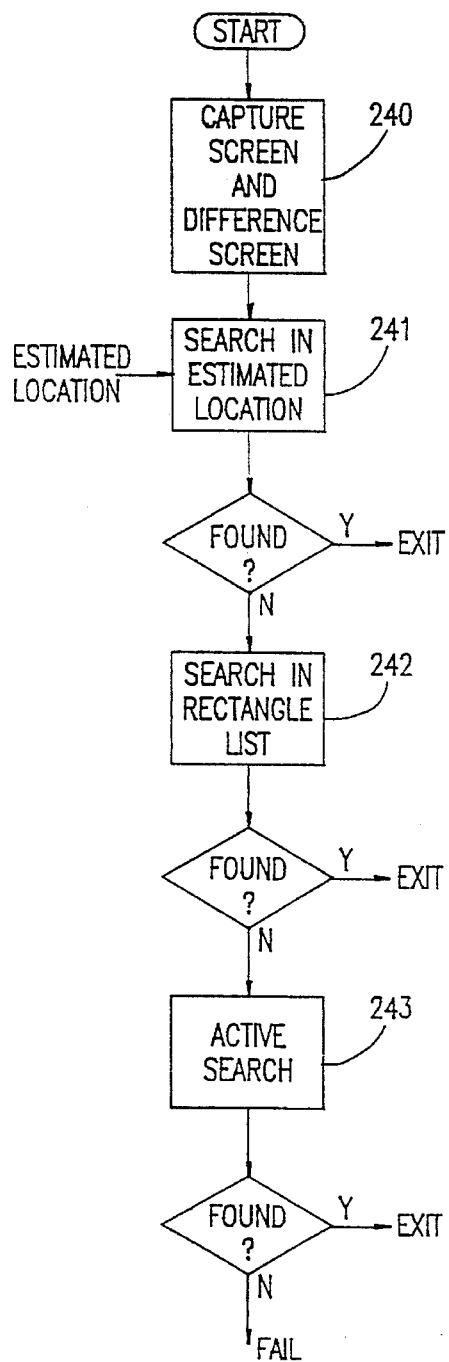
FIGS. 14A, 14B and 14C are flow chart illustrations of the operation of a screen position identifier useful in the system of FIGS. 12A and 12B.
Figure 14B:
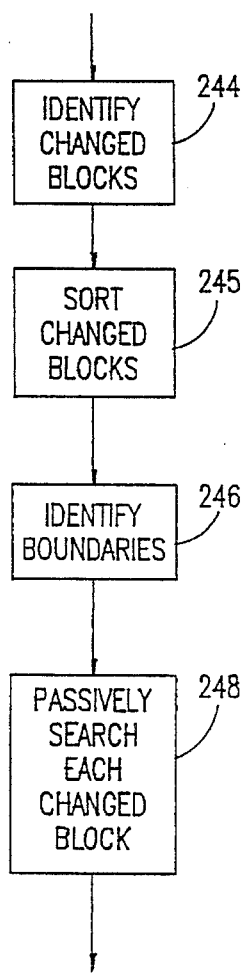
Figure 14C:
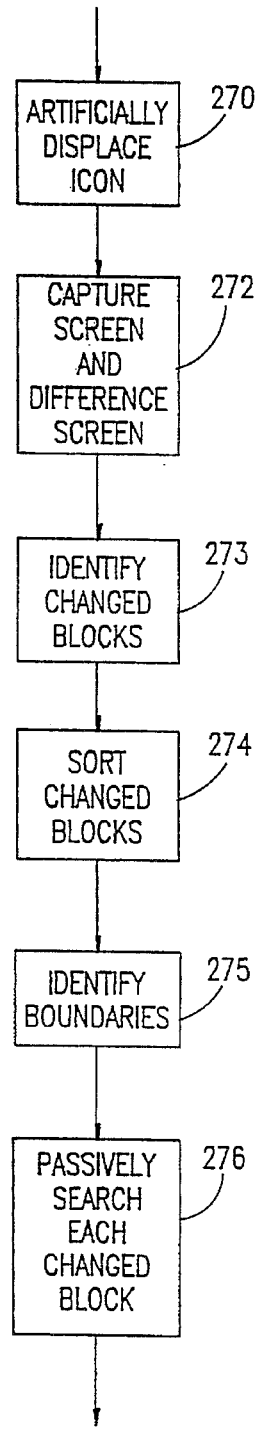

Reference is now made to FIGS. 14A, 14B and 14C which illustrate, in flow chart form, the operation of the icon location identifier 232. Before describing the operation, the following should be noted:

The identifier 232 operates on track 202 which is defined as a data object comprising a set of cursor manipulation device and timing events between two track terminators which are produced by the cursor manipulation device 14 and the I/O processor 24. A track terminator is preferably any of the following events: cursor manipulation or keyboard key press, key release, key click, and capture screen or capture signature commands provided by the host computer 26, as described hereinabove.

In accordance with the present invention, the track data object is characterized by the following data:

a) Initial point (location 1 of FIG. 18): The initial point is the location of the icon 200 at the beginning of a track. The end point (location 5 of FIG. 18) of the track data object is related to the initial point by an offset produced from a measurement on the screen. Thus, a track is a relocateable object.

b) Move events: The move events are the device events transmitted to the application. In the record operation, these events are used to estimate the present location of the icon 200 as accurately as possible.

c) End point: The end point is the point where a track terminator occurred. It is given as an offset, in monitor coordinates, relative to the initial point of the track. The end point also includes additional information which is used to crosscheck the location and timing of the selection event.

d) Time interval: The time interval is the time which elapses between two consecutive device events. It is recorded and is used for synchronization purposes and is necessary since some applications are sensitive to the exact time interval between two device events.

It will be appreciated that the cursor manipulation device behavior during a test is partitioned into tracks, where the end point of one track is typically the initial point of the next one. This holds true except when the application itself displaces the icon independently and thus creates a discontinuity between tracks.

It will be noted that the correct replication of the cursor manipulation behavior during the entirety of the test is equivalent to the correct replication of each track.

With reference to FIG. 14A, the identifier 232 begins by capturing, in step 240, the output to screen 210, as described hereinabove. The identifier 232 also captures the difference screen which is the difference between the present screen and the previous screen for which the calculations of FIG. 14A were performed.

Most of the operations of FIGS. 14A, 14B and 14C are performed on the graphic processor 30. The operations are described in detail in pseudocode format in Annex F. As mentioned hereinabove, the operation of the entire system, including the operations of the identifier 232 are given, in object code format, in Annex D.

In step 241, the system passively searches the captured screen in the estimated location and in the eight neighboring locations of the estimated location. This is detailed in routine Do_passive_search_in_place.

The system attempts to match any of a set of predefined icon shapes, centered on the pixel at the estimated location, to the pixels its neighborhood. The matching is performed for each of the nine pixels to be searched.

The recognition operation comprises direct correlation of the pixel values from the screen 210 with the predefined icon data. A special caching mechanism places the icons most often recognised at the head of the icon list in order to further optimize the search time of the icon shape. The pattern recognition method is described in detail hereinbelow and is outline in detail in routine Shape correlate of the pseudocode of Annex F.

If an icon is found in the immediate neighborhood of the estimated location, the location of the center of the identified icon 200, or the location of its hotpoint, is stored and the search ended. Otherwise, the method proceeds to step 242.

In step 242, a list of areas which have changed between the present and previous captured screens is generated and the areas are searched in the order of most probable to least probable.

If the icon is found in one of the areas of the list of step 242, the method exits. Otherwise, an active search is performed, in step 243, to find the icon. The active search, described in detail hereinbelow, includes artificially providing device events to the SUT and searching the screen which results. Typically, the icon will be found by this process. If not, the method fails.

The method of step 242 is detailed in FIG. 143. The list of step 242 is generated as follows. The difference image is a frame of data, as shown in FIGS. 15A and 153 to which reference is now briefly made. In step 244 (FIG. 143), the frame is divided into a plurality of strips, for example four strips 250, 252, 254 and 256, and the location of changes from the previous frame of data is identified as follows: Error count values are produced, as described hereinabove, for the entirety of the frame. A strip with changes is one whose error count value at the end of the strip is different than that at the beginning of the strip. In FIG. 15A, strips 250 and 256 have changes in them.

Each strip which has changes in it is divided into a plurality of blocks 258 of a predetermined size. The changes are identified by comparing the sum the error count values at the right border of each rectangle with the sum of the error count values at the left border of the rectangle. Example borders are noted by reference numeral 259. In this example, the middle two blocks of strips 250 and 256 of FIG. 15A have changes in them.

Step 244 is described in routine Generate rect list of the pseudocode of Annex F.

In step 245, the estimated screen location is utilized to sort the changed blocks 258 according to the probability of the cause of the difference being the movement of icon 200. This is shown in FIG. 153 where the changed blocks, noted 258a, 258b, 258c and 258d, are marked with an X, the previous location of icon 200 is noted by reference numeral 260 and the current estimated location of icon 200 is noted by reference numeral 262.

The blocks 258 are sorted in the following order: 258b, 258a, 258d and 258c.

In step 246, the boundaries are defined of the search area where the icon is most likely to be found. This is shown in FIG. 16, to which reference is now briefly made. The possible boundary 266 of the location of icon 200 are determined from its estimated location 262 and the entirety of the device events which were generated since the last known location 260. The boundary is a square defined by four arrows, one in each horizontal and vertical direction. The length of an arrow is defined by the location From the estimated location 262 which would have been achieved if the entirety of the device events in the direction 180° to it had been lost.

For example, if all of the device events for moving to the left were lost, then the only horizontal movement would have been that generated by the device events for moving to the right. Thus, arrow 264 to the right represents the sum of the device events for moving to the left from estimated location 262, typically multiplied by a constant between 0.0 and 1.0 indicating the percentage of the device events in that direction which are estimated to be lost. The boundary 266 identifies the most probable area around the estimated location 262 in which the icon 200 is to be found. It will be noted that boundary 266 grows with the number of device events between the present and previous locations 260 and 262.

The search will first be performed in the area within boundary 266.

Therefore, in step 248, the list is first organized to include the rectangles within the boundary first and those without the boundary second. The passive search method, described hereinabove, is performed, in order, on the rectangles of the present captured screen. This is detailed in routine Do_passive_search_in_rect of Annex F.

In order to reduce the size of the search area, Do_passive_search_in_rect additionally includes a routine Reduce_rect_area which reduces the search area inside of each rectangle as described herein.

Figure 15C:
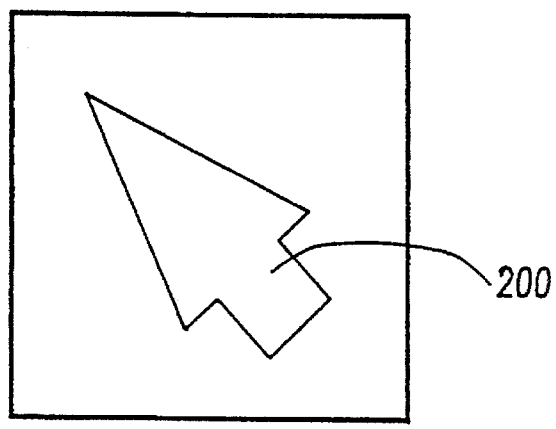
FIGS. 15C, 15D and 15E are illustrations of operations on a block of an image useful in understanding the calculations of the flow chart of FIG. 14B.
Figure 15D:
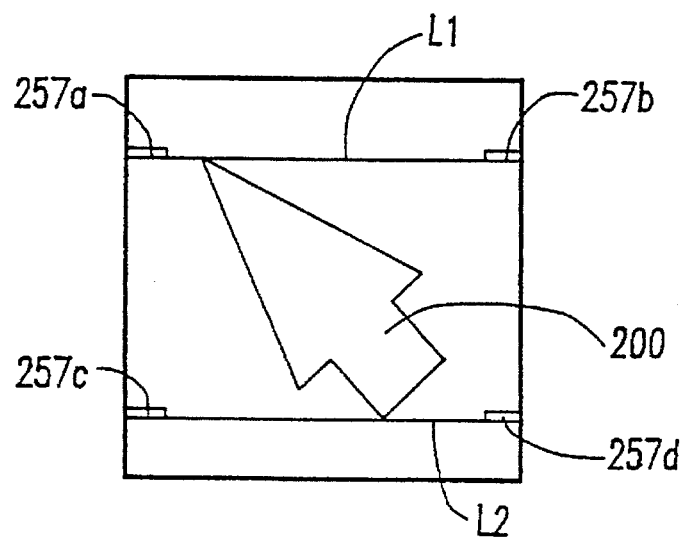
Figure 15E:
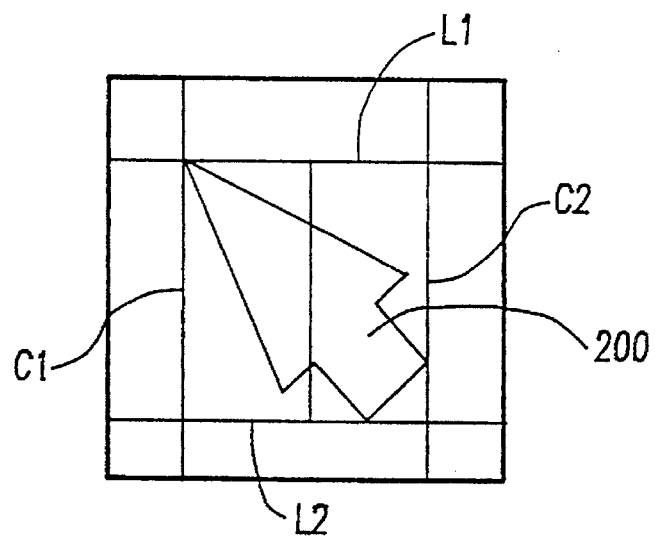

Reference is now briefly made to FIGS. 15C, 15D and 15E. FIG. 15C illustrates a rectangle which includes in its a change comprising an icon 200.

Similar to the operation of step 244, the incremental error counters, labelled 257a–257d in FIG. 15D, at the beginning and end of the rows of the rectangle are searched, in a row-by-row manner, from top to bottom. The first row from the top in which there is a change, labelled L1, is noted, as is the first row from the bottom in which there is a change, labelled L2. A row has a change in it if the difference between the error counter at the beginning of the row and the error counter at the end of the row is non-zero. For example, if the difference between error counter 257b and error counter 257a is non-zero.

The area between lines L1 and L2 is divided into four rectangles and the method of step 242 is utilized to find which of the rectangles is empty. As shown in FIG. 15E, the leftmost column of the leftmost non-empty rectangle is labelled C1 and the rightmost column of the rightmost non-empty rectangle is labelled C2.

The passive search is performed in the area bounded by L1, L2, C1 and C2.

A method for learning and storing the plurality of possible icon shapes is described in detail hereinbelow.

The active search of step 243 is described hereinbelow with respect to FIG. 14C. In step 270, additional artificial device events of a known direction are introduced. In step 272 the screen which results from the artificial device events and a difference screen are captured. The known direction is utilized in steps 273–276, which are identical to steps 244–248 of FIG. 14B, to identify the possible locations of changes which correspond to the artificially produced movements of the icon 200. Typically, only a few change areas will be found.

This process is repeated until the icon 200 is located or a predetermined number of iterations have occurred.

It will be appreciated that the active search operation is also utilized by the feedback apparatus 234 to provide the correction signal. After the correction signal has been provided, the method of FIG. 14A is performed to ensure that the icon 200 has moved to the desired location.

It will also be appreciated that the method of FIGS. 14A, 14B and 14C generally is computationally expensive, both in time and in operations. Unfortunately, at least during recording, the cursor manipulation device behavior should not be irregular or disturbing to the user.

Therefore, in accordance with the present invention, the system operation is divided between the graphic processor operation and the host program. The graphic processor 30 performs the calculations of FIGS. 14A, 14B and 14C and the host computer 26 provides the data which the graphic processor 30 uses.

The host computer 26 captures the device events, stores them in a database and transmits them to the SUT. In parallel to the operations of the host computer 26, the RT video ALU 34 provides the graphic processor 30 with the current screen output.

Whenever the graphic processor 30 is in an "idle mode" and not performing the calculations of the method of FIGS. 14A 14C, it performs double buffering.

The double buffering operation includes storing in a first frame buffer 36 a previous screen and capturing into a second frame buffer 36 the first screen which is different than the previous screen, as measured by a difference image. The second frame buffer 36 then becomes the previous screen and the first frame buffer 36 captures the next screen which is different.

When the graphic processor 30 receives a command to begin calculating, it switches to a "track mode" and freezes the data in the buffers 36 as well as the already calculated difference image. The difference image reflects the most recent change which has occurred on the screen 210.

Track mode are those operations of the graphic processor 30 while the cursor manipulation device is moving between two track terminators. Specifically, track mode consists of the operations of step 240 of FIG. 14A and step 244 of FIG. 14B.

It will be appreciated that, due to the above switching operations of the graphic processor, the screen calculations ape not performed on every screen which results from a device event. Rather, the method is performed periodically while the device events are continuously transmitted. This is reflected in FIG. 18 where data from only certain locations along the track 202 are utilized for the computation of graphic processor At a track terminator, the graphic processor switches to "endpoint mode" and performs step 248 of FIG. 14B. If the icon 200 is not found, then the graphic processor 30 switches to "active mode" and performs all of the steps of FIG. 14C. In active mode, the device events are introduced to the SUT while computing the estimated current position on the screen. This is performed in parallel and asynchronously by the graphic processor in order not to disturb the user.

In this way, the system performs the processing so that the user is generally unaffected by the heavy computations carried out on the graphic processor 30.

The passive search of step 248 will now be described in detail. Because the search is bounded in time, the number of pixels to be searched is minimized. The pixels to be searched are ordered so as to yield the shortest average search time.

As described hereinabove, the search order is produced by using information regarding the estimated location of the icon and the device events which brought the icon 200 to its current location.

A correlation procedure is called to correlate each pixel with each of the possible icons in the icon list until one icon is recognized. The correlation procedure is optimized to generally quickly eliminate the checked pixel.

The passive search method looks for changes in the shape of icon 200, where a change is defined as a pair of adjacent pixels whose pixel values differ. An example rectangle enclosing an icon 200 is shown in FIG. 17 to which reference is now briefly made.

Each icon 200 is characterized by a vector of pairs of distinctive pixels either from the contour of the icon 200 (i.e. one pixel of the pair belongs to the icon shape and the second belongs to the background), or preferably, are from inside the shape (i.e. both pixels belong to the icon shape). These pairs of pixels are termed "change points". Example contour change points, labelled 280, and example internal change points, labelled 282, are shown in FIG. 17.

For some icons, only contour change points can be found. Typically, the change points are evenly distributed about the icon shape.

The change points are provided to the passive search procedure. They are typically determined either by the user or from an automatic icon learning module described in detail hereinbelow.

Each change point is defined as a data structure which includes the pixel values, the attribute of internal or contour, and an offset of the change point relative to the hotpoint of the icon 280.

The hotpoint of the icon 200 is the pixel which defines the location of the icon 200. When the address of the hot point on the screen is given, the relative offset is used to compute the address of the change point on the screen.

The icon correlation procedure receives as input from the host the current search pixel and the current icon 200 to be matched. The procedure tests whether the hotpoint of icon 200 coincides with the current search point.

Since the correlation procedure is repeated for the entirety of search pixels and the entirety of possible icons, it is operative to eliminate generally quickly search pixels where the icon 200 is not drawn while providing no false identification of an icon where none exists.

The correlation procedure is operative to match an icon hotpoint to the current search pixel. Therefore, for each change point in the data structure of an icon, the correlation procedure computes the address of the change point relative to the search pixel and then accesses the screen frame buffer at the computed address. The correlation procedure reads the pair of pixels at the computed address and compares the pixel values of the pair to the pixel values which are stored in the data structure of the present change point.

Internal change points are processed first since a mismatch in an internal change point indicates that the current icon to be matched does not match the icon on the screen.

In order to positively recognize the icon on the screen, the entirety of internal change points must match. If the number of internal change points which match is more then a software defined empirical threshold, the procedure returns with success.

Otherwise, the contour change points are processed as follows: each contour change point is checked as above, but only the value of the pixel which belongs to the icon is compared. As before, a single error eliminates the current search point.

Additionally, for contour change points, each point is checked as to whether or not it is a difference point wherein a difference point is one where the pair of points have different pixel values. The icon is recognized if at least N percent of the contour points are also difference points, where N is a predetermined constant, typically of 75%.

It will be noted that contour change points are less reliable then internal change points since internal change points are part of the shape of the icon 200. For some systems where icons are drawn with a dedicated colour, the internal points which are not necessarily change points can be solely used, because detecting that colour on the screen implies the presence of the icon.

Reference is now made to FIGS. 19A, 19B, 19C and 19D which are useful in understanding a method for acquiring information regarding icon 200 described herein. The method is an off-line operation involving interaction with the user which produces a data structure containing all relevant data about all icons 200 utilized by the BUT 12. The data structure is downloaded into the graphic processor 30 at startup.

The data structure for each icon 200 comprises the shape of the icon 200 represented as a bitmap and the hotpoint of the icon. As mentioned hereinabove, the hotpoint is the reference point on the icon 200 relative to which the icon 200 is drawn on the screen 210.

The icon acquisition method comprises three stages, an interactive stage fop acquisition of bitmaps of each icon 200, an internal processing stage fop generating data used in the search process, termed "detection data" and a download stage for downloading the detection data to the graphic processor 30.

The interactive stage fop each icon 200 comprises the steps of acquiring the bitmap and a mask of the icon 200 and acquiring the information needed to align the detection data according to the hotpoint of the icon.

The shape of each icon 200 is represented by two rectangle bitmaps, the icon bitmap and the icon mask. The icon bitmap contains the bitmap which is drawn every time the icon 200 appears on the screen 210. The icon mask bitmap is a binary bitmap with pixel values of 1 for pixels corresponding to those pixels in the first bitmap which belong to the icon and pixel values of 0 for the remaining pixels.

Figure 19A:
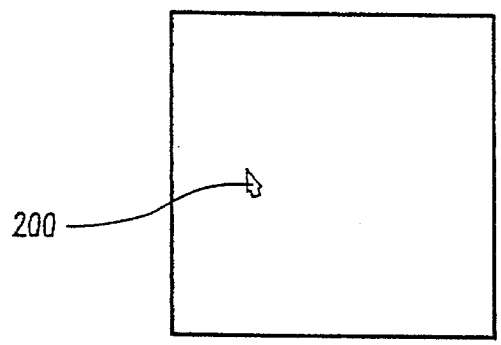
FIGS. 19A–19D are pictorial illustrations useful in understanding a method for acquiring information regarding an icon.

The two bitmaps are acquired in accordance with the following steps and as shown in FIGS. 19A, 19B, 19C and 19D:

1) As shown in FIG. 19A, the user brings the icon 200 to a position on the screen which contains none of the colors of the icon 200.

Figure 19B:
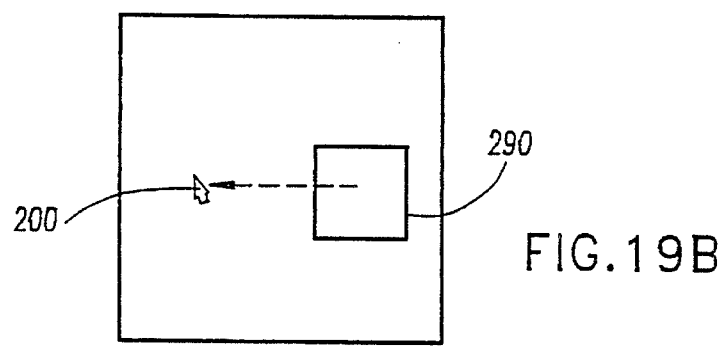

2) The user indicates, by pressing a softkey, that the icon 200 is in the desired location. The method then provides a rectangle 290 on the screen, disconnects the cursor manipulation device 14 from the icon 200 and reconnects device 14 to the movements of the rectangle 290. This is shown in FIG. 19B.

Figure 19C:
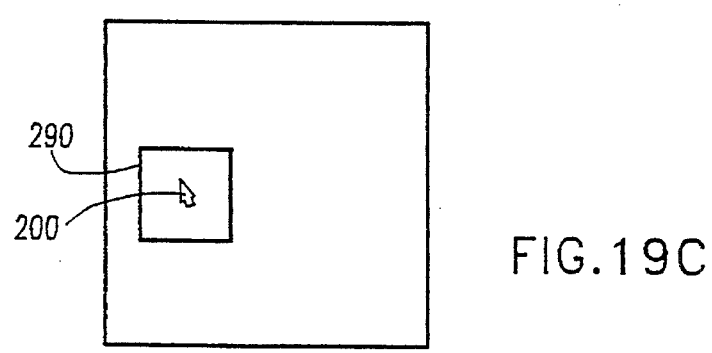

3) The user encloses the icon 200 with the rectangle 290 and presses a softkey to indicate that he did so. This is shown in FIG. 19C. The system then captures the bitmap enclosed by the rectangle 290, which is the icon bitmap, and reconnects the device 14 to icon 200.

Figure 19D:
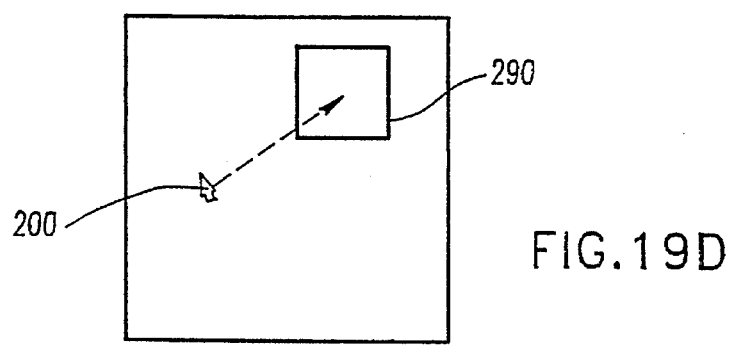

4) As shown in FIG. 19D, the user moves icon 200 outside of the rectangle 290 and presses a softkey to indicate that he did so. The system then captures the bitmap enclosed by the rectangle 290, which is a clean bitmap.

5) The icon bitmap is saved and is XORed with the clean bitmap. The result is the icon mask bitmap which is saved.

6) Typically, steps 2–5 ape repeated a number of times to ensure that the results are reliable even if the background of the mask is not always clean. 7) To merge the multiplicity of icon bitmaps and icon mask bitmaps, one set of icon bitmap and icon mask bitmap is defined as the reference mask. For the others, the following steps are performed:

i) The icon bitmap is searched from left to right and from top to bottom. The first pixel which is different from the background is used to align the icon bitmaps.

ii) Each icon bitmap is shifted, one pixel at a time, across the reference icon bitmap. The shifting is performed from the center of the rectangle first to one side and then to the other. Typically, for each horizontal shift, all the possible vertical shifts are performed.

iii) For each shift, two differences images are compared. The difference images are those between the icon bitmap and the reference icon bitmap and the icon mask bitmap and the reference icon mask bitmap.

For each pixel location, if it has a value of 1, the pixel values on the corresponding icon bitmaps are checked and if they ape identical a counter is incremented. The correct shift between the icon bitmaps is the one that yields the maximum counter value.

iv) Once the correct shift for the icon bitmap is calculated, it is merged with the reference bitmap. To perform the merging, the two differences images are compared. For each pixel in the difference image of the icon to be merged the following is checked: if it has a pixel value of 0 on the reference mask bitmap and a value of 1 on the icon mask bitmap of the icon to be merged than the pixel is considered as a new pixel. The new pixel is included in the reference icon bitmap by changing the reference mask value to 1 at the location of the new pixel and replacing the pixel value on the reference icon bitmap with the pixel value of the new pixel.

8) The hotpoint of the icon is acquired. Since, as is known in the art, the hotpoint always stays within the borders of screen 210, then when the icon 200 is placed on one edge of the screen the visible part of the icon includes the hotpoint. If the icon 200 is brought to both the horizontal and vertical borders of the screen 210, the intersection of the pixels in the column directly adjacent the horizontal border and in the row directly adjacent the vertical border includes one pixel which is the hotpoint.

The icon hotpoint is acquired as follows:

i) The user brings the icon 200 to one of the screen borders. Part of the icon must be visible.

ii) The user indicates, by pressing a softkey, that the icon 200 is in the right place. The method then provides a rectangle on the screen, disconnects the cursor manipulation device 14 from the icon 200 and reconnects device 14 to the movements of the rectangle.

iii) The user encloses the icon 200 with the rectangle and presses a softkey to indicate that he did so. The system then captures the bitmap enclosed by the rectangle, which is the icon bitmap, and reconnects the device 14 to icon 200.

iv) The user moves icon 200 outside of the rectangle and presses a softkey to indicate that he did so. The system then captures the bitmap enclosed by the rectangle, which is a clean bitmap.

v) The icon bitmap is saved and is XORed with the clean bitmap. The result is the icon mask bitmap which is saved.

vi) The icon bitmap and the icon mask bitmap are aligned, as described hereinabove, with the reference bitmap and mask. The difference in the offsets of the icon and mask bitmaps on the checked axis (if the screen border was vertical, the checked axis is the Y axis, otherwise it is X axis) determines the hotpoint offset, in the reference bitmap, for the checked axis.

vii) Steps i–vi are repeated for the other border.

9) The reference icon bitmap, reference icon mask bitmap and hotpoint location are utilized to generate the detection data as follows:

i) The reference icon bitmap and mask bitmap are searched fop internal and contour change points, where, for the two pixels in the internal change points, their corresponding pixels in the reference mask bitmap have pixel values of 1 and for the two pixels in the contour change point, only one of the corresponding pixels in the reference mask bitmap has a pixel value of 1.

ii) An internal change point vector and a contour change point vector are generated.

iii) The two vectors are sorted so as to ensure an optimal separation of the change points. The method of sorting is described hereinbelow.

iv) The vectors are merged together, wherein inner points take precedence over edge points.

v) A detection vector is generated which includes two pixel values for internal change points and one pixel value and an attribute for contour change points. The attribute indicates whether or not the change point is a left or right change point. The data structure of the detection vector is that of a double linked list which, as is known in the art, enables a fast manipulation of the list for caching purposes.

An exemplary method for generating a list of change points evenly distributed about the area of the icon 200 is described hereinbelow. Since the method is typically performed offline, there is no restriction on the computation time required.

The list of change points can be generated in any suitable manner which provides an even distribution of the points across the area of the icon 200. The following is an exemplary method, detailed in routines Do_generate_corr_points and Do_optimize_data.

1) Prepare the list of change points.

2) Enclose the icon 200 with a square, where the side of the square is S pixels, and S is the smallest power of 2 which yields a square large enough to enclose the icon.

3) Divide the square into four sections and compute the number of change points in each quarter. Each quarter will contribute a number of points to the list based on the relative amount of change points in the quarter.

4) Repeat steps 2–3 within each quarter.

5) After all the points are found, they should be ordered as follows:

i) Model the repeated division into squares as a tree with a square in each node, and the branches of each node are the subdivisions. The tree is travelled from the foot up where, fop each square, the change point which is chosen is the change point, of the change points not yet chosen, which is closest to the center of the square.

It will be appreciated by persons skilled in the aft that the present invention is not limited to what has been particularly shown and described hereinabove. For example, the cursor tracking of the present invention can be implemented entirely in software, of it can be modified to operate with an absolute pointing device. The scope of the present invention is defined only by the claims that follow:

We claim:

1. A system for automatic testing of computer software comprising:

interface means communicating with a system under test loaded with software to be tested;

memory means for storing inputs to the system under test are expected outputs from the system under test in response to said inputs;

synchronizing means for matching the flow of inputs to the system under test in accordance with the varying speed at which the system under test currently operates, comprising:

testing means, operative during a replay session, for supplying said inputs to and for receiving actual outputs, in response to said inputs, from said system under test; and comparison means for producing comparison outputs formed of differences between said effected output and actual outputs, wherein said testing means comprises:

second synchronizing means for, when a next input is one of a set of user defined hot-keys, releasing said next input to said system under test either when the comparison output indicates that a current actual output matches the expected output associated with said next output or when a timeout period has ended.

2. A system according to claim 1 and also comprising capture means for capturing said inputs and expected outputs and for, when an input is one of said set of user-defined hot-keys, providing a next input to said system under test only after said expected output has been captured.

3. A system for automatic testing of computer software comprising:

interface means communicating with a system under test loaded with software to be tested;

memory means for storing inputs to the system under test and expected outputs of the system under test in response to said inputs;

testing means, operative during a replay session, for supplying said inputs to and for receiving actual outputs, in response to said inputs, from said system under test; and comparison means for determining differences between said expected outputs and actual outputs, wherein said testing means comprises means for identifying, from output of said comparison means, when a predefined asynchronous event has occurred and for responding to it in a predefined manner.

4. A method for automatic testing of computer software including the steps of:

communicating via interface means with a system under test loaded with software to be tested;

storing inputs to the system under test and expected outputs of the system under test in response to said inputs;

matching the flow of inputs to the system under test in accordance with the varying speed at which the system under test currently operates comprising the steps of:

during a replay session, supplying said inputs to and receiving actual outputs, in response to said inputs, from said system under test; and producing comparison outputs which indicate differences between said expected outputs and actual outputs, wherein said step of supplying comprises the step of, when a next input is one of a set of user-defined hot-keys, releasing said next input to said system under test either when the comparison output indicates that a current actual output matches the expected output associated with said next input or when a timeout period has ended.

5. A method according to claim 4 and also comprising the step of, when an input is one of said set of user-defined hot-keys, providing a next input to said system under test only after said expected output has been captured.

6. A method for automatic testing of computer software including the steps of:

communicating via interface means with a system under test loaded with software to be tested;

storing inputs to the system under test and expected outputs of the system under test in response to said inputs;

during a replay session, supplying said inputs to and receiving actual outputs, in response to said inputs, from said system under test; and determining differences between the expected outputs and actual outputs, wherein said step of supplying includes the step of identifying, from output of said step of indicating, when a predefined asynchronous event has occurred and for responding to it in a predefined manner.

7. A method according to claim 6 and wherein said step of identifying includes the step of identifying when an actual output represents one of a plurality of predetermined asynchronous events and of providing said step of supplying with inputs and expected outputs associated with said identified asynchronous event.

8. A system according to claim 3 and wherein said means for identifying and responding include means for identifying when an actual output represents one of a plurality of predetermined asynchronous events and means for providing said testing means with inputs and expected outputs associated with said identified asynchronous event.

9. A system for automatic testing of computer software comprising:

interface means communicating with a system under test loaded with software memory means for storing inputs to the system under test and expected outputs from the system under test in response to said inputs, wherein said expected outputs also include user-defined synchronizing screen objects;

synchronizing means for matching the flow of inputs to the system under test in accordance with the varying speed at which the system under test currently operates comprising:

testing means, operative during a replay session, for supplying said inputs to and for receiving actual outputs, in response to said inputs, from said system under test; and comparison means for determining differences between said expected outputs and actual outputs, wherein said testing means comprises:

second synchronizing means for, when a next input is one of a set of user defined hot-keys, releasing said next input to said system under test either when the comparison output indicates that a current actual output matches a user-defined synchronization output associated with said next input or when a timeout period has ended.

10. A system according to claim 9 and also comprising capture means for capturing said inputs and expected outputs and for, when an input is one of said set of user-defined hot-keys, providing a next input to said system under test only after said expected output has been captured.

* * * * *